United States Patent
Bogen et al.

(10) Patent No.: US 12,497,362 B2
(45) Date of Patent: Dec. 16, 2025

(54) CYCLOPENTAPYRROLE OREXIN RECEPTOR AGONISTS

(71) Applicant: Merck Sharp & Dohme LLC, Rahway, NJ (US)

(72) Inventors: Stephane L. Bogen, Somerset, NJ (US); Dane James Clausen, Rahway, NJ (US); Michael T. Rudd, Collegeville, PA (US); Dong Xiao, Warren, NJ (US); Dexi Yang, Livingston, NJ (US)

(73) Assignee: Merck Sharp & Dohme LLC, Rahway, NJ (US)

( * ) Notice: Subject to any disclaimer, the term of this patent is extended or adjusted under 35 U.S.C. 154(b) by 527 days.

(21) Appl. No.: 18/040,861

(22) PCT Filed: Aug. 16, 2021

(86) PCT No.: PCT/US2021/046064
§ 371 (c)(1),
(2) Date: Feb. 7, 2023

(87) PCT Pub. No.: WO2022/040058
PCT Pub. Date: Feb. 24, 2022

(65) Prior Publication Data
US 2023/0257348 A1    Aug. 17, 2023

Related U.S. Application Data

(60) Provisional application No. 63/066,913, filed on Aug. 18, 2020.

(51) Int. Cl.
| | | |
|---|---|---|
| *C07D 209/52* | (2006.01) | |
| *A61K 31/403* | (2006.01) | |
| *A61K 31/407* | (2006.01) | |
| *A61K 31/506* | (2006.01) | |
| *A61P 25/00* | (2006.01) | |
| *C07D 401/14* | (2006.01) | |
| *C07D 491/02* | (2006.01) | |
| *C07D 491/048* | (2006.01) | |

(52) U.S. Cl.
CPC .......... *C07D 209/52* (2013.01); *A61K 31/403* (2013.01); *A61K 31/407* (2013.01); *A61K 31/506* (2013.01); *A61P 25/00* (2018.01); *C07D 401/14* (2013.01); *C07D 491/02* (2013.01); *C07D 491/048* (2013.01)

(58) Field of Classification Search
None
See application file for complete search history.

(56) References Cited

U.S. PATENT DOCUMENTS

| | | |
|---|---|---|
| 8,288,429 B2 | 10/2012 | Aissaoui |
| 2017/0342085 A1 | 11/2017 | Bacon et al. |
| 2020/0115399 A1 | 4/2020 | Fujimoto et al. |
| 2020/0255403 A1 | 8/2020 | Bogen et al. |

FOREIGN PATENT DOCUMENTS

| | | | |
|---|---|---|---|
| WO | 2001077100 A2 | 10/2001 | |
| WO | 2019027003 A1 | 2/2019 | |
| WO | WO-2021026047 A1 * | 2/2021 | ........... C07D 498/04 |
| WO | 2022040070 A1 | 2/2022 | |

OTHER PUBLICATIONS

Chemelli, Richard M. et al., Narcolepsy in orexin Knockout Mice: Molecular Genetics of Sleep Regulation, Cell, 1999, 437-451, 98.
Harris, Glenda C. et al., Arousal and reward: a dichotomy in orexin function, Trends in Neurosciences, 2006, 571-577, 29(10).
Peyron, Christelle et al., Neurons Containing Hypocretin (Orexin) Project to Multiple Neuronal Systems, the Journal of Neuroscience, 1998, 9996-100150, 18(23).
PubChem-CID-69654844, Create Date: Dec. 1, 2012 (Dec. 1, 2012), p. 2, figure, 8 pages.
PubChem-SID-364259874, Modify Date: May 24, 2018 (May 24, 2018). p. 2, figure, this is a purchasable chemical, 5 pages.
Sakurai, Takeshi et al., Orexins and Orexin Receptors: A Family of Hypothalamic Neuropeptides and G Protein-Coupled Receptors that Regulate Feeding Behavior, Cell, 1998, 573-585, 92.
Boss, C., et al., Structure-Activity Relationship, Biological, and Pharmacological Characterization of the Proline Sulfonamide ACT-462206: a Potent, Brain-Penetrant Dual Orexin 1/Orexin 2 Receptor Antagonist, ChemMedChem Communications, vol. 9, No. 11, p. 2486-2496, Aug. 21, 2014.
European Search Report, Application No. 21858880.4 dated Jul. 29, 2024, 10 pages.
Yukitake, H., et al., TAK-925, an orexin 2 receptor-selective agonist, shows robust wakepromoting effects in mice, Pharmacology, Biochemistry and Behavior, vol. 187, No. 172794, p. 1-10, Oct. 22, 2019.

* cited by examiner

*Primary Examiner* — Juliet C Switzer
*Assistant Examiner* — Dawanna Shar-Day White
(74) *Attorney, Agent, or Firm* — Patricia A. Shatynski; John C. Todaro

(57) ABSTRACT

The present invention is directed to cyclopentapyrrole, furopyrrole and azabicycloheptane compounds which are agonists of orexin receptors. The present invention is also directed to uses of the compounds described herein in the potential treatment or prevention of neurological and psychiatric disorders and diseases in which orexin receptors are involved. The present invention is also directed to compositions comprising these compounds. The present invention is also directed to uses of these compositions in the potential prevention or treatment of such diseases in which orexin receptors are involved.

13 Claims, No Drawings

CYCLOPENTAPYRROLE OREXIN RECEPTOR AGONISTS

CROSS-REFERENCE TO RELATED APPLICATIONS

This application is a National Stage application of International Patent Application No. PCT/US2021/046064, filed Aug. 16, 2021, which claims priority to U.S. Provisional Patent Application No. 63/066,913, filed Aug. 18, 2020.

BACKGROUND OF THE INVENTION

The orexins (hypocretins) comprise two neuropeptides produced in the hypothalamus: orexin A (OX-A) (a 33 amino acid peptide) and the orexin B (OX—B) (a 28 amino acid peptide) (Sakurai T. et al., Cell, 1998, 92, 573-585). Orexins regulate states of sleep and wakefulness opening potentially novel therapeutic approaches for narcolepsy, idiopathic hypersomnia, excessive daytime sleepiness, shift work disorder, obstructive sleep apnea and insomnia (Chemelli R. M. et al., Cell, 1999, 98, 437-451). Orexins are found to stimulate food consumption in rats suggesting a physiological role for these peptides as mediators in the central feedback mechanism that regulates feeding behavior (Sakurai T. et al., Cell, 1998, 92, 573-585). Orexins have also been indicated as playing a role in arousal, emotion, energy homeostasis, reward, learning and memory (Peyron, et al., Journal Neurosci., 1998, 18(23):9996-100150, Harris, et al., Trends Neurosci., 2006, 29 (10), 571-577). Two orexin receptors have been cloned and characterized in mammals. They belong to the super family of G-protein coupled receptors (Sakurai T. et al., Cell, 1998, 92, 573-585): the orexin-1 receptor (OX or OX1R) is partially selective for OX-A and the orexin-2 receptor (OX2 or OX2R) is capable of binding OX-A as well as OX—B with similar affinity. The physiological actions in which orexins are presumed to participate are thought to be expressed via one or both of OX1 receptor and OX2 receptor as the two subtypes of orexin receptors.

SUMMARY OF THE INVENTION

The present invention is directed to cyclopentapyrrole, furopyrrole and azabicycloheptane compounds which are agonists of orexin receptors. The present invention is also directed to uses of the compounds described herein in the potential treatment or prevention of neurological and psychiatric disorders and diseases in which orexin receptors are involved. The present invention is also directed to compositions comprising these compounds. The present invention is also directed to uses of these compositions in the potential prevention or treatment of such diseases in which orexin receptors are involved.

DETAILED DESCRIPTION OF THE INVENTION

The present invention is directed to compounds of the formula I:

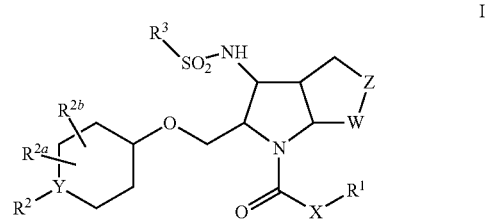

wherein:
X is —O— or —NH—, or X may be a direct bond to $R^1$;
Y is N or CH;
Z is —O— or CH;
W is CH, or if Z is CH, W may be a direct bond to Z;
$R^1$ is selected from:
  (1) —$C_{1-6}$alkyl, where the alkyl is unsubstituted or substituted with one to six substituents independently selected from $R^4$, and
  (2) —$C_{3-6}$cycloalkyl, where the cycloalkyl is unsubstituted or substituted with one to six substituents independently selected from $R^4$;
$R^2$ is selected from:
  (1) hydrogen,
  (2) —$C_{1-6}$alkyl, where the alkyl is unsubstituted or substituted with one to six substituents independently selected from $R^4$,
  (3) —$C_{3-6}$cycloalkyl, where the cycloalkyl is unsubstituted or substituted with one to six substituents independently selected from $R^4$,
  (4) -phenyl, where the phenyl is unsubstituted or substituted with one to three substituents independently selected from $R^4$, and
  (5) -heteroaryl, where the heteroaryl is selected from: pyridyl, pyrimidinyl, and pyrazinyl, and the heteroaryl is unsubstituted or substituted with one to three substituents independently selected from $R^4$;
$R^{2a}$ and $R^{2b}$ are independently selected from:
  (1) hydrogen,
  (2) hydroxyl,
  (3) halogen, and
  (4) —$C_{1-6}$alkyl, where the alkyl is unsubstituted or substituted with one to six substituents independently selected from halogen;
$R^3$ is selected from:
  (1) —$C_{1-6}$alkyl, where the alkyl is unsubstituted or substituted with one to six substituents independently selected from $R^4$,
  (2) —$C_{3-6}$cycloalkyl, where the cycloalkyl is unsubstituted or substituted with one to six substituents independently selected from $R^4$,
  (3) -phenyl, where the phenyl is unsubstituted or substituted with one to three substituents independently selected from $R^4$,
  (4) —$NR^{10}R^{11}$, wherein $R^{10}$ and $R^{11}$ are independently selected from:
    (a) hydrogen, and
    (b) $C_{1-6}$alkyl, which is unsubstituted or substituted with one to six $R^4$;

R⁴ is selected from:
(1) hydroxyl,
(2) halogen,
(3) $C_{1-6}$alkyl, which is unsubstituted or substituted with one to six fluoro,
(4) $C_{2-4}$alkenyl,
(5) $C_{2-4}$alkynyl,
(6) —$C_{3-6}$cycloalkyl,
(7) —O—$C_{1-6}$alkyl,
(8) —O(C=O)—$C_{1-6}$alkyl,
(9) —$NH_2$,
(10) —NH—$C_{1-6}$alkyl,
(11) —$NO_2$,
(12) phenyl,
(13) —$CO_2H$,
(14) —$SO_2$—$C_{1-6}$alkyl,
(15) —$C_{3-5}$cycloalkyl($SO_2$), and
(16) —CN;

or a pharmaceutically acceptable salt thereof.

An embodiment of the present invention includes compounds of the formula Ia:

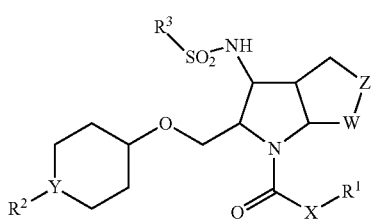

Ia wherein W, X, Y, Z, R¹, R² and R³ are defined herein; or a pharmaceutically acceptable salt thereof.

An embodiment of the present invention includes compounds of the formula Ib:

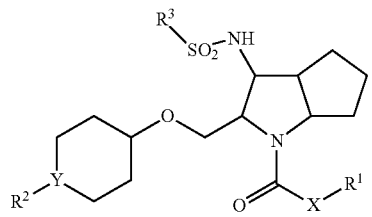

Ib wherein X, Y, R¹, R² and R³ are defined herein; or a pharmaceutically acceptable salt thereof.

An embodiment of the present invention includes compounds of the formula Ib':

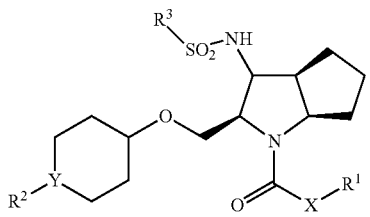

Ib' wherein X, Y, R¹, R² and R³ are defined herein; or a pharmaceutically acceptable salt thereof.

An embodiment of the present invention includes compounds of the formula Ib":

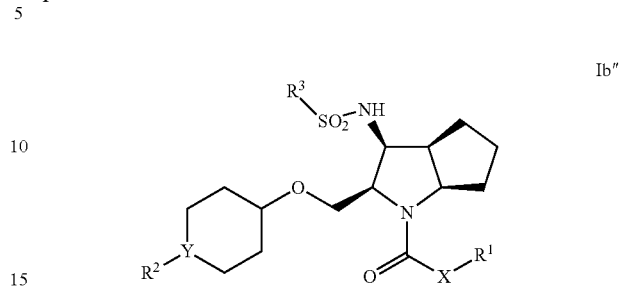

Ib"

wherein X, Y, R¹, R² and R³ are defined herein; or a pharmaceutically acceptable salt thereof.

An embodiment of the present invention includes compounds of the formula Ib'":

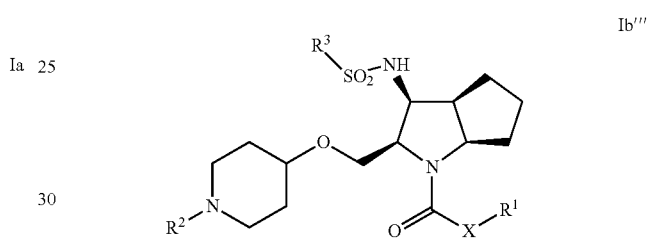

Ib'"

wherein X, R¹, R² and R³ are defined herein; or a pharmaceutically acceptable salt thereof.

An embodiment of the present invention includes compounds of the formula Ib"":

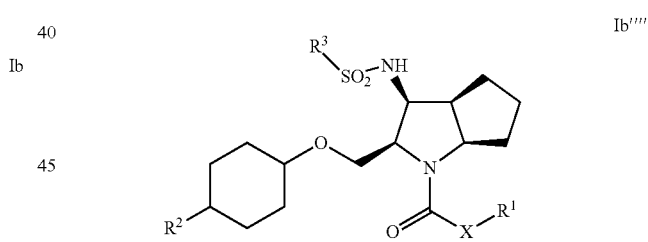

Ib""

wherein X, R¹, R² and R³ are defined herein; or a pharmaceutically acceptable salt thereof.

An embodiment of the present invention includes compounds of the formula Ic:

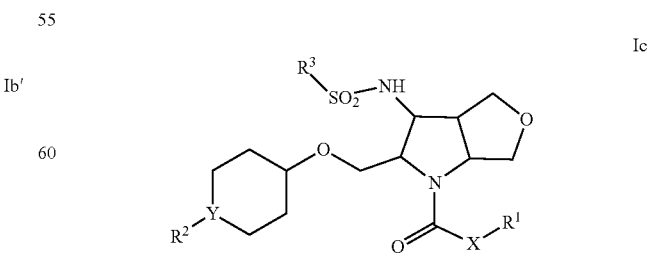

Ic wherein X, Y, R¹, R² and R³ are defined herein; or a pharmaceutically acceptable salt thereof.

An embodiment of the present invention includes compounds of the formula Ic':

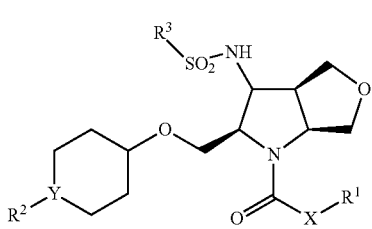
Ic' wherein X, Y, R¹, R² and R³ are defined herein; or a pharmaceutically acceptable salt thereof.

An embodiment of the present invention includes compounds of the formula Ic":

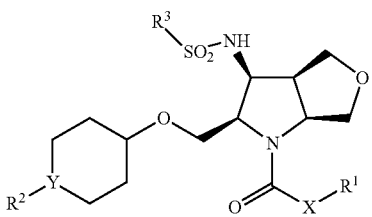
Ic"

wherein X, Y, R¹, R² and R³ are defined herein; or a pharmaceutically acceptable salt thereof.

An embodiment of the present invention includes compounds of the formula Ic''':

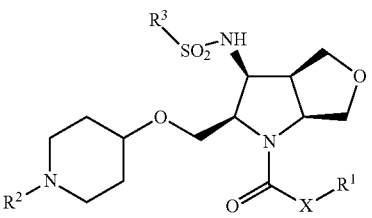
Ic''' wherein X, R¹, R² and R³ are defined herein; or a pharmaceutically acceptable salt thereof.

An embodiment of the present invention includes compounds of the formula Ic'''':

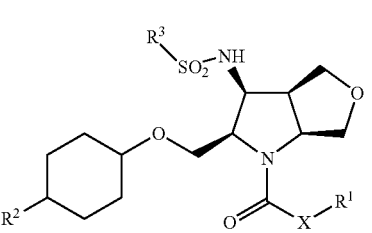
Ic'''' wherein X, R¹, R² and R³ are defined herein; or a pharmaceutically acceptable salt thereof.

An embodiment of the present invention includes compounds of the formula Id:

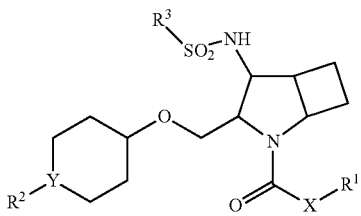
Id wherein Y, X, R¹, R² and R³ are defined herein; or a pharmaceutically acceptable salt thereof.

An embodiment of the present invention includes compounds of the formula Id':

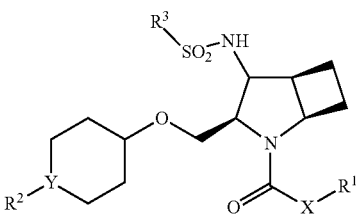
Id' wherein Y, X, R¹, R² and R³ are defined herein; or a pharmaceutically acceptable salt thereof.

An embodiment of the present invention includes compounds of the formula Id":

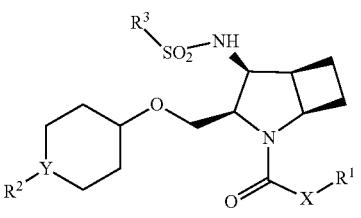
Id"

wherein Y, X, R¹, R² and R³ are defined herein; or a pharmaceutically acceptable salt thereof.

An embodiment of the present invention includes compounds of the formula Id''':

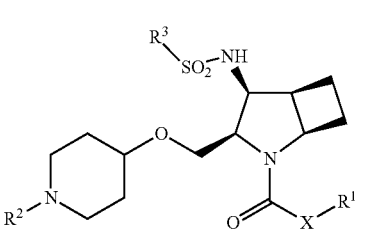
Id''' wherein X, R¹, R² and R³ are defined herein; or a pharmaceutically acceptable salt thereof.

An embodiment of the present invention includes compounds of the formula Id'''':

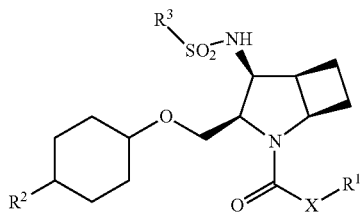

wherein X, $R^1$, $R^2$ and $R^3$ are defined herein; or a pharmaceutically acceptable salt thereof.

An embodiment of the present invention includes compounds wherein X is —OH—. An embodiment of the present invention includes compounds wherein X is —NH—. An embodiment of the present invention includes compounds wherein X is a direct bond to $R^1$.

An embodiment of the present invention includes compounds wherein Y is N. An embodiment of the present invention includes compounds wherein Y is CH.

An embodiment of the present invention includes compounds wherein Z is CH and W is CH.

An embodiment of the present invention includes compounds wherein Z is —O— and W is CH.

An embodiment of the present invention includes compounds wherein Z is CH and W is a direct bond to Z.

An embodiment of the present invention includes compounds wherein $R^1$ is selected from:
(1) —$C_{1-6}$alkyl, which is unsubstituted or substituted with fluoro or —(C=O)—$C_{1-6}$alkyl,
(2) —$C_{3-6}$cycloalkyl, and
(3) —$CH_2$—$C_{3-6}$cycloalkyl.

An embodiment of the present invention includes compounds wherein $R^1$ is selected from:
(1) methyl,
(2) ethyl,
(3) —$CH_2OH$,
(4) —$CH_2CF_3$,
(5) —$CH_2CHF_2$,
(6) —$CH(CH_3)_2$,
(7) —$CH_2CH_2CH_2F$,
(8) cyclopropyl,
(9) —$CH_2$-cyclopropyl,
(10) —$CH_2$-cyclobutyl, and
(11) —$CH_2O(C=O)CH_3$.

An embodiment of the present invention includes compounds wherein $R^1$ is selected from:
(1) methyl,
(2) ethyl, and
(3) —$CH(CH_3)_2$.

An embodiment of the present invention includes compounds wherein $R^2$ is selected from:
(1) hydrogen,
(2) —$C_{1-6}$alkyl, where the alkyl is unsubstituted or substituted with one to three fluoro,
(3) phenyl, which is unsubstituted or substituted with one to three fluoro, or —$C_{1-6}$alkyl, where the alkyl is unsubstituted or substituted with one to three fluoro, and
(4) pyrimidinyl, which is unsubstituted or substituted with one to two fluoro, or —$C_{1-6}$alkyl, where the alkyl is unsubstituted or substituted with one to three fluoro.

An embodiment of the present invention includes compounds wherein $R^2$ is selected from:
(1) hydrogen,
(2) —$CH_2(CH_3)_2$,
(3) —$CF_3$,
(4) —$CH_2CHF_2$,
(5) —$CH_2CF_3$,
(6) phenyl, which is unsubstituted or substituted with —$CF_3$, —$CH_2CF_3$, or one to three fluoro, and
(7) pyrimidinyl, which is unsubstituted or substituted with —$CF_3$, —$CH_2CF_3$, or one to three fluoro.

An embodiment of the present invention includes compounds wherein $R^2$ is selected from:
(1) hydrogen,
(2) —$CH_2(CH_3)_2$,
(3) —$CF_3$,
(4) —$CH_2CHF_2$,
(5) —$CH_2CF_3$,
(6) phenyl,
(7) phenyl-$CF_3$,
(8) phenyl-$CH_2CF_3$,
(9) fluorophenyl,
(10) difluorophenyl,
(11) trifluorophenyl,
(12) pyrimidinyl, and
(13) fluoropyrimidinyl.

An embodiment of the present invention includes compounds wherein $R^{2a}$ is hydrogen and $R^{2b}$ is hydrogen. An embodiment of the present invention includes compounds wherein $R^{2a}$ is methyl and $R^{2b}$ is hydrogen. An embodiment of the present invention includes compounds wherein $R^{2a}$ is methyl and $R^{2b}$ is methyl. An embodiment of the present invention includes compounds wherein $R^{2a}$ is methyl and $R^{2b}$ is methyl, wherein $R^{2a}$ and $R^{2b}$ are attached to the same carbon atom. An embodiment of the present invention includes compounds wherein $R^{2a}$ is fluoro and $R^{2b}$ is fluoro, wherein $R^{2a}$ and $R^{2b}$ are attached to the same carbon atom. An embodiment of the present invention includes compounds wherein $R^{2a}$ is hydroxyl and $R^{2b}$ is hydrogen. An embodiment of the present invention includes compounds wherein $R^{2a}$ is fluoro and $R^{2b}$ is hydrogen.

An embodiment of the present invention includes compounds wherein $R^3$ is selected from:
(1) —$C_{1-6}$alkyl, where the alkyl is unsubstituted or substituted with one to three fluoro,
(2) —$C_{3-6}$cycloalkyl,
(3) —$NH_2$,
(4) —$NH(C_{1-6}$alkyl),
(5) —$N(C_{1-6}$alkyl)($C_{1-6}$alkyl), and
(6) -phenyl.

An embodiment of the present invention includes compounds wherein $R^3$ is selected from:
(1) methyl,
(2) —$CF_3$,
(3) —$CH_2F$,
(4) ethyl,
(5) cyclopropyl,
(6) —$CH(CH_3)_2$,
(7) —$NH(CH_3)$,
(8) —$N(CH_3)_2$, and
(9) -phenyl.

An embodiment of the present invention includes compounds wherein $R^3$ is selected from:
(1) methyl,
(2) —$CH_2F$,
(3) —$NH(CH_3)$, and
(4) —$N(CH_3)_2$.

Certain embodiments of the present invention include a compound which is selected from the group consisting of the subject compounds of the Examples herein or a pharmaceutically acceptable salt thereof.

Certain embodiments of the present invention include a compound which is selected from:

methyl (2R,3S,3aS,6aR)-2-((((1s,4S)-4-(3-fluorophenyl)cyclohexyl)oxy)methyl)-3-(methylsulfonamido)hexahydrocyclopenta[b]pyrrole-1(2H)-carboxylate;

methyl (2R,3S,3aS,6aR)-3-((N,N-dimethylsulfamoyl)amino)-2-((((1s,4S)-4-(3-fluorophenyl)cyclohexyl)oxy)methyl)hexahydrocyclopenta[b]pyrrole-1(2H)-carboxylate;

methyl (2R,3S,3aS,6aR)-2-((((1s,4S)-4-(3-fluorophenyl)cyclohexyl)oxy)methyl)-3-((N-methylsulfamoyl)amino)hexahydrocyclopenta[b]pyrrole-1(2H)-carboxylate;

methyl (2R,3S,3aS,6aS)-2-((((1s,4S)-4-(3-fluorophenyl)cyclohexyl)oxy)methyl)-3-(methylsulfonamido)hexahydro-1H-furo[3,4-b]pyrrole-1-carboxylate;

methyl (2R,3S,3aS,6aS)-3-((N,N-dimethylsulfamoyl)amino)-2-((((1s,4S)-4-(3-fluorophenyl)cyclohexyl)oxy)methyl)hexahydro-1H-furo[3,4-b]pyrrole-1-carboxylate;

methyl (2R,3S,3aS,6aS)-3-((fluoromethyl)sulfonamido)-2-((((1s,4S)-4-(3-fluorophenyl)cyclohexyl)oxy)methyl)hexahydro-1H-furo[3,4-b]pyrrole-1-carboxylate;

methyl (2R,3S,3aS,6aR)-3-(methylsulfonamido)-2-4((1s,4S)-4-phenylcyclohexyl)oxy)methyl)hexahydrocyclopenta[b]pyrrole-1(2H)-carboxylate;

methyl (2R,3S,3aS,6aR)-2-(((1-(5-fluoropyrimidin-2-yl)piperidin-4-yl)oxy)methyl)-3-(methylsulfonamido)hexahydrocyclopenta[b]pyrrole-1(2H)-carboxylate;

methyl (2R,3S,3aS,6aR)-3-((N,N-dimethylsulfamoyl)amino)-2-((((1s,4S)-4-phenylcyclohexyl)oxy)methyl)hexahydrocyclopenta[b]pyrrole-1(2H)-carboxylate;

isopropyl (2R,3S,3aS,6aR)-2-(((1-(5-fluoropyrimidin-2-yl)piperidin-4-yl)oxy)methyl)-3-(methylsulfonamido)hexahydrocyclopenta[b]pyrrole-1(2H)-carboxylate;

methyl (1R,3R,4S,5S)-4-(methylsulfonamido)-3-((((1s,4S)-4-phenylcyclohexyl)oxy)methyl)-2-azabicyclo[3.2.0]heptane-2-carboxylate;

or a pharmaceutically acceptable salt thereof.

The compounds of the present invention may contain one or more asymmetric centers and can thus occur as racemates and racemic mixtures, single enantiomers, diastereomeric mixtures and individual diastereomers. Additional asymmetric centers may be present depending upon the nature of the various substituents on the molecule. Each such asymmetric center will independently produce two optical isomers and it is intended that all of the possible optical isomers and diastereomers in mixtures and as pure or partially purified compounds are included within the ambit of this invention. The present invention is meant to comprehend all such isomeric forms of these compounds. Likewise, the present invention includes tautomeric forms of the compounds disclosed herein. Formula I shows the structure of the class of compounds without specific stereochemistry. At least some of the chemical names of compounds of the invention as set forth in this application may have been generated on an automated basis by use of commercially available chemical naming software programs, and have not been independently verified.

The independent syntheses of these diastereomers or their chromatographic separations may be achieved as known in the art by appropriate modification of the methodology disclosed herein. Their absolute stereochemistry may be determined by the x-ray crystallography of crystalline products or crystalline intermediates which are derivatized, if necessary, with a reagent containing an asymmetric center of known absolute configuration. If desired, racemic mixtures of the compounds may be separated so that the individual enantiomers are isolated. The separation can be carried out by methods well known in the art, such as the coupling of a racemic mixture of compounds to an enantiomerically pure compound to form a diastereomeric mixture, followed by separation of the individual diastereomers by standard methods, such as fractional crystallization or chromatography. The coupling reaction is often the formation of salts using an enantiomerically pure acid or base. The diasteromeric derivatives may then be converted to the pure enantiomers by cleavage of the added chiral residue. The racemic mixture of the compounds can also be separated directly by chromatographic methods utilizing chiral stationary phases, which methods are well known in the art. Alternatively, any enantiomer of a compound may be obtained by stereoselective synthesis using optically pure starting materials or reagents of known configuration by methods well known in the art.

As appreciated by those of skill in the art, halogen or halo as used herein are intended to include fluoro, chloro, bromo and iodo. Similarly, $C_{1-6}$, as in $C_{1-6}$alkyl is defined to identify the group as having 1, 2, 3, 4, 5 or 6 carbons in a linear or branched arrangement, such that $C_{1-6}$alkyl specifically includes methyl, ethyl, n-propyl, iso-propyl, n-butyl, iso-butyl, tert-butyl, pentyl, and hexyl. A group which is designated as being independently substituted with substituents may be independently substituted with multiple numbers of such substituents.

The present invention also includes all pharmaceutically acceptable isotopic variations of a compound of the Formula I in which one or more atoms is replaced by atoms having the same atomic number, but an atomic mass or mass number different from the atomic mass or mass number usually found in nature. Such compounds are identical to those disclosed herein, but for the fact that one or more atoms are replaced by an atom having an atomic mass or mass number different from the atomic mass or mass number usually found in nature. Examples of isotopes suitable for inclusion in the compounds of the invention include isotopes of hydrogen such as $^2$H and $^3$H, carbon such as $^{11}$C, $^{13}$C and $^{14}$C, nitrogen such as $^{13}$N and $^{15}$N, oxygen such as $^{15}$O, $^{17}$O and $^{18}$O, phosphorus such as $^{32}$P, sulfur such as $^{35}$S, fluorine such as $^{18}$F, iodine such as $^{123}$I and $^{125}$I, and chlorine such as $^{36}$Cl. Certain isotopically-labelled compounds of Formula I, for example those incorporating a radioactive isotope, are useful in drug and/or substrate tissue distribution studies. The radioactive isotopes tritium, i.e. $^3$H, and carbon-14, i.e. $^{14}$C, are particularly useful for this purpose in view of their ease of incorporation and ready means of detection. Substitution with heavier isotopes such as deuterium, i.e. $^2$H, may afford certain therapeutic advantages resulting from greater metabolic stability, for example, increased in vivo half-life or reduced dosage requirements, and hence may be preferred in some circumstances. Substitution with positron emitting isotopes, such as $^{11}$C, $^{18}$F, $^{15}$O and $^{13}$N can be useful in Positron Emission Topography (PET) studies for examining substrate receptor occupancy. An embodiment of the present invention includes compounds that are substituted with a positron emitting isotope. An embodiment of the present invention includes compounds that are substituted with a $^{11}$C isotope. An embodiment of the present invention includes compounds that are substituted with an $^{18}$F isotope. In the compounds of the invention, the atoms may exhibit their natural isotopic abundances, or one or more of the atoms may be artificially enriched in a particular isotope having the same atomic number, but an atomic mass or mass number different from the atomic mass or mass number predominantly found in nature. The present invention is meant to include all suitable isotopic variations of the compounds of the invention. For example, different isotopic forms of hydrogen (H) include protium ($^1$H) and deuterium ($^2$H). Protium is the predominant hydrogen isotope found in nature. Enriching for deuterium may afford certain therapeutic advantages, such as increasing in vivo half-life or reducing dosage requirements, or may provide a compound useful as a standard for characterization of biological samples. Isotopically-enriched compounds of the invention can be prepared without undue experimentation by conventional techniques well known to those skilled in the art or by processes analogous to those described in the schemes and examples herein using appropriate isotopically-enriched reagents and/or intermediates.

Those skilled in the art will recognize those instances in which the compounds of the invention may form salts. In such instances, another embodiment provides pharmaceutically acceptable salts of the compounds of the invention. Thus, reference to a compound of the invention herein is understood to include reference to salts thereof, unless otherwise indicated. The term "pharmaceutically acceptable salts" refers to salts prepared from pharmaceutically acceptable non-toxic bases or acids including inorganic or organic bases and inorganic or organic acids. In addition, when a compound of the invention contains both a basic moiety, such as, but not limited to a pyridine or imidazole, and an acidic moiety, such as, but not limited to a carboxylic acid, zwitterions ("inner salts") may be formed and are included within the present invention. Salts derived from inorganic bases include aluminum, ammonium, calcium, copper, ferric, ferrous, lithium, magnesium, manganic salts, manganous, potassium, sodium, zinc, and the like. Particular embodiments include the ammonium, calcium, magnesium, potassium, and sodium salts. Salts in the solid form may exist in more than one crystal structure, and may also be in the form of hydrates or solvates. Salts derived from pharmaceutically acceptable organic non-toxic bases include salts of primary, secondary, and tertiary amines, substituted amines including naturally occurring substituted amines, cyclic amines, and basic ion exchange resins, such as arginine, betaine, caffeine, choline, N,N'-dibenzylethylenediamine, diethylamine, 2-diethylaminoethanol, 2-dimethylaminoethanol, ethanolamine, ethylenediamine, N-ethylmorpholine, N-ethylpiperidine, glucamine, glucosamine, histidine, hydrabamine, isopropylamine, lysine, methylglucamine, morpholine, piperazine, piperidine, polyamine resins, procaine, purines, theobromine, triethylamine, trimethylamine, tripropylamine, tromethamine, and the like.

When the compound of the present invention is basic, salts may be prepared from pharmaceutically acceptable non-toxic acids, including inorganic and organic acids. Such acids include acetic, benzenesulfonic, benzoic, camphorsulfonic, citric, ethanesulfonic, fumaric, gluconic, glutamic, hydrobromic, hydrochloric, isethionic, lactic, maleic, malic, mandelic, methanesulfonic, mucic, nitric, pamoic, pantothenic, phosphoric, succinic, sulfuric, tartaric, p-toluenesulfonic acid, and the like. Particular embodiments include the citric, hydrobromic, hydrochloric, maleic, phosphoric, sulfuric, fumaric, and tartaric acids. It will be understood that, as used herein, references to the compounds of Formula I are meant to also include the pharmaceutically acceptable salts. Salts of the compounds of the invention may be formed by methods known to those of ordinary skill in the art, for example, by reacting a compound of the invention with an amount of acid or base, such as an equivalent amount, in a medium such as one in which the salt precipitates or in an aqueous medium followed by lyophilization.

Exemplifying the invention is the use of the compounds disclosed in the Examples and herein. Specific compounds within the present invention include a compound which is selected from the compounds disclosed in the following Examples and pharmaceutically acceptable salts thereof and individual enantiomers or diastereomers thereof.

The present invention is also directed to the use of the compounds disclosed herein as agonists of orexin receptor activity. The subject compounds and pharmaceutically acceptable salts thereof are useful in a method of agonizing orexin receptor activity in a subject such as a mammal comprising the administration of an amount of the compound. In addition to primates, especially humans, a variety of other mammals may be administered with a compound of the present invention. The present invention is directed to a compound of the present invention or a pharmaceutically acceptable salt thereof that could be useful in therapy. The present invention may further be directed to a use of a compound of the present invention or a pharmaceutically acceptable salt thereof for the manufacture of a medicament for agonizing orexin receptor activity or treating the disorders and diseases noted herein in humans and animals.

A subject administered with a compound of the present invention, or a pharmaceutically acceptable salt thereof, is generally a mammal, such as a human being, male or female. The amount of compound administered to the subject is an amount sufficient to agonize the orexin receptor in the subject. In an embodiment, the amount of compound can be an "effective amount", wherein the subject compound is administered in an amount that will elicit the biological or medical response of a tissue, system, animal or human that is being sought by the researcher, veterinarian, medical doctor or other clinician. An effective amount does not necessarily include considerations of toxicity and safety related to the administration of the compound. It is recognized that one skilled in the art may affect neurological and psychiatric disorders associated with orexin receptor activation by treating a subject presently afflicted with the disorders, or by prophylactically treating a subject likely to be afflicted with the disorders, with an effective amount of a compound of the present invention. As used herein, the terms "treatment" and "treating" refer to all processes wherein there may be a slowing, interrupting, arresting, controlling, or stopping of the progression of the neurological and psychiatric disorders described herein, but does not necessarily indicate a total elimination of all disorder symptoms, as well as the prophylactic therapy of the mentioned conditions, particularly in a subject that is predisposed to such disease or disorder. The terms "administration of" and or "administering a" compound should be understood to mean providing a compound of the invention or a prodrug of a compound of the invention to to the subject.

The term "composition" as used herein is intended to encompass a product comprising the specified ingredients in the specified amounts, as well as any product which results, directly or indirectly, from combination of the specified ingredients in the specified amounts. Such term is intended to encompass a product comprising the active ingredient(s), and the inert ingredient(s) that make up the carrier, as well as any product which results, directly or indirectly, from combination, complexation or aggregation of any two or more of the ingredients, or from dissociation of one or more of the ingredients, or from other types of reactions or interactions of one or more of the ingredients. Accordingly, the compositions of the present invention encompass any composition made by admixing a compound of the present invention and a pharmaceutically acceptable carrier. By "pharmaceutically acceptable" it is meant the carrier, diluent or excipient must be compatible with the other ingredients of the formulation and not deleterious to the recipient thereof.

The utility of the compounds in accordance with the present invention as orexin receptor OX1R and/or OX2R agonists may be readily determined without undue experimentation by methodology well known in the art. Both the OX1R and/or OX2R G-coupled protein receptors (GPCRs) couple through the Gαq signaling pathway, which ultimately promotes calcium mobilization via inositol triphosphate (IP3) production. The half-life of IP-3 is relatively short, being rapidly metabolized to inositol monophosphate (IP-1), which can be readily detected using a commercially available assay kit (IP-One; Cisbio; cat #621PAPEC) coupled with a cell line expressing the target receptor(s) of interest. The utility of the compounds in accordance with the present invention as orexin receptor OX1R and/or OX2R agonists may be determined utilizing this assay.

In a typical experiment, the OX1 and OX2 receptor agonist activity is determined in accordance with the following general experimental method. Chinese hamster ovary (CHO) cells expressing human OX1R and/or the human OX2R were grown in Iscove's modified DMEM containing glutaMAX™, 1% G418, 100 U/mL penicillin, 100 µg/mL streptomycin and 10% heat-inactivated qualified fetal bovine serum (FBS). The OX2R cells were seeded at 10,000 cells/well/50 µL and the OX1R cells were seeded at 20,000 cells/well/50 µL into 384-well white tissue culture plates (Greiner; cat #781080). All cell/media reagents were from GIBCO-Invitrogen Corp. The seeded cell plate(s) were incubated at 37° C. with 5% $CO_2$ and 85% humidity for 20-24 hours. On the day of the assay, assay-ready compound plates were prepared using an acoustic liquid handler (ECHO; Labcyte), which dispensed sufficient volume of test compound stock (10 mM in DMSO) or 100% DMSO to prepare 10 point, ½-log dilutions in a final volume of 202.5 nL/well in all test wells of a 384-well diamond plate (Labcyte). Following completion of assay-ready plates, importantly, the next three steps were performed with minimal delay: 1) 20 µl of 1× stimulation buffer was added to the compound plate using a Multidrop Combi (small cassette, Thermo Fisher Scientific cat #24073290); 2) culture medium was removed from the cell plate using the Bluewasher plate washer (gentle spin; BlueCatBio); 3) 14 µl of compound/stimulation buffer mixture was added to the cell plate using a Bravo liquid handler (Agilent) prior to incubating cell plates at 37° C. with 5% $CO_2$ and 85% humidity for 1 or 2 hours (OX1R and OX2R, respectively). During this incubation, IP-one detection reagents were prepared (38:1:1 lysis buffer:D2:AB-cryptate reagents). Six µL of mixed detection reagents were added to the cell plate using a Multidrop Combi (small cassette, Thermo Fisher Scientific cat #24073290) and incubated 60 minutes at room temperature in the dark. Fluorescence signal was detected using an Envision plate reader (Perkin Elmer) [LANCE/DELFIA Dual Enh (Em: APC 665; Ex: Cy5 620)].

For each compound, data were fit to a four parameter logistic fit (ActivityBase software) and the $EC_{50}$ was reported as the inflection point of the resulting curve. Percent effect for each test compound was determined as the percentage of sample raw value/mean max effect, where the mean max effect was derived from the mean raw value of 32 control wells per assay plate (using Orexin A (cat #003-30) at 1 µM for human OX1R and a reference compound at 1 uM with 100% activity previously established by comparison to Orexin A for human OX2R). The intrinsic orexin receptor agonist activity of a compound which may be used in the present invention may be determined by these assays.

All of the final compounds of the following examples had activity in agonizing the human orexin-2 receptor in the aforementioned IPOne assay with an $EC_{50}$ of about 0.01 nM to 5000 nM. Additional data is provided in the following Examples. Such a result is indicative of the intrinsic activity of the compounds in use as agonists of orexin-1 receptor and/or the orexin-2 receptor. In general, one of ordinary skill in the art would appreciate that a substance is considered to effectively agonize the orexin receptor if it has an $EC_{50}$ in the IPOne assay of less than about 50 µM, or more specifically less than about 1000 nM.

The orexin receptors have been implicated in a wide range of biological functions. This has suggested a potential role for these receptors in a variety of disease processes in humans or other species. The compounds of the present invention could therefore potentially have utility in treating, preventing, ameliorating, controlling or reducing the risk of a variety of disorders associated with orexin receptors, including one or more of the following conditions or diseases: narcolepsy, narcolepsy syndrome accompanied by narcolepsy-like symptoms, cataplexy in narcolepsy, excessive daytime sleepiness (EDS) in narcolepsy, hypersomnia, idiopathic hypersomnia, repeatability hypersomnia, intrinsic hypersomnia, hypersomnia accompanied by daytime hypersomnia, interrupted sleep, sleep apnea, wakefulness, nocturnal myoclonus, disturbances of consciousness, such as coma, REM sleep interruptions, jet-lag, excessive daytime sleepiness, shift workers' sleep disturbances, dyssomnias, sleep disorders, sleep disturbances, hypersomnia associated with depression, emotional/mood disorders, Alzheimer's disease or cognitive impairment, Parkinson's disease, Guillain-Barre syndrome, Kleine Levin syndrome, and sleep disorders which accompany aging; Alzheimer's sundowning; conditions associated with circadian rhythmicity as well as mental and physical disorders associated with travel across time zones and with rotating shift-work schedules; fibromyalgia; cardiac failure; diseases related to bone loss; sepsis; syndromes which are manifested by non-restorative sleep and muscle pain or sleep apnea which is associated with respiratory disturbances during sleep; conditions which result from a diminished quality of sleep; and other diseases related to general orexin system dysfunction.

Thus, in certain embodiments the present invention may provide methods for: treating or controlling narcolepsy, narcolepsy syndrome accompanied by narcolepsy-like symptoms, cataplexy in narcolepsy, excessive daytime sleepiness (EDS) in narcolepsy, hypersomnia, idiopathic hypersomnia, repeatability hypersomnia, intrinsic hypersomnia, hypersomnia accompanied by daytime hypersomnia, interrupted sleep, sleep apnea, disturbances of consciousness, REM sleep interruptions, jet-lag, shift workers' sleep disturbances, dyssomnias, night terror, insomnias associated with depression, emotional/mood disorders, Alzheimer's disease or cognitive impairment; treating or controlling sleep disturbances associated with diseases such as neurological disorders including neuropathic pain and restless leg syndrome; treating or controlling addiction disorders; treating or controlling psychoactive substance use and abuse; enhancing cognition; increasing memory retention; treating or controlling obesity; treating or controlling diabetes and appetite, taste, eating, or drinking disorders; treating or controlling insulin resistance syndrome; treating or controlling hypothalamic diseases; treating or controlling depression; treating, controlling, ameliorating or reducing the risk of epilepsy, including absence epilepsy; treating or controlling pain, including neuropathic pain; treating or controlling Parkinson's disease; treating or controlling Guillain-Barre syndrome; treating or controlling Klein Levin syndrome; treating or controlling psychosis; treating or controlling dysthymic, mood, psychotic and anxiety disorders; treating side effects or complications due to anesthesia; reversal of anesthesia; reversal of anesthesia following surgery; treating or controlling depression, including major depression and major depression disorder; treating or controlling bipolar disorder; or treating, controlling, ameliorating or reducing the risk of schizophrenia, in a mammalian subject which comprises administering to the subject a compound of the present invention.

The compounds of the present invention may also potentially have utility in treating, preventing, ameliorating, controlling or reducing the risk of a variety of other disorders associated with orexin receptors, including one or more of the following conditions or diseases including enhancing sleep quality, improving sleep quality, increasing sleep efficiency, augmenting sleep maintenance; increasing the value which is calculated from the time that a subject sleeps divided by the time that a subject is attempting to sleep; improving sleep initiation; decreasing sleep latency or onset (the time it takes to fall asleep); decreasing difficulties in falling asleep; increasing sleep continuity; decreasing the number of awakenings during sleep; decreasing intermittent wakings during sleep; decreasing nocturnal arousals; decreasing the time spent awake following the initial onset of sleep; increasing the total amount of sleep; reducing the fragmentation of sleep; altering the timing, frequency or duration of REM sleep bouts; altering the timing, frequency or duration of slow wave (i.e. stages 3 or 4) sleep bouts; increasing the amount and percentage of stage 2 sleep; promoting slow wave sleep; enhancing EEG-delta activity during sleep; decreasing nocturnal arousals, especially early morning awakenings; increasing daytime alertness; reducing daytime drowsiness; treating or reducing excessive daytime sleepiness; increasing satisfaction with the intensity of sleep; increasing sleep maintenance; idiopathic insomnia; sleep problems; insomnia; night terror, insomnias associated with depression, emotional/mood disorders, Alzheimer's disease or cognitive impairment, as well as sleep walking and enuresis, and sleep disorders which accompany aging; Alzheimer's sundowning; conditions associated with circadian rhythmicity as well as mental and physical disorders associated with travel across time zones and with rotating shift-work schedules, conditions due to drugs which cause reductions in REM sleep as a side effect; fibromyalgia; syndromes which are manifested by non-restorative sleep and muscle pain or sleep apnea which is associated with respiratory disturbances during sleep; conditions which result from a diminished quality of sleep; increasing learning; augmenting memory; increasing retention of memory; eating disorders associated with excessive food intake and complications associated therewith, compulsive eating disorders, obesity (due to any cause, whether genetic or environmental), obesity-related disorders overeating, anorexia, bulimia, cachexia, dysregulated appetite control, hypertension, diabetes, elevated plasma insulin concentrations and insulin resistance, dyslipidemias, hyperlipidemia, endometrial, breast, prostate and colon cancer, osteoarthritis, obstructive sleep apnea, cholelithiasis, gallstones, heart disease, lung disease, abnormal heart rhythms and arrythmias, myocardial infarction, congestive heart failure, coronary heart disease, acute and congestive heart failure; hypotension; hypertension; urinary retention; osteoporosis; angina pectoris; myocardinal infarction; ischemic or haemorrhagic stroke; subarachnoid haemorrhage; ulcers; allergies; benign prostatic hypertrophy; chronic renal failure; renal disease; impaired glucose tolerance; sudden death, polycystic ovary disease, craniopharyngioma, the Prader-Willi Syndrome, Frohlich's syndrome, GH-deficient subjects, normal variant short stature, Turner's syndrome, and other pathological conditions showing reduced metabolic activity or a decrease in resting energy expenditure as a percentage of total fat-free mass, e.g., children with acute lymphoblastic leukemia, metabolic syndrome, also known as syndrome X, insulin resistance syndrome, reproductive hormone abnormalities, sexual and reproductive dysfunction, such as impaired fertility, infertility, hypogonadism in males and hirsutism in females, fetal defects associated with maternal obesity, gastrointestinal motility disorders, intestinal motility dyskinesias, obesity-related gastro-esophageal reflux, hypothalmic diseases, hypophysis diseases, respiratory disorders, such as obesity-hypoventilation syndrome (Pickwickian syndrome), breathlessness, cardiovascular disorders, inflammation, such as systemic inflammation of the vasculature, arteriosclerosis, hypercholesterolemia, hyperuricaemia, lower back pain, gallbladder disease, gout, kidney cancer, increased anesthetic risk, reducing the risk of secondary outcomes of obesity, such as reducing the risk of left ventricular hypertrophy; diseases or disorders where abnormal oscillatory activity occurs in the brain, including depression, migraine, neuropathic pain, Parkinson's disease, psychosis and schizophrenia, as well as diseases or disorders where there is abnormal coupling of activity, particularly through the thalamus; enhancing cognitive function, including cognitive dysfunctions that comprise deficits in all types of attention, learning and memory functions occurring transiently or chronically in the normal, healthy, young, adult or aging population, and also occurring transiently or chronically in psychiatric, neurologic, cardiovascular and immune disorders; treating or controlling Guillain-Barre syndrome; treating or controlling Klein Levin syndrome; treating or controlling psychosis; treating or controlling dysthymic, mood, psychotic and anxiety disorders; treating complications due to anesthesia; enhancing memory; increasing memory retention; increasing immune response; increasing immune function; hot flashes; night sweats; extending life span; schizophrenia; muscle-related disorders that are controlled by the excitation/relaxation rhythms imposed by the neural system such as cardiac rhythm and other disorders of the cardiovascular system; conditions related to proliferation of cells such as vasodilation or vasorestriction and blood pressure; cancer; cardiac arrhythmia; hypertension; congestive heart failure; conditions of the genital/urinary system; disorders of sexual function and fertility; adequacy of renal function; responsivity to anesthetics; mood disorders, such as depression or more particularly depressive disorders, for example, single episodic or recurrent major depressive disorders and dysthymic disorders, or bipolar disorders, for example, bipolar I disorder, bipolar II disorder and cyclothymic disorder, mood disorders due to a general medical condition, and substance-induced mood disorders; affective neurosis; depressive neurosis; anxiety neurosis; anxiety disorders including acute stress disorder, agoraphobia, generalized anxiety disorder, obsessive-compulsive disorder, panic attack, panic disorder, post-traumatic stress disorder, separation anxiety disorder, social phobia, specific phobia, substance-induced anxiety disorder and anxiety due to a general medical condition; acute neurological and psychiatric disorders such as cerebral deficits subsequent to cardiac bypass surgery and grafting, stroke, ischemic stroke, cerebral ischemia, spinal cord trauma, head trauma, perinatal hypoxia, cardiac arrest, hypoglycemic neuronal damage; Huntington's Chorea; Huntington's disease and Tourette syndrome; Cushing's syndrome/disease; basophile adenoma; prolactinoma; hyperprolactinemia; hypophysis tumor/adenoma; hypothalamic diseases; inflammatory bowel disease; gastric diskinesia; gastric ulcers; Froehlich's syndrome; adrenohypophysis disease; hypophysis disease; adrenohypophysis hypofunction; adrenohypophysis hyperfunction; hypothalamic hypogonadism; Kallman's syndrome (anosmia, hyposmia); functional or psychogenic amenorrhea; hypopituitarism; hypothalamic hypothyroidism; hypothalamic-adrenal dysfunction; idiopathic hyperprolactinemia; hypothalamic disorders of growth hormone deficiency; idiopathic growth deficiency; dwarfism; gigantism; acromegaly; amyotrophic lateral sclerosis; multiple sclerosis; ocular damage; retinopathy; cognitive disorders; idiopathic and drug-induced Parkinson's disease; muscular spasms and disorders associated with muscular spasticity including tremors, epilepsy, convulsions, seizure disorders, absence seisures, complex partial and generalized seizures; Lennox-Gastaut syndrome; cognitive disorders including dementia (associated with Alzheimer's disease, ischemia, trauma, vascular problems or stroke, HIV disease, Parkinson's disease, Huntington's disease, Pick's disease, Creutzfeldt-Jacob disease, perinatal hypoxia, other general medical conditions or substance abuse); delirium, amnestic disorders or age related cognitive decline; schizophrenia or psychosis including schizophrenia (paranoid, disorganized, catatonic or undifferentiated), schizophreniform disorder, schizoaffective disorder, delusional disorder, brief psychotic disorder, shared psychotic disorder, psychotic disorder due to a general medical condition and substance-induced psychotic disorder; dissociative disorders including multiple personality syndromes and psychogenic amnesias; substance-related disorders, substance use, substance abuse, substance seeking, substance reinstatement, all types of psychological and physical addictions and addictive behaviors, reward-related behaviors (including substance-induced delirium, persisting dementia, persisting amnestic disorder, psychotic disorder or anxiety disorder; tolerance, addictive feeding, addictive feeding behaviors, binge/purge feeding behaviors, dependence, withdrawal or relapse from substances including alcohol, amphetamines, cannabis, cocaine, hallucinogens, inhalants, morphine, nicotine, opioids, phencyclidine, sedatives, hypnotics or anxiolytics); appetite, taste, eating or drinking disorders; movement disorders, including akinesias and akinetic-rigid syndromes (including Parkinson's disease, drug-induced parkinsonism, postencephalitic parkinsonism, progressive supranuclear palsy, multiple system atrophy, corticobasal degeneration, parkinsonism-ALS dementia complex and basal ganglia calcification), chronic fatigue syndrome, fatigue, including Parkinson's fatigue, multiple sclerosis fatigue, fatigue caused by a sleep disorder or a circadian rhythm disorder, medication-induced parkinsonism (such as neuroleptic-induced parkinsonism, neuroleptic malignant syndrome, neuroleptic-induced acute dystonia, neuroleptic-induced acute akathisia, neuroleptic-induced tardive dyskinesia and medication-induced postural tremor), Gilles de la Tourette's syndrome, epilepsy, and dyskinesias (including tremor (such as rest tremor, essential tremor, postural tremor and intention tremor), chorea (such as Sydenham's chorea, Huntington's disease, benign hereditary chorea, neuroacanthocytosis, symptomatic chorea, drug-induced chorea and hemiballism), myoclonus (including generalised myoclonus and focal myoclonus), tics (including simple tics, complex tics and symptomatic tics), restless leg syndrome and dystonia (including generalised dystonia such as iodiopathic dystonia, drug-induced dystonia, symptomatic dystonia and paroxymal dystonia, and focal dystonia such as blepharospasm, oromandibular dystonia, spasmodic dysphonia, spasmodic torticollis, axial dystonia, dystonic writer's cramp and hemiplegic dystonia); neurodegenerative disorders including nosological entities such as disinhibition-dementia-parkinsonism-amyotrophy complex; pallido-ponto-nigral degeneration; epilepsy; seizure disorders; attention deficit/hyperactivity disorder (ADHD); conduct disorder; migraine (including migraine headache); headache; hyperalgesia; pain; enhanced or exaggerated sensitivity to pain such as hyperalgesia, causalgia, and allodynia; acute pain; burn pain; atypical facial pain; neuropathic pain; back pain; complex regional pain syndrome I and II; arthritic pain; sports injury pain; pain related to infection e.g. HIV, post-chemotherapy pain; post-stroke pain; post-operative pain; neuralgia; emesis, nausea, vomiting; gastric dyskinesia; gastric ulcers; Kallman's syndrome (anosmia); asthma; cancer; conditions associated with visceral pain such as irritable bowel syndrome, and angina; eating disorders; urinary incontinence; substance tolerance, substance withdrawal (including, substances such as opiates, nicotine, tobacco products, alcohol, benzodiazepines, cocaine, sedatives, hypnotics, etc.); psychosis; schizophrenia; anxiety (including generalized anxiety disorder, panic disorder, and obsessive compulsive disorder); mood disorders (including depression, mania, bipolar disorders); trigeminal neuralgia; hearing loss; tinnitus; neuronal damage including ocular damage; retinopathy; macular degeneration of the eye; emesis; brain edema; pain, including acute and chronic pain states, severe pain, intractable pain, inflammatory pain, neuropathic pain, post-traumatic pain, bone and joint pain (osteoarthritis), repetitive motion pain, dental pain, cancer pain, myofascial pain (muscular injury, fibromyalgia), perioperative pain (general surgery, gynecological), chronic pain, neuropathic pain, post-traumatic pain, trigeminal neuralgia, migraine and migraine headache and other diseases related to general orexin system dysfunction.

The subject compounds could further be of potential use in a method for the prevention, treatment, control, amelioration, or reduction of risk of the diseases, disorders and conditions noted herein. The dosage of active ingredient in the compositions of this invention may be varied, however, it is necessary that the amount of the active ingredient be such that a suitable dosage form is obtained. The active ingredient may be administered to subjects (animals and human) in need of such treatment in dosages that will provide optimal pharmaceutical efficacy. The selected dosage depends upon the desired therapeutic effect, on the route of administration, and on the duration of the treatment. The dose will vary from subject to subject depending upon the nature and severity of disease, the subject's weight, special diets then being followed by a subject, concurrent medication, and other factors which those skilled in the art will recognize.

Generally, dosage levels of between 0.0001 to 100 mg/kg. of body weight daily are administered to the subject, e.g., humans, adolescent humans and elderly humans, to obtain effective agonism of orexin receptors. The dosage range will generally be about 0.5 mg to 10.0 g. per subject per day which may be administered in single or multiple doses. In one embodiment, the dosage range will be about 0.5 mg to 500 mg per subject per day; in another embodiment about 0.5 mg to 200 mg per subject per day; and in yet another embodiment about 5 mg to 50 mg per subject per day.

Pharmaceutical compositions of the present invention may be provided in a solid dosage formulation such as comprising about 0.5 mg to 500 mg active ingredient, or comprising about 1 mg to 250 mg active ingredient. The pharmaceutical composition may be provided in a solid dosage formulation comprising about 1 mg, 5 mg, 10 mg, 25 mg, 30 mg, 50 mg, 80 mg, 100 mg, 200 mg or 250 mg active ingredient. For oral administration, the compositions may be provided in the form of tablets containing 1.0 to 1000 milligrams of the active ingredient, such as 1, 5, 10, 15, 20, 25, 50, 75, 100, 150, 200, 250, 300, 400, 500, 600, 750, 800, 900, and 1000 milligrams of the active ingredient for the symptomatic adjustment of the dosage to the subject to be treated. The compounds may be administered on a regimen of 1 to 4 times per day, such as once or twice per day. The compounds may be administered once or multiple times during the day. The compounds may be administered upon awakening or otherwise in the morning, or during waking hours. For example, the compounds may be administered about 1 hour after awakening, about 30 minutes after awakening or immediately after awakening.

The compounds of the present invention may be used in combination with one or more other drugs in the treatment, prevention, control, amelioration, or reduction of risk of diseases or conditions for which compounds of the present invention or the other drugs may have utility, where the combination of the drugs together are safer or more effective than either drug alone. Such other drug(s) may be administered, by a route and in an amount commonly used therefor, contemporaneously or sequentially with a compound of the present invention. When a compound of the present invention is used contemporaneously with one or more other drugs, a pharmaceutical composition in unit dosage form containing such other drugs and the compound of the present invention is contemplated. However, the combination therapy may also include therapies in which the compound of the present invention and one or more other drugs are administered on different overlapping schedules. It is also contemplated that when used in combination with one or more other active ingredients, the compounds of the present invention and the other active ingredients may be used in lower doses than when each is used singly. Accordingly, the pharmaceutical compositions of the present invention include those that contain one or more other active ingredients, in addition to a compound of the present invention. The above combinations include combinations of a compound of the present invention not only with one other active compound, but also with two or more other active compounds.

The weight ratio of the compound of the present invention to the second active ingredient may be varied and will depend upon the effective dose of each ingredient. Generally, an effective dose of each will be used. Thus, for example, when a compound of the present invention is combined with another agent, the weight ratio of the compound of the present invention to the other agent will generally range from about 1000:1 to about 1:1000, such as about 200:1 to about 1:200. Combinations of a compound of the present invention and other active ingredients will generally also be within the aforementioned range, but in each case, an effective dose of each active ingredient should be used. In such combinations the compound of the present invention and other active agents may be administered separately or in conjunction. In addition, the administration of one element may be prior to, concurrent to, or subsequent to the administration of other agent(s).

The compounds of the present invention may be administered in combination with compounds which are known in the art to be useful for treating or controlling narcolepsy, including e.g., methylphenidate, amphetamine, pemoline, phenelzine, protriptyline, gamma-hydroxybutyric acid, sodium oxybate, or other oxybate salts, modafinil, armodafinil, caffeine, and salts thereof, and combinations thereof, and the like.

The compounds of the present invention may be administered in combination with compounds which are known in the art to be useful for preventing and treating sleep disorders and sleep disturbances, including e.g., sedatives, hypnotics, anxiolytics, antipsychotics, antianxiety agents, antihistamines, benzodiazepines, barbiturates, cyclopyrrolones, GABA agonists, 5HT-2 antagonists including 5HT-2A antagonists and 5HT-2A/2C antagonists, histamine antagonists including histamine H3 antagonists, histamine H3 inverse agonists, imidazopyridines, minor tranquilizers, melatonin agonists and antagonists, melatonergic agents, orexin antagonists, other orexin agonists, prokineticin agonists and antagonists, pyrazolopyrimidines, T-type calcium channel antagonists, triazolopyridines, and the like, such as: adinazolam, allobarbital, alonimid, alprazolam, amitriptyline, amobarbital, amoxapine, armodafinil, APD-125, bentazepam, benzoctamine, brotizolam, bupropion, busprione, butabarbital, butalbital, capromorelin, capuride, carbocloral, chloral betaine, chloral hydrate, chlordiazepoxide, clomipramine, clonazepam, cloperidone, clorazepate, clorethate, clozapine, conazepam, cyprazepam, desipramine, dexclamol, diazepam, dichloralphenazone, divalproex, diphenhydramine, doxepin, EMD-281014, eplivanserin, estazolam, eszopiclone, ethchlorynol, etomidate, fenobam, flunitrazepam, flurazepam, fluvoxamine, fluoxetine, fosazepam, gaboxadol, glutethimide, halazepam, hydroxyzine, ibutamoren, imipramine, indiplon, lithium, lorazepam, lormetazepam, LY-156735, maprotiline, MDL-100907, mecloqualone, melatonin, mephobarbital, meprobamate, methaqualone, methyprylon, midaflur, midazolam, modafinil, nefazodone, NGD-2-73, nisobamate, nitrazepam, nortriptyline, ornortriptyline, oxazepam, paraldehyde, paroxetine, pentobarbital, perlapine, perphenazine, phenelzine, phenobarbital, prazepam, promethazine, propofol, protriptyline, quazepam, ramelteon, reclazepam, roletamide, secobarbital, sertraline, suproclone, TAK-375, temazepam, thioridazine, tiagabine, tracazolate, tranylcypromaine, trazodone, triazolam, trepipam, tricetamide, triclofos, trifluoperazine, trimetozine, trimipramine, uldazepam, venlafaxine, zaleplon, zolazepam, zopiclone, zolpidem, and salts thereof, and combinations thereof, and the like, or the compound of the present invention may be administered in conjunction with the use of physical methods such as with light therapy or electrical stimulation.

In another embodiment, the subject compound may be employed in combination with other compounds which are known in the art, either administered separately or in the same pharmaceutical compositions, including, but are not limited to: insulin sensitizers including (i) PPARγ antagonists such as glitazones (e.g. ciglitazone; darglitazone; englitazone; isaglitazone (MCC-555); pioglitazone; rosiglitazone; troglitazone; tularik; BRL49653; CLX-0921; 5-BTZD), GW-0207, LG-100641, and LY-300512, and the like); (iii) biguanides such as metformin and phenformin; (b) insulin or insulin mimetics, such as biota, LP-100, novarapid, insulin detemir, insulin lispro, insulin glargine, insulin zinc suspension (lente and ultralente); Lys-Pro insulin, GLP-1 (73-7) (insulintropin); and GLP-1 (7-36)—NH$_2$); (c) sulfonylureas, such as acetohexamide; chlorpropamide;

diabinese; glibenclamide; glipizide; glyburide; glimepiride; gliclazide; glipentide; gliquidone; glisolamide; tolazamide; and tolbutamide; (d) α-glucosidase inhibitors, such as acarbose, adiposine, camiglibose; emiglitate; miglitol; voglibose; pradimicin-Q; salbostatin; CKD-711; MDL-25,637; MDL-73,945; and MOR 14, and the like; (e) cholesterol lowering agents such as (i) HMG-CoA reductase inhibitors (atorvastatin, itavastatin, fluvastatin, lovastatin, pravastatin, rivastatin, rosuvastatin, simvastatin, and other statins), (ii) bile acid absorbers/sequestrants, such as cholestyramine, colestipol, dialkylaminoalkyl derivatives of a cross-linked dextran; Colestid®; LoCholest®, and the like, (ii) nicotinyl alcohol, nicotinic acid or a salt thereof, (iii) proliferator-activater receptor α agonists such as fenofibric acid derivatives (gemfibrozil, clofibrate, fenofibrate and benzafibrate), (iv) inhibitors of cholesterol absorption such as stanol esters, beta-sitosterol, sterol glycosides such as tiqueside; and azetidinones such as ezetimibe, and the like, and (acyl CoA:cholesterol acyltransferase (ACAT)) inhibitors such as avasimibe, and melinamide, (v) anti-oxidants, such as probucol, (vi) vitamin E, and (vii) thyromimetics; (f) PPARα agonists such as beclofibrate, benzafibrate, ciprofibrate, clofibrate, etofibrate, fenofibrate, and gemfibrozil; and other fabric acid derivatives, such as Atromid®, Lopid® and Tricor®, and the like, and PPARα agonists as described in WO 97/36579; (g) PPARδ agonists, such as those disclosed in WO97/28149; (h) PPAR α/δ agonists, such as muraglitazar, and the compounds disclosed in U.S. Pat. No. 6,414, 002; (i) anti-obesity agents, such as (1) growth hormone secretagogues, growth hormone secretagogue receptor agonists/antagonists, such as NN703, hexarelin, MK-0677, SM-130686, CP-424,391, L-692,429, and L-163,255, and such as those disclosed in U.S. Pat. Nos. 5,536,716, and 6,358,951, U.S. Patent Application Nos. 2002/049196 and 2002/022637, and PCT Application Nos. WO 01/56592 and WO 02/32888; (2) protein tyrosine phosphatase-1B (PTP-1B) inhibitors; (3) cannabinoid receptor ligands, such as cannabinoid $CB_1$ receptor antagonists or inverse agonists, such as rimonabant, taranabant, AMT-251, and SR-14778 and SR 141716A (Sanofi Synthelabo), SLV-319 (Solvay), BAY 65-2520 (Bayer) and those disclosed in U.S. Pat. Nos. 5,532,237, 4,973,587, 5,013,837, 5,081,122, 5,112,820, 5,292,736, 5,624,941, 6,028,084, PCT Application Nos. WO 96/33159, WO 98/33765, WO98/43636, WO98/43635, WO 01/09120, WO98/31227, WO98/41519, WO98/37061, WO00/10967, WO00/10968, WO97/29079, WO99/02499, WO 01/58869, WO 01/64632, WO 01/64633, WO 01/64634, WO02/076949, WO 03/007887, WO 04/048317, and WO 05/000809; (4) anti-obesity serotonergic agents, such as fenfluramine, dexfenfluramine, phentermine, and sibutramine; (5) β3-adrenoreceptor agonists, such as AD9677/TAK677 (Dainippon/Takeda), CL-316,243, SB 418790, BRL-37344, L-796568, BMS-196085, BRL-35135A, CGP12177A, BTA-243, Trecadrine, Zeneca D7114, SR 59119A; (6) pancreatic lipase inhibitors, such as orlistat (Xenical®), Triton WR1339, RHC80267, lipstatin, tetrahydrolipstatin, teasaponin, diethylumbelliferyl phosphate, and those disclosed in PCT Application No. WO 01/77094; (7) neuropeptide Y1 antagonists, such as BIBP3226, J-115814, BIBO 3304, LY-357897, CP-671906, GI-264879A, and those disclosed in U.S. Pat. No. 6,001, 836, and PCT Patent Publication Nos. WO 96/14307, WO 01/23387, WO 99/51600, WO 01/85690, WO 01/85098, WO 01/85173, and WO 01/89528; (8) neuropeptide Y5 antagonists, such as GW-569180A, GW-594884A, GW-587081X, GW-548118X, FR226928, FR 240662, FR252384, 1229U91, GI-264879A, CGP71683A, LY-377897, PD-160170, SR-120562A, SR-120819A and JCF-104, and those disclosed in U.S. Pat. Nos. 6,057,335; 6,043,246; 6,140,354; 6,166,038; 6,180,653; 6,191,160; 6,313,298; 6,335,345; 6,337,332; 6,326,375; 6,329,395; 6,340,683; 6,388,077; 6,462,053; 6,649,624; and 6,723,847, European Patent Nos. EP-01010691, and EP-01044970; and PCT International Patent Publication Nos. WO 97/19682, WO 97/20820, WO 97/20821, WO 97/20822, WO 97/20823, WO 98/24768; WO 98/25907; WO 98/25908; WO 98/27063, WO 98/47505; WO 98/40356; WO 99/15516; WO 99/27965; WO 00/64880, WO 00/68197, WO 00/69849, WO 01/09120, WO 01/14376; WO 01/85714, WO 01/85730, WO 01/07409, WO 01/02379, WO 01/02379, WO 01/23388, WO 01/23389, WO 01/44201, WO 01/62737, WO 01/62738, WO 01/09120, WO 02/22592, WO 0248152, and WO 02/49648; WO 02/094825; WO 03/014083; WO 03/10191; WO 03/092889; WO 04/002986; and WO 04/031175; (9) melanin-concentrating hormone (MCH) receptor antagonists, such as those disclosed in WO 01/21577 and WO 01/21169; (10) melanin-concentrating hormone 1 receptor (MCH1R) antagonists, such as T-226296 (Takeda), and those disclosed in PCT Patent Application Nos. WO 01/82925, WO 01/87834, WO 02/051809, WO 02/06245, WO 02/076929, WO 02/076947, WO 02/04433, WO 02/51809, WO 02/083134, WO 02/094799, WO 03/004027; (11) melanin-concentrating hormone 2 receptor (MCH2R) agonist/antagonists; (12) orexin receptor antagonists, such as SB-334867-A, and those disclosed in patent publications herein; (13) serotonin reuptake inhibitors such as fluoxetine, paroxetine, and sertraline; (14) melanocortin agonists, such as Melanotan II; (15) Mc4r (melanocortin 4 receptor) agonists, such as CHIR86036 (Chiron), ME-10142, and ME-10145 (Melacure), CHIR86036 (Chiron); PT-141, and PT-14 (Palatin); (16) 5HT-2 agonists; (17) 5HT2C (serotonin receptor 2C) agonists, such as BVT933, DPCA37215, WAY161503, R-1065, and those disclosed in U.S. Pat. No. 3,914,250, and PCT Application Nos. WO 02/36596, WO 02/48124, WO 02/10169, WO 01/66548, WO 02/44152, WO 02/51844, WO 02/40456, and WO 02/40457; (18) galanin antagonists; (19) CCK agonists; (20) CCK-A (cholecystokinin-A) agonists, such as AR-R 15849, GI 181771, JMV-180, A-71378, A-71623 and SR14613, and those described in U.S. Pat. No. 5,739,106; (21) GLP-1 agonists; (22) corticotropin-releasing hormone agonists; (23) histamine receptor-3 (H3) modulators; (24) histamine receptor-3 (H3) antagonists/inverse agonists, such as hioperamide, 3-(1H-imidazol-4-yl)propyl N-(4-pentenyl)carbamate, clobenpropit, iodophenpropit, imoproxifan, GT2394 (Gliatech), and O-[3-(1H-imidazol-4-yl)propanol]-carbamates; (25) (β-hydroxy steroid dehydrogenase-1 inhibitors (β-HSD-1); (26) PDE (phosphodiesterase) inhibitors, such as theophylline, pentoxifylline, zaprinast, sildenafil, amrinone, milrinone, cilostamide, rolipram, and cilomilast; (27) phosphodiesterase-3B (PDE3B) inhibitors; (28) NE (norepinephrine) transport inhibitors, such as GW 320659, despiramine, talsupram, and nomifensine; (29) ghrelin receptor antagonists, such as those disclosed in PCT Application Nos. WO 01/87335, and WO 02/08250; (30) leptin, including recombinant human leptin (PEG-OB, Hoffman La Roche) and recombinant methionyl human leptin (Amgen); (31) leptin derivatives; (32) BRS3 (bombesin receptor subtype 3) agonists such as [D-Phe6, beta-Ala11,Phe13,Nle14]Bn(6-14) and [D-Phe6,Phe13]Bn (6-13)propylamide, and those compounds disclosed in Pept. Sci. 2002 August; 8(8): 461-75); (33) CNTF (Ciliary neurotrophic factors); such as GI-181771 (Glaxo-SmithKline), SR146131 (Sanofi Synthelabo), butabindide, PD170,292, and PD 149164 (Pfizer); (34) CNTF derivatives, such as axokine (Regeneron); (35) monoamine reuptake inhibitors, such as sibutramine; (36) UCP-1 (uncoupling protein-1), 2, or 3 activators, such as phytanic acid, 4-[(E)-2-(5,6,7,8-tetrahydro-5,5,8,8-tetramethyl-2-napthalenyl)-1-propenyl] benzoic acid (TTNPB), retinoic acid; (37) thyroid hormone β agonists, such as KB-2611 (KaroBioBMS); (38) FAS (fatty acid synthase) inhibitors, such as Cerulenin and C75; (39) DGAT1 (diacylglycerol acyltransferase 1) inhibitors; (40) DGAT2 (diacylglycerol acyltransferase 2) inhibitors; (41) ACC2 (acetyl-CoA carboxylase-2) inhibitors; (42) glucocorticoid antagonists; (43) acyl-estrogens, such as oleoyl-estrone, disclosed in del Mar-Grasa, M. et al., Obesity Research, 9:202-9 (2001); (44) dipeptidyl peptidase IV (DP-IV) inhibitors, such as isoleucine thiazolidide, valine pyrrolidide, NVP-DPP728, LAF237, P93/01, TSL 225, TMC-2A/2B/2C, FE 999011, P9310/K364, VIP 0177, SDZ 274-444, sitagliptin; and the compounds disclosed in U.S. Pat. No. 6,699,871, WO 03/004498; WO 03/004496; EP 1 258 476; WO 02/083128; WO 02/062764; WO 03/000250; WO 03/002530; WO 03/002531; WO 03/002553; WO 03/002593; WO 03/000180; and WO 03/000181; (46) dicarboxylate transporter inhibitors; (47) glucose transporter inhibitors; (48) phosphate transporter inhibitors; (49) Metformin (Glucophage®); (50) Topiramate (Topimax®); (50) peptide YY, PYY 3-36, peptide YY analogs, derivatives, and fragments such as BIM-43073D, BIM-43004C (Olitvak, D. A. et al., Dig. Dis. Sci. 44(3):643-48 (1999)); (51) Neuropeptide Y2 (NPY2) receptor agonists such NPY3-36, N acetyl [Leu(28,31)] NPY 24-36, TASP-V, and cyclo-(28/32)—Ac-[Lys28-Glu32]-(25-36)-pNPY; (52) Neuropeptide Y4 (NPY4) agonists such as pancreatic peptide (PP), and other Y4 agonists such as 1229U91; (54) cyclooxygenase-2 inhibitors such as etoricoxib, celecoxib, valdecoxib, parecoxib, lumiracoxib, BMS347070, tiracoxib or JTE522, ABT963, CS502 and GW406381; (55) Neuropeptide Y1 (NPY1) antagonists such as BIBP3226, J-115814, BIBO 3304, LY-357897, CP-671906, GI-264879A; (56) Opioid antagonists such as nalmefene (Revex®)), 3-methoxynaltrexone, naloxone, naltrexone; (57) 11β HSD-1 (11-beta hydroxy steroid dehydrogenase type 1) inhibitors such as BVT 3498, BVT 2733, and those disclosed in WO 01/90091, WO 01/90090, WO 01/90092, U.S. Pat. No. 6,730,690 and US 2004-0133011; (58) aminorex; (59) amphechloral; (60) amphetamine; (61) benzphetamine; (62) chlorphentermine; (63) clobenzorex; (64) cloforex; (65) clominorex; (66) clortermine; (67) cyclexedrine; (68) dextroamphetamine; (69) diphemethoxidine, (70) N-ethylamphetamine; (71) fenbutrazate; (72) fenisorex; (73) fenproporex; (74) fludorex; (75) fluminorex; (76) furfurylmethylamphetamine; (77) levamfetamine; (78) levophacetoperane; (79) mefenorex; (80) metamfepramone; (81) methamphetamine; (82) norpseudoephedrine; (83) pentorex; (84) phendimetrazine; (85) phenmetrazine; (86) picilorex; (87) phytopharm 57; and (88) zonisamide, (89) neuromedin U and analogs or derivatives thereof, (90) oxyntomodulin and analogs or derivatives thereof, and (91) Neurokinin-1 receptor antagonists (NK-1 antagonists) such as the compounds disclosed in: U.S. Pat. Nos. 5,162,339, 5,232,929, 5,242,930, 5,373,003, 5,387,595, 5,459,270, 5,494,926, 5,496,833, and 5,637,699.

In another embodiment, the subject compound may be employed in combination with an anti-depressant or anti-anxiety agent, including norepinephrine reuptake inhibitors (including tertiary amine tricyclics and secondary amine tricyclics), selective serotonin reuptake inhibitors (SSRIs), monoamine oxidase inhibitors (MAOIs), reversible inhibitors of monoamine oxidase (RIMAs), serotonin and noradrenaline reuptake inhibitors (SNRIs), corticotropin releasing factor (CRF) antagonists, α-adrenoreceptor antagonists, neurokinin-1 receptor antagonists, atypical anti-depressants, benzodiazepines, 5-HT$_{1A}$ agonists or antagonists, especially 5-HT$_{1A}$ partial agonists, and corticotropin releasing factor (CRF) antagonists. Specific agents include: amitriptyline, clomipramine, doxepin, imipramine and trimipramine; amoxapine, desipramine, maprotiline, nortriptyline and protriptyline; citalopram, duloxetine, fluoxetine, fluvoxamine, paroxetine and sertraline; isocarboxazid, phenelzine, tranylcypromine and selegiline; moclobemide: venlafaxine; aprepitant; bupropion, lithium, nefazodone, trazodone and viloxazine; alprazolam, chlordiazepoxide, clonazepam, chlorazepate, diazepam, halazepam, lorazepam, oxazepam and prazepam; buspirone, flesinoxan, gepirone and ipsapirone, and pharmaceutically acceptable salts thereof.

In another embodiment, the subject compound may be employed in combination with anti-Alzheimer's agents; beta-secretase inhibitors, such as verubecestat; gamma-secretase inhibitors; growth hormone secretagogues; recombinant growth hormone; HMG-CoA reductase inhibitors; NSAID's including ibuprofen; vitamin E; anti-amyloid antibodies; CB-1 receptor antagonists or CB-1 receptor inverse agonists; antibiotics such as doxycycline and rifampin; N-methyl-D-aspartate (NMDA) receptor antagonists, such as memantine; cholinesterase inhibitors such as galantamine, rivastigmine, donepezil, and tacrine; growth hormone secretagogues such as ibutamoren, ibutamoren mesylate, and capromorelin; histamine H$_3$ antagonists; AMPA agonists; PDE IV inhibitors; GABA$_A$ inverse agonists; or neuronal nicotinic agonists.

In another embodiment, the subject compound may be employed in combination with sedatives, hypnotics, anxiolytics, antipsychotics, antianxiety agents, cyclopyrrolones, imidazopyridines, pyrazolopyrimidines, minor tranquilizers, melatonin agonists and antagonists, melatonergic agents, benzodiazepines, barbiturates, 5HT-2 antagonists, and the like, such as: adinazolam, allobarbital, alonimid, alprazolam, amitriptyline, amobarbital, amoxapine, bentazepam, benzoctamine, brotizolam, bupropion, busprione, butabarbital, butalbital, capuride, carbocloral, chloral betaine, chloral hydrate, chlordiazepoxide, clomipramine, clonazepam, cloperidone, clorazepate, clorethate, clozapine, cyprazepam, desipramine, dexclamol, diazepam, dichloralphenazone, divalproex, diphenhydramine, doxepin, estazolam, ethchlorvynol, etomidate, fenobam, flunitrazepam, flurazepam, fluvoxamine, fluoxetine, fosazepam, glutethimide, halazepam, hydroxyzine, imipramine, lithium, lorazepam, lormetazepam, maprotiline, mecloqualone, melatonin, mephobarbital, meprobamate, methaqualone, midaflur, midazolam, nefazodone, nisobamate, nitrazepam, nortriptyline, oxazepam, paraldehyde, paroxetine, pentobarbital, perlapine, perphenazine, phenelzine, phenobarbital, prazepam, promethazine, propofol, protriptyline, quazepam, reclazepam, roletamide, secobarbital, sertraline, suproclone, temazepam, thioridazine, tracazolate, tranylcypromaine, trazodone, triazolam, trepipam, tricetamide, triclofos, trifluoperazine, trimetozine, trimipramine, uldazepam, venlafaxine, zaleplon, zolazepam, zolpidem, and salts thereof, and combinations thereof, and the like, or the subject compound may be administered in conjunction with the use of physical methods such as with light therapy or electrical stimulation.

In another embodiment, the subject compound may be employed in combination with acetophenazine, alentemol, benzhexol, bromocriptine, biperiden, chlorpromazine, chlorprothixene, clozapine, diazepam, fenoldopam, fluphenazine, haloperidol, levodopa, levodopa with benserazide, levodopa with carbidopa, lisuride, loxapine, mesoridazine, molindolone, naxagolide, olanzapine, pergolide, perphenazine, pimozide, pramipexole, risperidone, sulpiride, tetrabenazine, trihexyphenidyl, thioridazine, thiothixene or trifluoperazine.

In another embodiment, the subject compound may be employed in combination with a compound from the phenothiazine, thioxanthene, heterocyclic dibenzazepine, butyrophenone, diphenylbutylpiperidine and indolone classes of neuroleptic agent. Suitable examples of phenothiazines include chlorpromazine, mesoridazine, thioridazine, acetophenazine, fluphenazine, perphenazine and trifluoperazine. Suitable examples of thioxanthenes include chlorprothixene and thiothixene. An example of a dibenzazepine is clozapine. An example of a butyrophenone is haloperidol. An example of a diphenylbutylpiperidine is pimozide. An example of an indolone is molindolone. Other neuroleptic agents include loxapine, sulpiride and risperidone.

In another embodiment, the subject compound may be employed in combination with a nicotine agonist or a nicotine receptor partial agonist such as varenicline, opioid antagonists (e.g., naltrexone (including naltrexone depot), antabuse, and nalmefene), dopaminergic agents (e.g., apomorphine), ADD/ADHD agents (e.g., methylphenidate hydrochloride (e.g., Ritalin® and Concerta®), atomoxetine (e.g., Strattera®), a monoamine oxidase inhibitor (MAOI), amphetamines (e.g., Adderall®)) and anti-obesity agents, such as apo-B/MTP inhibitors, 11Beta-hydroxy steroid dehydrogenase-1 (11Beta-HSD type 1) inhibitors, peptide YY3-36 or analogs thereof, MCR-4 agonists, CCK-A agonists, monoamine reuptake inhibitors, sympathomimetic agents, β3 adrenergic receptor agonists, dopamine receptor agonists, melanocyte-stimulating hormone receptor analogs, 5-HT2c receptor agonists, melanin concentrating hormone receptor antagonists, leptin, leptin analogs, leptin receptor agonists, galanin receptor antagonists, lipase inhibitors, bombesin receptor agonists, neuropeptide-Y receptor antagonists (e.g., NPY Y5 receptor antagonists), thyromimetic agents, dehydroepiandrosterone or analogs thereof, glucocorticoid receptor antagonists, orexin receptor antagonists, such as suvorexant, other orexin agonists, glucagon-like peptide-1 receptor agonists, ciliary neurotrophic factors, human agouti-related protein antagonists, ghrelin receptor antagonists, histamine 3 receptor antagonists or inverse agonists, and neuromedin U receptor agonists, and pharmaceutically acceptable salts thereof.

In another embodiment, the subject compound may be employed in combination with an agent such as aminorex, amphechloral, amphetamine, benzphetamine, chlorphentermine, clobenzorex, cloforex, clominorex, clortermine, cyclexedrine, dexfenfluramine, dextroamphetamine, diethylpropion, diphemethoxidine, N-ethylamphetamine, fenbutrazate, fenfluramine, fenisorex, fenproporex, fludorex, fluminorex, furfurylmethylamphetamine, levamfetamine, levophacetoperane, mazindol, mefenorex, metamfepramone, methamphetamine, norpseudoephedrine, pentorex, phendimetrazine, phenmetrazine, phentermine, phenylpropanolamine, picilorex and sibutramine; selective serotonin reuptake inhibitor (SSRI); halogenated amphetamine derivatives, including chlorphentermine, cloforex, clortermine, dexfenfluramine, fenfluramine, picilorex and sibutramine; and pharmaceutically acceptable salts thereof.

In another embodiment, the subject compound may be employed in combination with an opiate agonist, a lipoxygenase inhibitor, such as an inhibitor of 5-lipoxygenase, a cyclooxygenase inhibitor, such as a cyclooxygenase-2 inhibitor, an interleukin inhibitor, such as an interleukin-1 inhibitor, an NMDA antagonist, an inhibitor of nitric oxide or an inhibitor of the synthesis of nitric oxide, a non-steroidal antiinflammatory agent, or a cytokine-suppressing antiinflammatory agent, for example with a compound such as acetaminophen, aspirin, codiene, fentanyl, ibuprofen, indomethacin, ketorolac, morphine, naproxen, phenacetin, piroxicam, a steroidal analgesic, sufentanyl, sunlindac, tenidap, and the like. Similarly, the subject compound may be administered with a pain reliever; a potentiator such as caffeine, an H2-antagonist, simethicone, aluminum or magnesium hydroxide; a decongestant such as phenylephrine, phenylpropanolamine, pseudophedrine, oxymetazoline, ephinephrine, naphazoline, xylometazoline, propylhexedrine, or levo-desoxy-ephedrine; an antiitussive such as codeine, hydrocodone, caramiphen, carbetapentane, or dextramethorphan; a diuretic; and a sedating or non-sedating antihistamine.

The compounds of the present invention may be administered by oral, parenteral (e.g., intramuscular, intraperitoneal, intravenous, ICV, intracisternal injection or infusion, subcutaneous injection, or implant), by inhalation spray, nasal, vaginal, rectal, sublingual, or topical routes of administration and may be formulated, alone or together, in suitable dosage unit formulations containing conventional non-toxic pharmaceutically acceptable carriers, adjuvants and vehicles appropriate for each route of administration. In addition to the treatment of warm-blooded animals such as mice, rats, horses, cattle, sheep, dogs, cats, monkeys, etc., the compounds of the invention may be effective for use in humans.

The pharmaceutical compositions for the administration of the compounds of this invention may conveniently be presented in dosage unit form and may be prepared by any of the methods well known in the art of pharmacy. All methods include the step of bringing the active ingredient into association with the carrier which constitutes one or more accessory ingredients. In general, the pharmaceutical compositions are prepared by uniformly and intimately bringing the active ingredient into association with a liquid carrier or a finely divided solid carrier or both, and then, if necessary, shaping the product into the desired formulation. In the pharmaceutical composition the active object compound is included in an amount sufficient to produce the desired effect upon the process or condition of diseases. As used herein, the term "composition" is intended to encompass a product comprising the specified ingredients in the specified amounts, as well as any product which results, directly or indirectly, from combination of the specified ingredients in the specified amounts.

Pharmaceutical compositions intended for oral use may be prepared according to any method known to the art for the manufacture of pharmaceutical compositions and such compositions may contain one or more agents selected from the group consisting of sweetening agents, flavoring agents, coloring agents and preserving agents in order to provide pharmaceutically elegant and palatable preparations. Tablets contain the active ingredient in admixture with non-toxic pharmaceutically acceptable excipients which are suitable for the manufacture of tablets. These excipients may be for example, inert diluents, such as calcium carbonate, sodium carbonate, lactose, calcium phosphate or sodium phosphate; granulating and disintegrating agents, for example, corn starch, or alginic acid; binding agents, for example starch, gelatin or acacia, and lubricating agents, for example magnesium stearate, stearic acid or talc. The tablets may be uncoated or they may be coated by known techniques to delay disintegration and absorption in the gastrointestinal tract and thereby provide a sustained action over a longer period. Compositions for oral use may also be presented as hard gelatin capsules wherein the active ingredient is mixed with an inert solid diluent, for example, calcium carbonate, calcium phosphate or kaolin, or as soft gelatin capsules wherein the active ingredient is mixed with water or an oil medium, for example peanut oil, liquid paraffin, or olive oil. Aqueous suspensions contain the active materials in admixture with excipients suitable for the manufacture of aqueous suspensions. Oily suspensions may be formulated by suspending the active ingredient in a suitable oil. Oil-in-water emulsions may also be employed. Dispersible powders and granules suitable for preparation of an aqueous suspension by the addition of water provide the active ingredient in admixture with a dispersing or wetting agent, suspending agent and one or more preservatives. Pharmaceutical compositions of the present compounds may be in the form of a sterile injectable aqueous or oleagenous suspension. The compounds of the present invention may also be administered in the form of suppositories for rectal administration. For topical use, creams, ointments, jellies, solutions or suspensions, etc., containing the compounds of the present invention may be employed. The compounds of the present invention may also be formulated for administered by inhalation. The compounds of the present invention may also be administered by a transdermal patch by methods known in the art.

Several methods for preparing the compounds of this invention are illustrated in the following Schemes and Examples. Starting materials are made according to procedures known in the art or as illustrated herein. The following abbreviations are used herein: Me: methyl; Et: ethyl; t-Bu: tert-butyl; Ar: aryl; Ph: phenyl; BINAP: 2,2'-bis(diphenylphosphino)-1,1'-binaphthyl; Bn: benzyl; Ac: acetyl; Boc: tert-butyloxy carbonyl; BSA: bovine serum albumin; CbzCl: benzylchloroformate; CDI: carbonyl diimidazole; DCM (CH$_2$Cl$_2$): dichloromethane; DCE: dichloroethane; DEAD: diethylazodicarboxylate; DIPEA: N,N-diisopropylethylamine; DMF: N,N-dimethylformamide; DMSO: dimethylsulfoxide; EDC: N-(3-Dimethylaminopropyl)-N'-ethylcarbodiimide; Et3N: triethylamine; EtOAc: ethyl acetate; EtOH: ethanol; HCl: hydrogen chloride; HOAt: 1-hydroxy-7-aza-benzotriazole; HOBT: hydroxybenzotriazole hydrate; HPLC: high performance liquid chromatography; Hunig's base: N,N-diisopropylethylamine; MeOH: methanol; MgSO$_4$: magnesium sulfate; Ms: methanesulfonyl; MTBE: methyl tert-butyl ether; NaHCO$_3$: sodium bicarbonate; NaOH: sodium hydroxide; NMM: N-methylmorpholine; PtO$_2$: platinum oxide; PyClu: 1-(chloro-1-pyrrolidinylmethylene)-pyrrolidinium hexafluorophosphate; rt: room temperature; SOCl$_2$: thionyl chloride; T3P: 2,4,6-tripropyl-1,3,5,2,4,6-trioxatriphosphorinane-2,4,6-trioxide; THF: tetrahydrofuran; TFA: trifluoracetic acid; X-Phos: 2-(dicyclohexyl-phosphino)-2',4',6'-triisopropylbiphenyl.

The compounds of the present invention can be prepared in a variety of fashions. In some cases the final product may be further modified, for example, by manipulation of substituents. These manipulations may include, but are not limited to, reduction, oxidation, alkylation, acylation, and hydrolysis reactions which are commonly known to those skilled in the art. In some cases the order of carrying out the foregoing reaction schemes may be varied to facilitate the reaction or to avoid unwanted reaction products. The following examples are provided so that the invention might be more fully understood. These examples are illustrative only and should not be construed as limiting the invention in any way.

Intermediate A

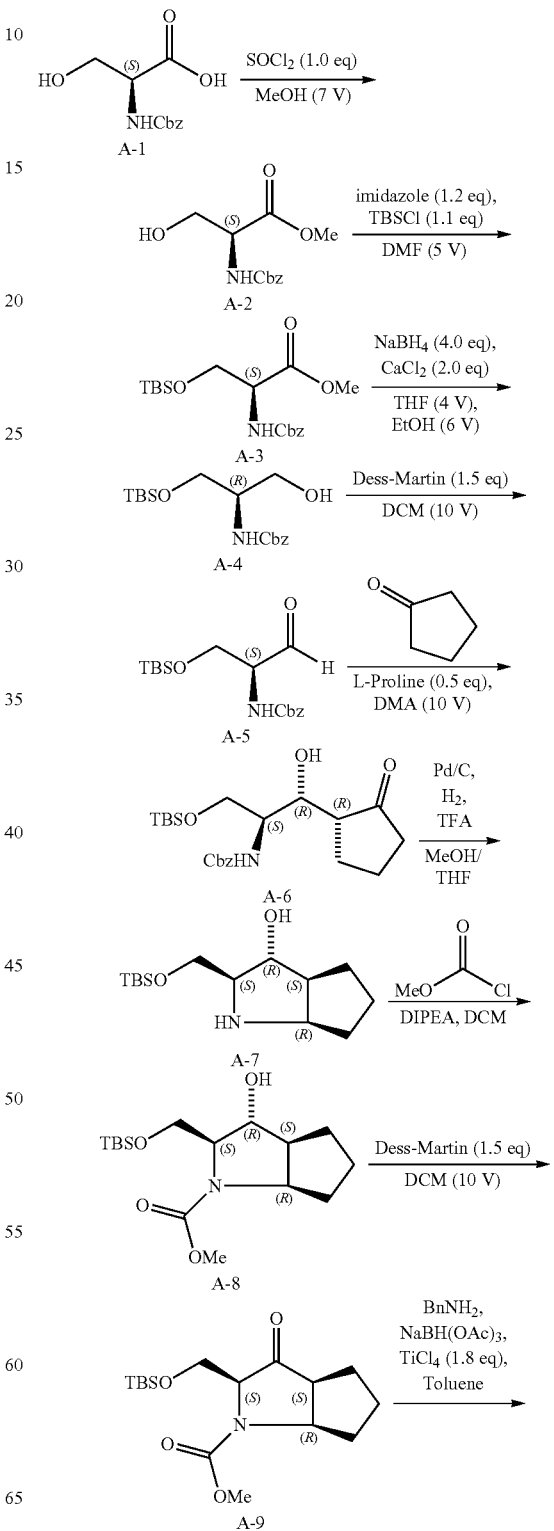

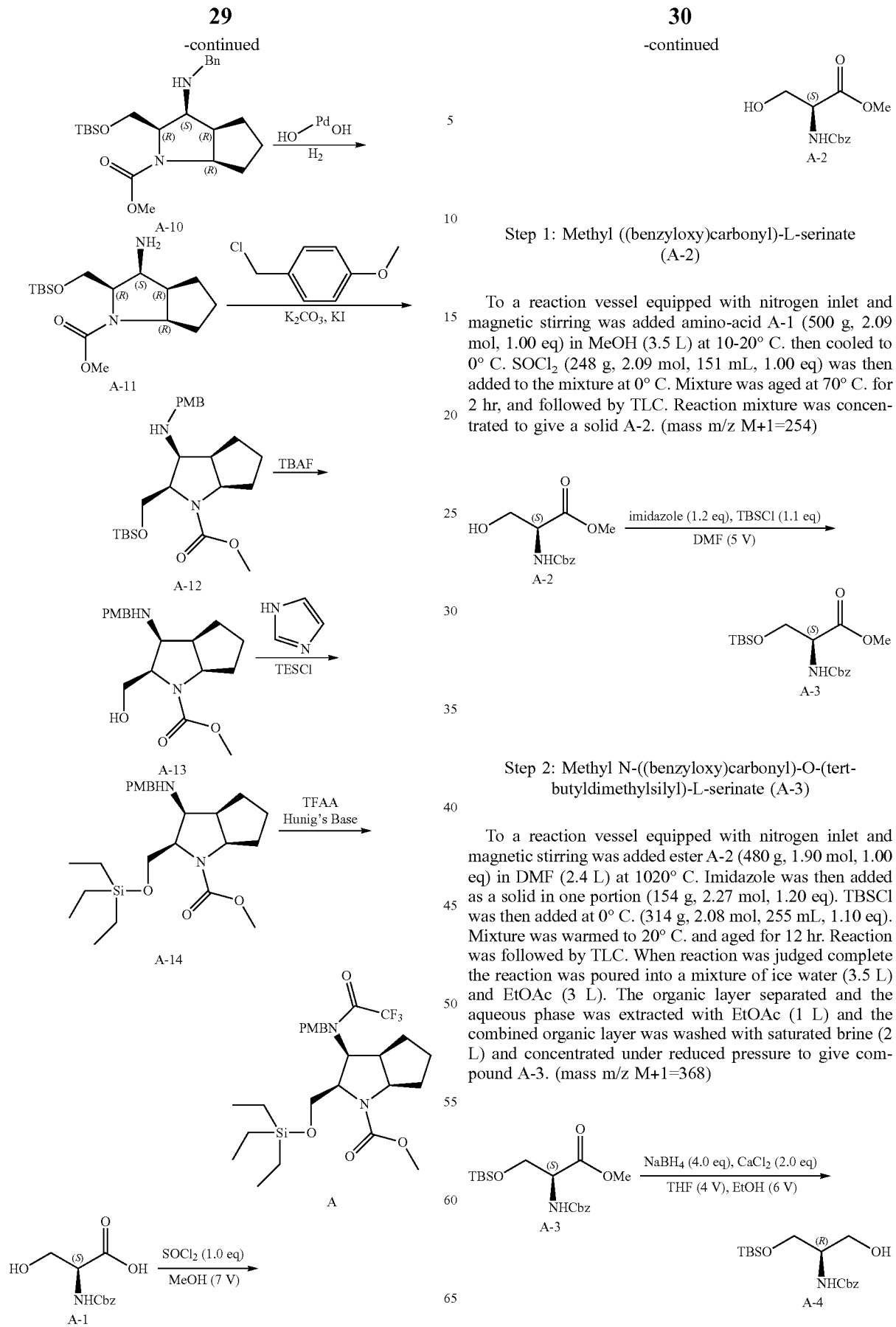

Step 1: Methyl ((benzyloxy)carbonyl)-L-serinate (A-2)

To a reaction vessel equipped with nitrogen inlet and magnetic stirring was added amino-acid A-1 (500 g, 2.09 mol, 1.00 eq) in MeOH (3.5 L) at 10-20° C. then cooled to 0° C. SOCl₂ (248 g, 2.09 mol, 151 mL, 1.00 eq) was then added to the mixture at 0° C. Mixture was aged at 70° C. for 2 hr, and followed by TLC. Reaction mixture was concentrated to give a solid A-2. (mass m/z M+1=254)

Step 2: Methyl N-((benzyloxy)carbonyl)-O-(tert-butyldimethylsilyl)-L-serinate (A-3)

To a reaction vessel equipped with nitrogen inlet and magnetic stirring was added ester A-2 (480 g, 1.90 mol, 1.00 eq) in DMF (2.4 L) at 1020° C. Imidazole was then added as a solid in one portion (154 g, 2.27 mol, 1.20 eq). TBSCl was then added at 0° C. (314 g, 2.08 mol, 255 mL, 1.10 eq). Mixture was warmed to 20° C. and aged for 12 hr. Reaction was followed by TLC. When reaction was judged complete the reaction was poured into a mixture of ice water (3.5 L) and EtOAc (3 L). The organic layer separated and the aqueous phase was extracted with EtOAc (1 L) and the combined organic layer was washed with saturated brine (2 L) and concentrated under reduced pressure to give compound A-3. (mass m/z M+1=368)

Step 3: Benzyl (R)-(1-((tert-butyldimethylsilyl)oxy)-3-hydroxypropan-2-yl)carbamate (A-4)

To a reaction vessel equipped with nitrogen inlet and magnetic stirring was added silyl-ether A-3 (620 g, 1.69 mol, 1.00 eq) in THF (2.48 L) and EtOH (3.72 L) at 10~20° C. CaCl₂ was then added as a solid (374 g, 3.37 mol, 2.00 eq) and the reaction was then cooled to 0° C. To the reaction was added NaBH₄ (255 g, 6.75 mol, 4.00 eq) at 0° C. The reaction was aged at 30° C. for 3 hrs. When the reaction was judged complete by TLC the reaction was poured over iced 0.5 M HCl solution (4 L) and diluted with EtOAc (4 L). The organic layer was separated, the aqueous phase extracted with EtOAc (2 L) and the combined organic layer was washed with NaHCO₃ solution (4 L) and saturated brine (4 L) and concentrated under reduced pressure to give compound A-4. (mass m/z M+1=340)

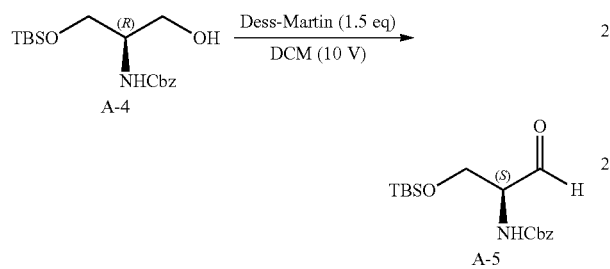

Step 4: Benzyl (S)-(1-((tert-butyldimethylsilyl)oxy)-3-oxopropan-2-yl)carbamate (A-5)

To a reaction vessel equipped with nitrogen inlet and magnetic stirring was added alcohol A-4 (510 g, 1.50 mol, 1.00 eq) in DCM (5.1 L). Dess-Martin reagent was then added as a solid at room temperature (955 g, 2.25 mol, 697 mL, 1.50 eq) and the mixture was aged for 3 hr at 30° C. When the reaction was judged complete by TLC, the reaction was filtered and the filtrate was washed with saturated Na₂CO₃ solution (3 L). The organic layer was separated and concentrated under reduced pressure to give compound A-5, which was taken on to the next step without further purification. (mass m/z M+1=338)

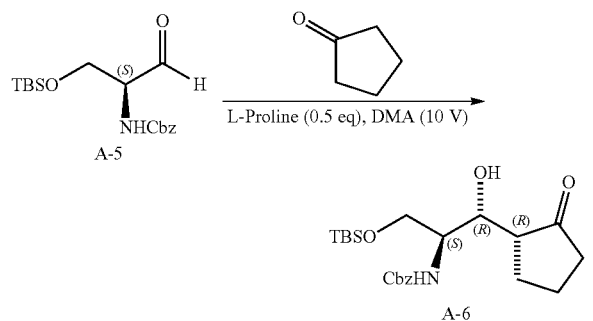

Step 5: Benzyl ((1R,2S)-3-((tert-butyldimethylsilyl)oxy)-1-hydroxy-1-((R)-2-oxocyclopentyl)-propan-2-yl)carbamate (A-6)

To a reaction vessel equipped with nitrogen inlet and magnetic stirring was added aldehyde A-5 (440 g, 1.30 mol, 1.00 eq) in DMA (4.4 L). Cyclopentanone (1100 g, 13.0 mol, 10.0 eq) and L-Proline (75.0 g, 0.65 mol, 0.50 eq) to the mixture and aged for 12 hr at 20° C. When the reaction was judged complete by TLC the reaction was poured over ice water (5 L) and EtOAc (4 L). The organic layer was separated, the aqueous phase extracted with EtOAc (2 L) and the combined organic layer was washed with saturated brine (5 L) and concentrated under reduced pressure to give the crude product. The crude product was purified by silica gel chromatography (Petroleum ether/Ethyl acetate=100/1~1/1) to give the compound A-6. (mass m/z M+1=422)

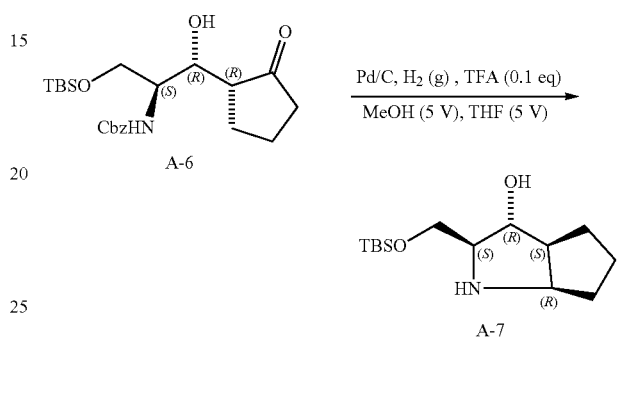

Step 6: (2S,3R,3aS,6aR)-2-(((tert-butyldimethylsilyl)oxy)methyl)octahydrocyclopenta-[b]pyrrol-3-ol (A-7)

To a reaction vessel equipped with nitrogen inlet and magnetic stirring was added Pd/C (15.5 g, 10% purity) in MeOH (775 mL) and THF (775 mL) followed by Keto-alcohol A-6 (155 g, 367 mmol, 1.00 eq) and TFA (4.19 g, 36.7 mmol, 0.10 eq). The flask atmosphere was evacuated with vacuum and backfilled with hydrogen from a lecture bottle. The reaction was aged 12 at 25° C. with hydrogen (1 atm). When the reaction was judged complete by TLC, the hydrogen was evacuated and the slurry was filtered over celite (taking care to not let the wetcake become dry). The wet cake was washed with THF (100 mL 2x) and the filtrate was concentrated to give A-7. To the wetcake was added water and it was disposed of in a container of water. (mass m/z M+1=272)

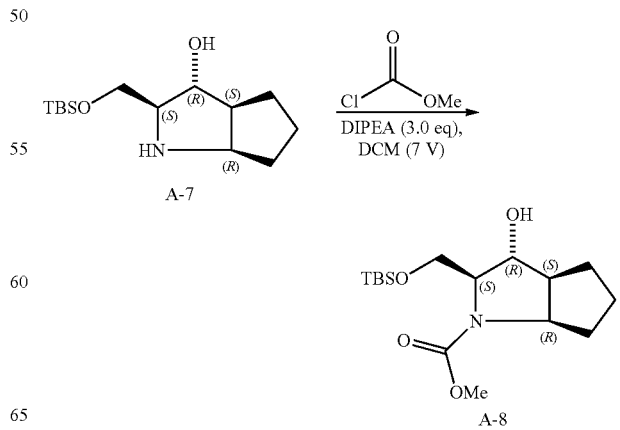

Step 7: Methyl (2S,3R,3aS,6aR)-2-(((tert-butyldimethylsilyl)oxy)methyl)-3-hydroxyhexahydrocyclopenta[b]pyrrole-1(2H)-carboxylate (A-8)

To a reaction vessel equipped with nitrogen inlet and magnetic stirring was added alcohol A-7 (115 g, 0.42 mol, 1.00 eq) in DCM (0.8 L) followed by Hunig's base (164 g, 1.3 mol, 3.00 eq) and cooled to 0° C. To this mixture was added methylchloroformate (44 g, 0.46 mol, 1.10 eq) to the mixture drop-wise at 0-10° C. and aged for 2 hr at 0° C. When the reaction was judged complete by TLC the mixture was poured over ice water (1 L) and DCM (1 L) pH was adjusted to pH=5 with 1M HCl. The organic layer was separated and the aqueous phase was extracted with DCM (500 mL), the combined organic layer was washed with NaHCO$_3$ solution (2 L) and with saturated brine (2 L) and concentrated under reduced pressure to give the crude product. The crude product was purified by silica gel chromatography (Petroleum ether/Ethyl acetate=100/1~1/1) to give the title compound A-8. (mass m/z M+1=330)

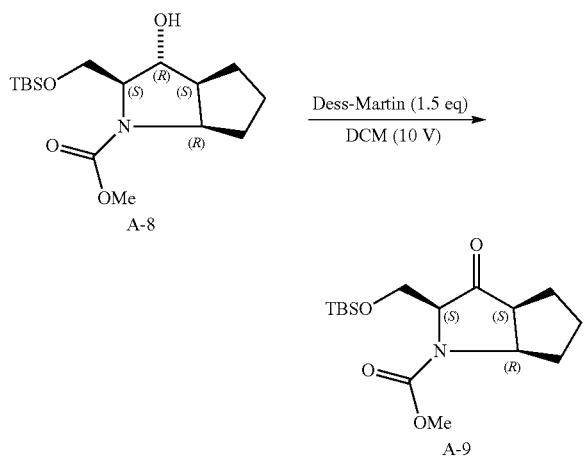

Step 8: Methyl (2S,3aS,6aR)-2-(((tert-butyldimethylsilyl)oxy)methyl)-3-oxohexahydrocyclopenta-[b]pyrrole-1(2H)-carboxylate (A-9)

To a reaction vessel equipped with nitrogen inlet and magnetic stirring was added alcohol A-8 (70 g, 212 mmol, 1.00 eq) in DCM (0.7 L) followed by Dess-Martin reagent at room temperature (135 g, 318 mmol, 1.50 eq) and aged for 3 hr. When the reaction was judged complete by TLC the mixture was filtered and the filtrate was washed by saturated Na2CO3 solution (1 L). The organic layer was separated and concentrated under reduced pressure to give the crude product. The crude product was purified by silica gel chromatography (Petroleum ether/Ethyl acetate=100/1~1/1) to give the compound A-9. (mass m/z M+1=328)

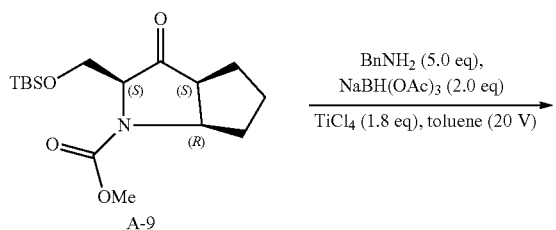

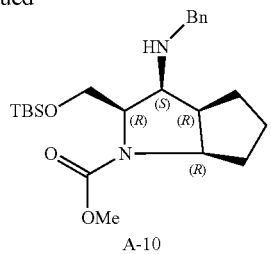

Step 9: Methyl (2R,3S,3aR,6aR)-3-(benzylamino)-2-(((tert-butyldimethylsilyl)oxy)methyl)-hexahydrocyclopenta[b]pyrrole-1(2H)-carboxylate (A-10)

To a reaction vessel equipped with nitrogen inlet and magnetic stirring was added ketone A-9 (40 g, 122 mmol, 1.00 eq) in toluene (0.8 L) at 10~20° C. TiCl4 was then added keeping internal temperature below 0° C. (1.00 M in toluene, 219 mL, 1.80 eq). Benzylamine was then added dropwise keeping internal temperature below 0° C. (65 g, 610 mmol, 5.00 eq) and aged at 0° C. for 0.5 hr. Next NaBH(OAc)$_3$ (52 g, 244 mmol, 2.00 eq) was added as a solid to the reaction mixture at 0° C. The reaction was then warmed to room temperature and aged for 2 hr. When the reaction was judged complete by TLC the mixture poured over saturated Na2CO3 (1 L) and EtOAc (1 L). The biphasic mixture was then filtered through Celite. The filtrate was separated and the aq layer was extracted with EtOAc (0.5 L) and the combined organic layer was washed with saturated brine (1 L) and concentrated under reduced pressure to give the crude product. The crude product was purified by silica gel chromatography (Petroleum ether/Ethyl acetate=50/1~1/1) to give compound A-10. (mass m/z M+1=419)

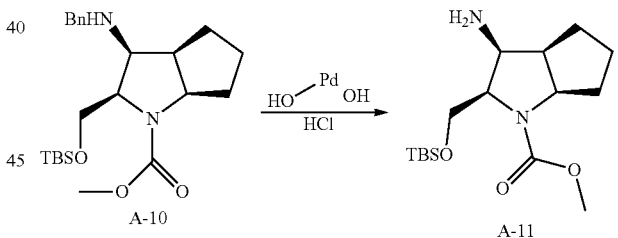

Step 10: Methyl (2R,3S,3aR,6aR)-3-amino-2-(((tert-butyldimethylsilyl)oxy)methyl)-hexahydrocyclopenta[b]pyrrole-1(2H)-carboxylate (A-11)

To a reaction vessel equipped with nitrogen inlet and magnetic stirring was added benzyl amine A-10 (2.0 g, 4.8 mmol, 1.00 eq) in THF (10 mL) and MeOH (10 mL) at 20° C. Palladium hydroxide (20 wt % wet) on carbon was added (0.7 g, 1.0 mmol, 0.2 eq) was added in one portion as a solid followed by 1 mL of 1M HCl aq. The reaction vessel was evacuated and refilled with hydrogen with a balloon. The reaction was left under an atmosphere of hydrogen with balloon and aged overnight at room temperature. The reaction was then filtered and the wet cake was washed with THF (10 mL) 2× (taking care to not let the wetcake become dry). The filtrate was concentrated to give the desired product A-11. (mass m/z M+1=329).

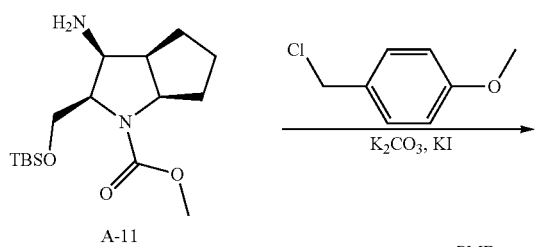

A-11

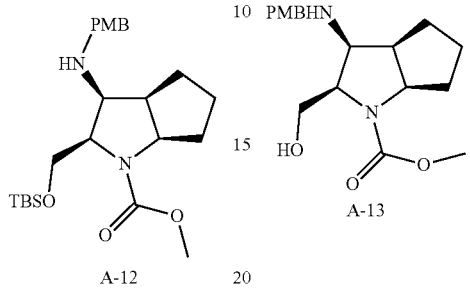

A-12

Step 11: Methyl (2R,3S,3aR,6aR)-2-(((tert-butyldimethylsilyl)oxy)methyl)-3-((4-methoxybenzyl)amino)hexahydrocyclopenta[b]pyrrole-1(2H)-carboxylate (A-12)

To a reaction vessel equipped with nitrogen inlet and magnetic stirring was added amine A-11 (1.5 g, 4.6 mmol, 1.00 eq) in DMA (15 mL) at 20° C. Solid Potassium carbonate was added (1.9 g 13.7 mmol, 3 eq), followed by Potassium iodide (0.7 g 4.56 mmol, 1 eq) and PMBCl (0.6 mL, 0.7 mmol, 1 eq) at room temperature and the reaction was then aged overnight at 25° C. After the reaction was judged complete by TLC water (50 mL) and EtOAc (50 mL) were added. Layers were separated and the aqueous layer was extracted two times with 20 mL EtOAc. Combined organic layers were washed with water two times (20 mL each), Brine and dried with MgSO4. Organics were concentrated under reduced pressure to give the crude product. The crude product was purified by silica gel chromatography (Petroleum ether/Ethyl acetate=100/1~1/1) to give the protected amine A-12. (mass m/z M+1=449).

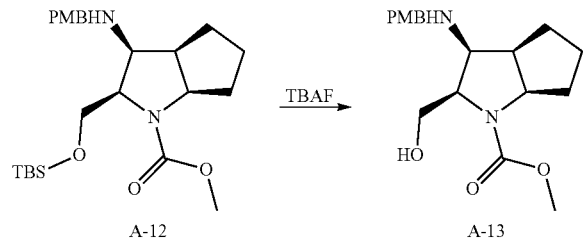

Step 12: Methyl (2R,3S,3aR,6aR)-2-(hydroxymethyl)-3-((4-methoxybenzyl)amino)-hexahydrocyclopenta[b]pyrrole-1(2H)-carboxylate (A-13)

To a reaction vessel equipped with nitrogen inlet and magnetic stirring was added silyl ether A-12 (1.1 g, 2.4 mmol, 1.00 eq) in 2-Me-THF (10 mL) at 20° C. The reaction was then cooled of 0° C. and TBAF (1M in THF) was added in one portion (4.77 mL, 4.8 mmol, 2 eq) and aged for 3 hr at room temperature. When reaction was complete as judged by TLC the mixture was poured over aq ammonium chloride solution (100 mL) and EtOAc (100 mL). The organic layer was separated and the aqueous phase was extracted with EtOAc (100 mL). The combined organic layer was washed with NaHCO₃ solution (100 mL) and concentrated under reduced pressure to give the alcohol A-13. (mass m/z M+1=335)

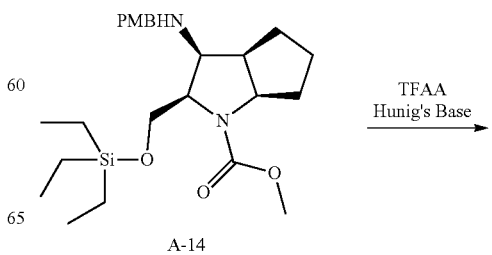

A-13

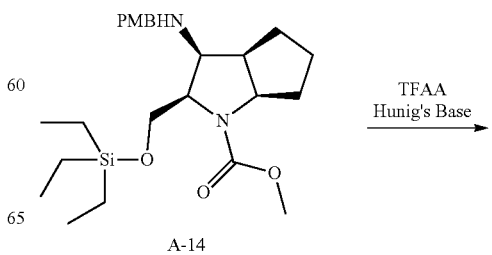

A-14

Step 13: Methyl (2R,3S,3aR,6aR)-2-(((3-ethylpentan-3-yl)oxy)methyl)-3-((4-methoxybenzyl)amino)hexahydrocyclopenta[b]pyrrole-1(2H)-carboxylate (A-14)

To a reaction vessel equipped with nitrogen inlet and magnetic stirring was added alcohol A-13 (1.1 g, 3.2 mmol, 1.00 eq) in DMA (10 mL) at 20° C. Imidazole was then added as a solid in one portion (0.66 g, 9.6 mmol, 3 eq). TESCl was then added at 0° C. (0.6 mL, 3.8 mmol, 1.2 eq). Mixture was warmed to 20° C. and aged for 12 hr. Reaction followed by TLC. When reaction was judged complete the reaction was poured into a mixture of ice water (100 mL) and DCM (100 mL). The organic layer was separated and the aqueous phase was extracted with DCM (0.1 L). The combined organic layer was washed with saturated brine (100 mL) and concentrated under reduced pressure to give silyl ether A-14. (mass m/z M+1=449)

A-14

37
-continued

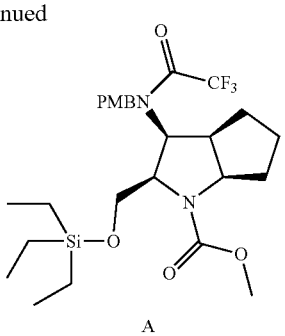

A

Step 14: Methyl (2R,3S,3aS,6aR)-2-(((triethylsilyl)oxy)methyl)-3-(2,2,2-trifluoro-N-(4-methoxybenzyl)acetamido)hexahydrocyclopenta[b]pyrrole-1(2H)-carboxylate (A)

To a reaction vessel equipped with nitrogen inlet and magnetic stirring was added amine A-14 (0.7 g, 1.5 mmol, 1.00 eq) in DCM (7 mL) at 20° C. followed by Hunig's base (0.82 mL, 4.7 mmol, 3 eq). The reaction was cooled to 0° C. and TFAA was added dropwise over 10 min (0.22 mL, 1.5 mmol, 1 eq). The reaction was aged for 3 hr at 25° C. When reaction was judged complete the reaction was poured into a mixture of ice water (50 mL) and DCM (20 mL). The organic layer was separated and the aqueous phase extracted with DCM (50 mL). The combined organic layer was washed with saturated $NaHCO_3$ solution (100 mL) and concentrated under reduced pressure to give the crude product. The crude product was purified by silica gel chromatography (Petroleum ether/Ethyl acetate=100/1~1/1) to give intermediate A. (mass m/z M+1=545)

Intermediate B

Methyl (2R,3S,3aR,6aS)-3-(N-benzyl-2,2,2-trifluoroacetamido)-2-(((triethylsilyl)oxy)methyl)hexahydro-1H-furo[3,4-b]pyrrole-1-carboxylate (B)

38

Step 1: Methyl (3R,4S)-4-((2-(benzyloxy)-2-oxoethyl)amino)tetrahydrofuran-3-carboxylate (B-2)

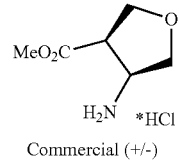
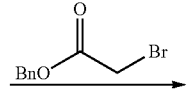

B-2

To a round-bottom-flask equipped with magnetic stirring bar and nitrogen inlet was charged with amino ester B-1 (0.795 g, 4.25 mmol, eq), DMA (8 mL) and Hunig's base (2.2 mL, 12.7 mmol, 3 eq). The flask atm was evacuated and then refilled with nitrogen. Benzyl bromo acetate (0.7 mL, 4.46 mmol, 1.05 eq) was added in one portion at room temperature. The reaction was run for overnight at room temperature, then was quenched by water (50 mL) and EtOAc (50 mL). The aqueous layer was extracted with 50 mL of fresh EtOAc. The combined organic layers were washed with water (50 mL) twice, then was dried by MgSO4 and filtered. The organic layer was concentrated and then loaded on silica gel column 0-100% Hex:(3:1 EtOAc/EtOH) to give desired product B-2. LC/MS (M+1=294)

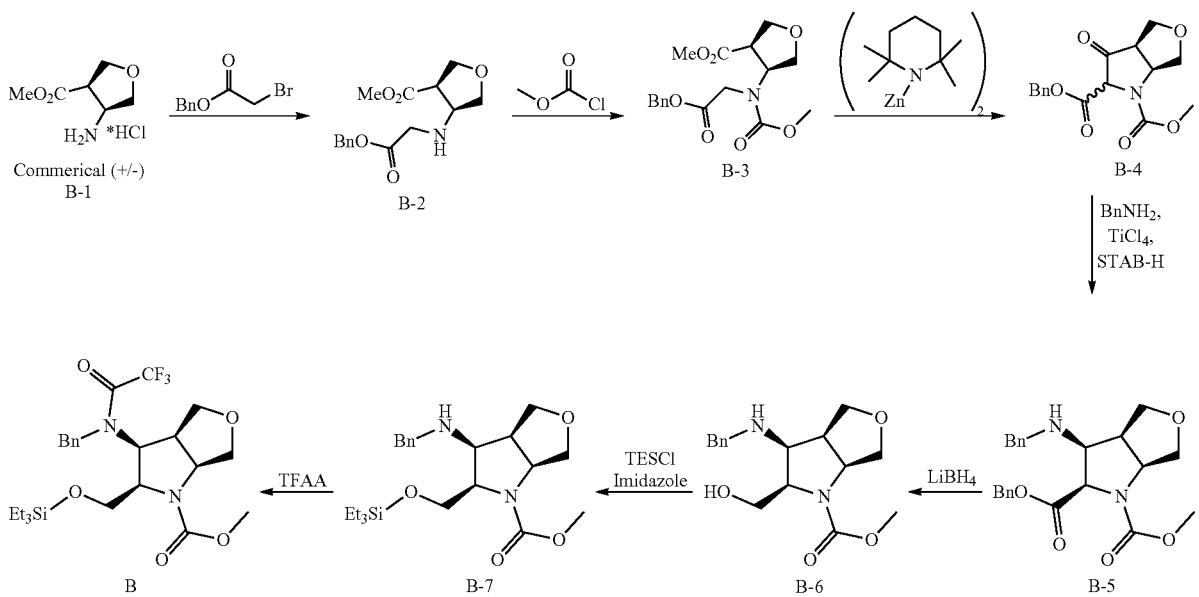

Step 2: Methyl (3R,4S)-4-((2-(benzyloxy)-2-oxo-ethyl)(methoxycarbonyl)amino)tetrahydrofuran-3-carboxylate (B-3)

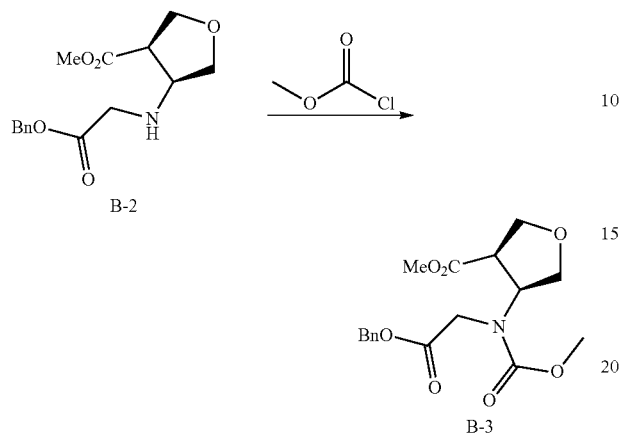

To a round-bottom-flask equipped with magnetic stirring bar and nitrogen inlet was charged with benzyl ester B-2 (1.14 g, 3.89 mmol, 1 eq), THF (11 mL) and Hunig's base (1.3 mL, 7.77 mmol, 2 eq). The reaction was cooled to 0° C. with a ice water bath. The flask atm was evacuated and then filled with nitrogen. Methyl chloroformate was added dropwise over 5 min (0.30 mL, 3.89 mmol, 1.0 eq). The reaction was warmed to room temperature. After the reaction was complete, it was quenched by addition of water (50 mL) and EtOAc (50 mL). The organic layer was separated, washed with brine, then was dried by MgSO4 and filtered. The organics were concentrated and then loaded on silica gel column 0-100% Hex:(3:1 EtOAc/EtOH) to give the desired product B-3. LC/MS (M+1=352)

Step 3: 2-benzyl 1-methyl (3aR,6aS)-3-oxohexahydro-1H-furo[3,4-b]pyrrole-1,2-dicarboxylate (B-4)

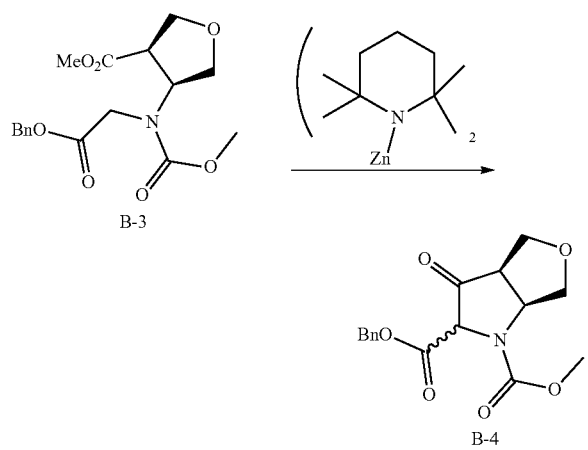

To a round bottom flask equipped with magnetic stirring and nitrogen inlet was charged carbamate B-3 (1.4 g, 3.98 mmol, 1 eq) and THF (42 mL). The reaction was cooled to −25° C. Bis(2,2,6,6-tetramethylpiperidinyl)zinc (0.5 M in toluene) was charged over 5 min (23.9 mL, 11.95 mmol, 3 eq). The reaction was run at −25° C. for 20 min. Vessel was then warmed to −10° C. and aged for 30 min. Vessel was then warmed to 0° C. and held till the reaction was complete by UPLC. Once the reaction was complete it was warmed to room temperature and reversed quench into a flask with pH=7 buffered aq layer and EtOAc. The reaction was added in thirds and pH checked to make sure the pH was not rising above 7. The layers were separated and the organic layer was washed with brine and MgSO4 to dry and concentrated. The organics were concentrated and then loaded on silica gel column 0-100% Hex:(3:1 EtOAc/EtOH) to give desired product B-4 as two isomers. LC/MS (M+1=320)

Step 4: 2-benzyl 1-methyl (2R,3S,3aR,6aS)-3-(benzylamino)hexahydro-1H-furo[3,4-b]pyrrole-1,2-dicarboxylate (B-5)

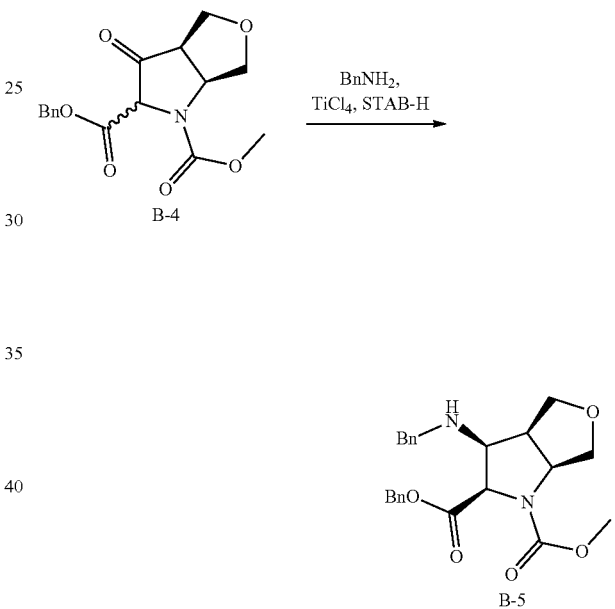

To a round bottom flask equipped with magnetic stirring, internal temperature probe and nitrogen inlet was charged fused ring B-4 (1.0 g, 3.13 mmol, 1 eq) and THF (30 mL) and cooled to −5° C. TiCl$_4$ (1M in toluene) was added dropwise keeping internal temperature below 0° C. (6.3 mL, 6.3 mmol, 2 eq). After temperature cooled to −5° C., a solution of benzyl amine (1.3 mL, 12.53 mmol, 4 eq) in THF (5 mL) was added keeping the internal temperature below 0° C. Once all the amine was added the reaction was warmed to rt and aged for 20 min. Sodium triacetoxyborohydride was then added in one portion as a solid and aged for 2 hr till no SM is seen by UPLC. The slurry was reverse quenched into a flask containing half saturated sodium bicarbonate (100 mL) and EtOAc (50 mL). The biphasic mixture was filtered through celite and transferred to a separation funnel. Layers separated and the organic was washed with brine and dried with MgSO4 and filtered. The organics were concentrated and then loaded on silica gel column 0-100% Hex:(3:1 EtOAc/EtOH) to give the desired product B-5. LC/MS (M+1=411)

Step 5: Methyl (2R,3S,3aR,6aS)-3-(benzylamino)-2-(hydroxymethyl)hexahydro-1H-furo[3,4-b]pyrrole-1-carboxylate (B-6)

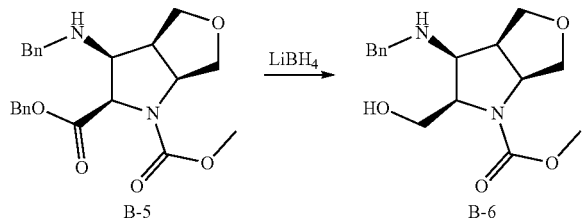

To a round bottom flask equipped with magnetic stirring, and nitrogen inlet was charged fused ring B-5 (0.81 g, 1.98 mmol, 1 eq) and THF (8 mL). LiBH4 was added as a solid in one portion at room temperature (0.17 g, 7.92 mmol, 4 eq). The reaction was heated to 40° C. for 2 hr. Reaction was complete as judged by UPLC and cooled to room temperature. Reverse quench into half satd sodium bicarbate aq solution (30 mL) and EtOAc (50 mL). Layers were separated and the organic layer was washed with brine, dried with MgSO4 and filtered. The organics were concentrated and then loaded on silica gel column 0-100% Hex:(3:1 EtOAc/EtOH) to give desired product B-6. LC/MS (M+1=307)

Step 6: Methyl (2R,3S,3aR,6aS)-3-(benzylamino)-2-(((triethylsilyl)oxy)methyl)hexahydro-1H-furo[3,4-b]pyrrole-1-carboxylate (B-7)

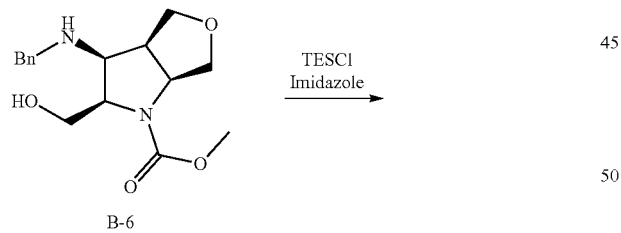

To a round bottom flask equipped with magnetic stirring, and nitrogen inlet was charged alcohol B-6 (0.36 g, 1.2 mmol, 1 eq) and DMF (4 mL). Imidazole is added at room temperature as a solid in one portion (0.16 g, 2.3 mmol, 2 eq). TESCl is then added in one portion (0.21 mL, 1.22 mmol, 1.05 eq) and the reaction was aged at room temperature overnight. Reaction was complete as judged by UPLC and water was added (30 mL) along with EtOAc (50 mL). Organics were washed with water twice with 20 mL. Organics were washed with brine, dried with MgSO4 and filtered. The organics were concentrated to give the desired product B-7, which was utilized in the next step without further purification. LC/MS (M+1=421)

Step 7: Methyl (2R,3S,3aR,6aS)-3-(N-benzyl-2,2,2-trifluoroacetamido)-2-(((triethylsilyl)oxy)-methyl)hexahydro-1H-furo[3,4-b]pyrrole-1-carboxylate (B)

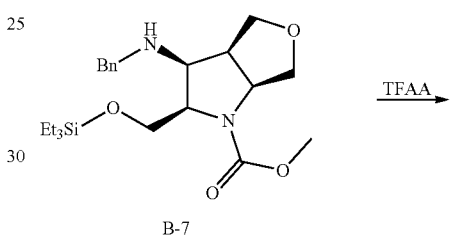

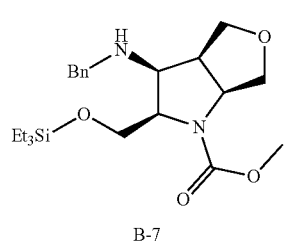

To a round bottom flask equipped with magnetic stirring, and nitrogen inlet was charged silyl ether B-7 (0.49 g, 1.2 mmol, 1 eq) and DCM (5 mL) followed by Hunig's base (0.6 mL, 3.5 mmol, 3 eq). The reaction was cooled to 0° C. TFAA was then added dropwise (0.2 mL, 1.4 mmol, 1.2 eq) over 5 min. Reaction was then warmed to rt and aged for 30 min. Reaction was judged compete by UPLC and quenched by addition of water (20 mL) and EtOAc (50 mL). Layers were separated and the organics were washed with brine and dried with MgSO4 and filtered. The crude organics were filtered through a plug of deactivated silica gel and then concentrated to give the desired product B. LC/MS (M+1=517)

Intermediate C

Methyl (2R,3S,3aR,6aR)-3-amino-2-((((1s,4S)-4-(3-fluorophenyl)cyclohexyl)oxy)methyl)-hexahydrocyclopenta[b]pyrrole-1(2H)-carboxylate (C)

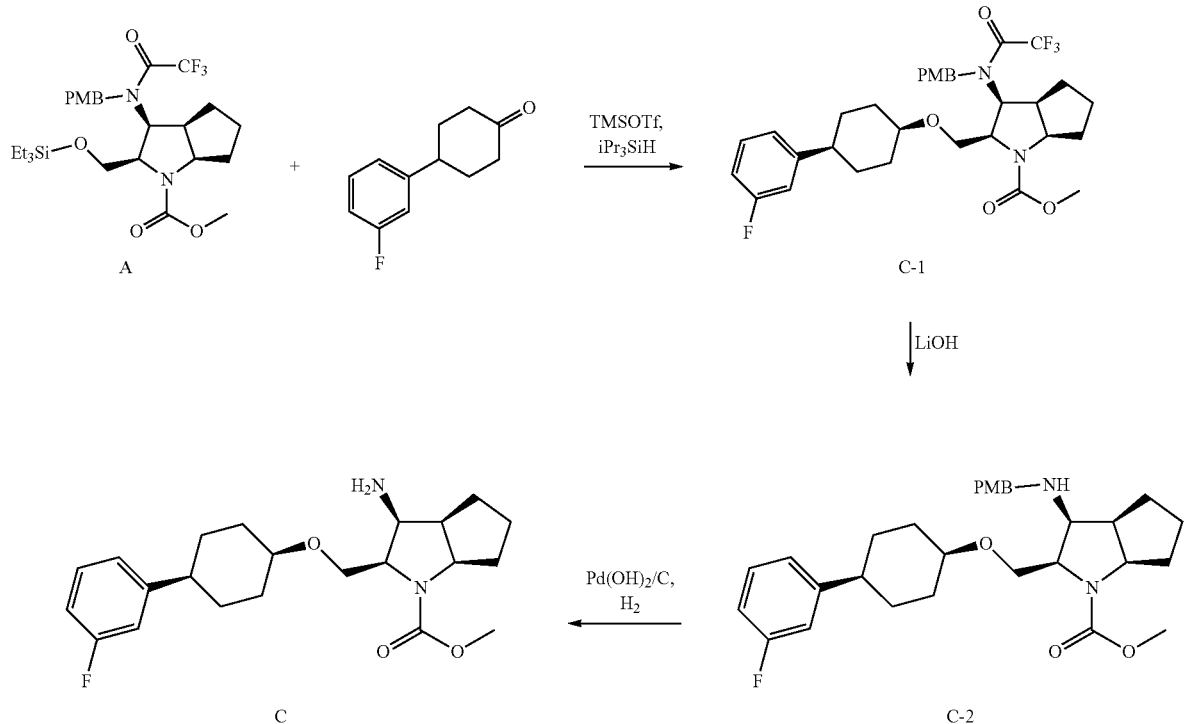

Step 1: Methyl (2R,3S,3aS,6aR)-2-((((1s,4S)-4-(3-fluorophenyl)cyclohexyl)oxy)methyl)-3-(2,2,2-trifluoro-N-(4-methoxybenzyl)acetamido)hexahydrocyclopenta[b]pyrrole-1(2H)-carboxylate (C-1)

To a solution of methyl (3aS,6aR)-2-(((triethylsilyl)oxy)methyl)-3-(2,2,2-trifluoro-N-(4-methoxybenzyl)acetamido)hexahydrocyclopenta[b]pyrrole-1(2H)-carboxylate (A) (200 mg, 0.367 mmol) in acetonitrile (10 ml) was added 4-(3-fluorophenyl)cyclohexan-1-one (106 mg, 0.551 mmol) at −20° C. under N2. The reaction mixture was raised to 0° C. and stirred for 4 h. LC-MS shown formation of the desired product. The reaction mixture was quenched by addition of 1 ml of sat. aq. NaHCO3, and the mixture was diluted with 10 ml of EtOAc, dried by MgSO4, filtered and concentrated. The crude product was purified by column chromatography (Gilson, C18, 10-100% acetonitrile in H2O to give the product methyl (3aS,6aR)-2-(((4-(3-fluorophenyl)cyclohexyl)oxy)methyl)-3-(2,2,2-trifluoro-N-(4-methoxybenzyl)acetamido)-hexahydrocyclopenta[b]pyrrole-1(2H)-carboxylate (C-1). LC-MS (M+1) 607.6.

Step 2: Methyl (2R,3S,3aR,6aR)-2-((((1s,4S)-4-(3-fluorophenyl)cyclohexyl)oxy)methyl)-3-((4-methoxybenzyl)amino)hexahydrocyclopenta[b]pyrrole-1(2H)-carboxylate (C-2)

To solution of methyl (3aS,6aR)-2-(((4-(3-fluorophenyl)cyclohexyl)oxy)methyl)-3-(2,2,2-trifluoro-N-(4-methoxybenzyl)acetamido)hexahydrocyclopenta[b]pyrrole-1(2H)-carboxylate (C-1) (210 mg, 0.346 mmol) in THF (5 ml) was added 1 ml of 2M LiOH solution, followed by 1 ml of MeOH. The reaction mixture was heated at 50° C. for 20 h until LC-MS shown reaction completed. The reaction mixture was extracted by 2 portions of 10 ml of EtOAc. The combined organic phases were dried (MgSO4), concentrated and chromatographed over C18 (10-100% Acetonitrile in H2O) to give the desired product methyl (3aR,6aR)-2-(((4-(3-fluorophenyl)cyclohexyl)oxy)methyl)-3-((4-methoxybenzyl)amino)hexahydrocyclopenta[b]-pyrrole-1(2H)-carboxylate (C-2). LC-MS 511.5 (M+1).

Step 3: Methyl (2R,3S,3aR,6aR)-3-amino-2-((((1s,4S)-4-(3-fluorophenyl)cyclohexyl)oxy)-methyl)hexahydrocyclopenta[b]pyrrole-1(2H)-carboxylate (C)

To solution of methyl (2R,3S,3aR,6aR)-2-(4(1s,4S)-4-(3-fluorophenyl)-cyclohexyl)oxy)methyl)-3-((4-methoxybenzyl)amino)hexahydrocyclo-penta[b]pyrrole-1(2H)-carboxylate (C-2) (110 mg, 0.215 mmol) in MeOH (10 ml) was added palladium hydroxide on carbon (151 mg, 0.215 mmol). The reaction mixture was degassed and refilled with H2 in a balloon for 3 times, then stirred under H2 for 2 h. LC-MS shown quick formation of the desired product. The reaction mixture was filtered through a celite pad. The filtrate was concentrated and the crude and chromatographed over silica gel (C18, acetonitrile in H2O 10-100% with 0.01% TFA) to give the product methyl (2R,3S,3aR,6aR)-3-amino-2-((((1s,4S)-4-(3-fluorophenyl)cyclohexyl)-oxy)methyl)hexahydrocyclopenta[b]pyrrole-1(2H)-carboxylate (C). LC-MS 391.5 (M+1).

Intermediate D

Methyl (2R,3S,3aR,6aR)-3-amino-2-((((1s,4S)-4-(3-fluorophenyl)cyclohexyl)oxy)methyl)-hexahydrocyclopenta[b]pyrrole-1(2H)-carboxylate (D)

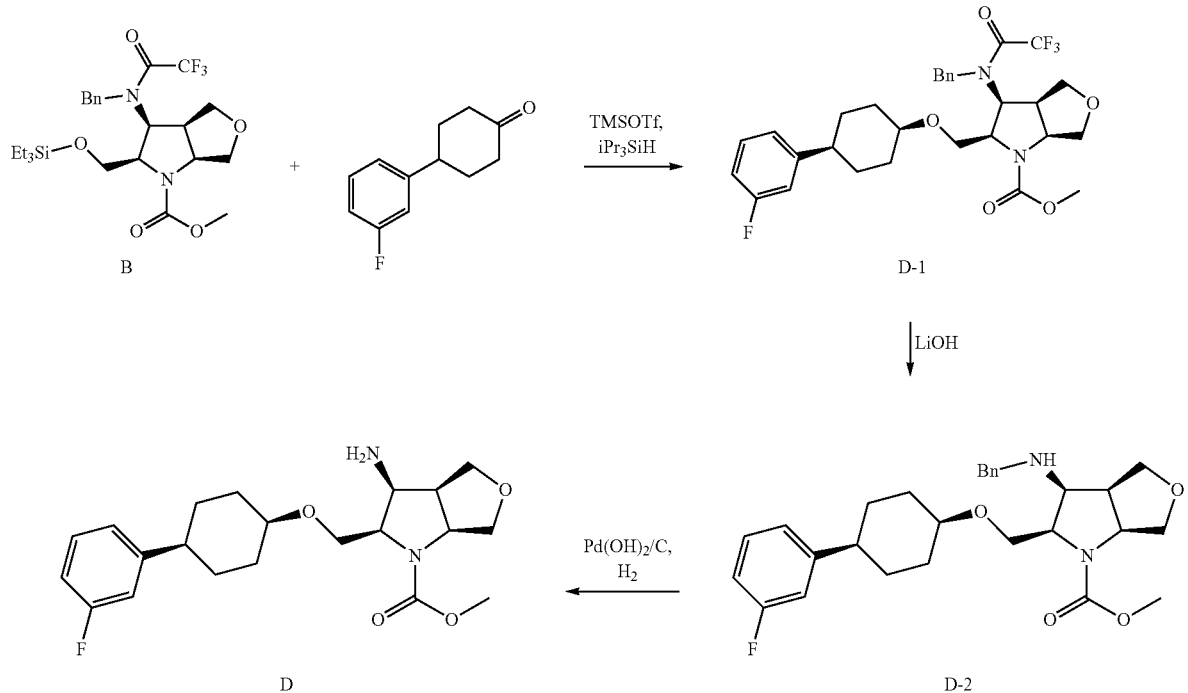

Step 1: Methyl (2R,3S,3aS,6aR)-3-(N-benzyl-2,2,2-trifluoroacetamido)-2-((((1s,4S)-4-(3-fluorophenyl)cyclohexyl)oxy)methyl)hexahydrocyclopenta[b]pyrrole-1(2H)-carboxylate (D-1)

To a solution of methyl (2R,3S)-3-(N-benzyl-2,2,2-trifluoroacetamido)-2-(((triethylsily)oxy)methyl)hexahydro-1H-furo[3,4-b]pyrrole-1-carboxylate (B) (100 mg, 0.194 mmol), 4-(3-fluorophenyl)cyclohexan-1-one (44.7 mg, 0.232 mmol) in acetonitrile (20 ml) was added triisopropylsilane (61.3 mg, 0.387 mmol), followed by addition of trimethylsilyl trifluoromethanesulfonate (51.6 mg, 0.232 mmol) at −20° C. under N2. The reaction mixture was raised to 0° C. and stirred for 2 h. LC-MS shown formation of the desired product. To the reaction mixture was added 1 ml of sat. aq. NaHCO3. The organic phase was taken up by 20 ml of EtOAc. The combined organic phase was dried (MgSO4), concentrated and chromatographed over silica gel (ISCO, 24 g, EtOAc in hexanes 0-80%) to give the desired product methyl (2R,3S,3aR,6aS)-3-(N-benzyl-2,2,2-trifluoroacetamido)-2-((((1s,4S)-4-(3-fluorophenyl)-cyclohexyl)oxy)methyl)hexahydro-1H-furo[3,4-b]pyrrole-1-carboxylate (D-1). LC-MS (M+1) 579.4.

Step 2: Methyl (2R,3S,3aR,6aR)-3-(benzylamino)-2-((((1s,4S)-4-(3-fluorophenyl)cyclohexyl)-oxy)methyl)hexahydrocyclopenta[b]pyrrole-1(2H)-carboxylate (D-2)

To a solution of methyl (2R,3S)-3-(N-benzyl-2,2,2-trifluoroacetamido)-2-(((4-phenylcyclo-hexyl)oxy)methyl)hexahydro-1H-furo[3,4-b]pyrrole-1-carboxylate (D-1) (100 mg, 0.178 mmol) in THF (5 ml) was added sat. aq. lithium hydroxide (1.784 ml, 1.784 mmol) at rt under N2. The reaction mixture was raised to 60° C. and stirred for 16 h. LC-MS shown formation of the desired product. To the reaction mixture was extracted by 10 ml of EtOAc. The organic phase was concentrated and chromatographed over silica gel (ISCO, 12 g, EtOAc in hexanes 0-80%) to give the desired product methyl (2R,3S)-3-(benzylamino)-2-4((1s,4S)-4-(3-fluorophenyl)-cyclohexyl)oxy)methyphexahydro-1H-furo[3,4-b]pyrrole-1-carboxylate (D-2). LC-MS (M+1) 483.4.

Step 3: methyl (2R,3S,3aR,6aR)-3-amino-2-((((1s,4S)-4-(3-fluorophenyl)cyclohexyl)oxy)-methyl)hexahydrocyclopenta[b]pyrrole-1(2H)-carboxylate (D)

To a solution of methyl (2R,3S,3aR,6aS)-3-(benzylamino)-2-((((1s,4S)-4-(3-fluorophenyl)-cyclohexyl)oxy)methyl)hexahydro-1H-furo[3,4-b]pyrrole-1-carboxylate (D-2) (70 mg, 0.145 mmol) in MeOH (5 ml) was added palladium hydroxide on carbon (10.18 mg, 0.015 mmol). The reaction mixture was degassed and refilled with H2 from balloon for three times. The reaction mixture was stirred for 5 h. LC-MS shown formation of the desired product. After filtered through a celite pad, the filtrate was concentrated and chromatographed over silica gel (C18, Acetonitrile in H2O 10-100%) to give the desired product methyl (2R,3S,3aR,6aS)-3-amino-2-((((1s,4S)-4-(3-fluorophenyl)cyclohexyl)oxy)methyl)hexahydro-1H-furo[3,4-b]pyrrole-1-carboxylate (D). LC-MS LC-MS (M+1) 393.4.

Intermediate E

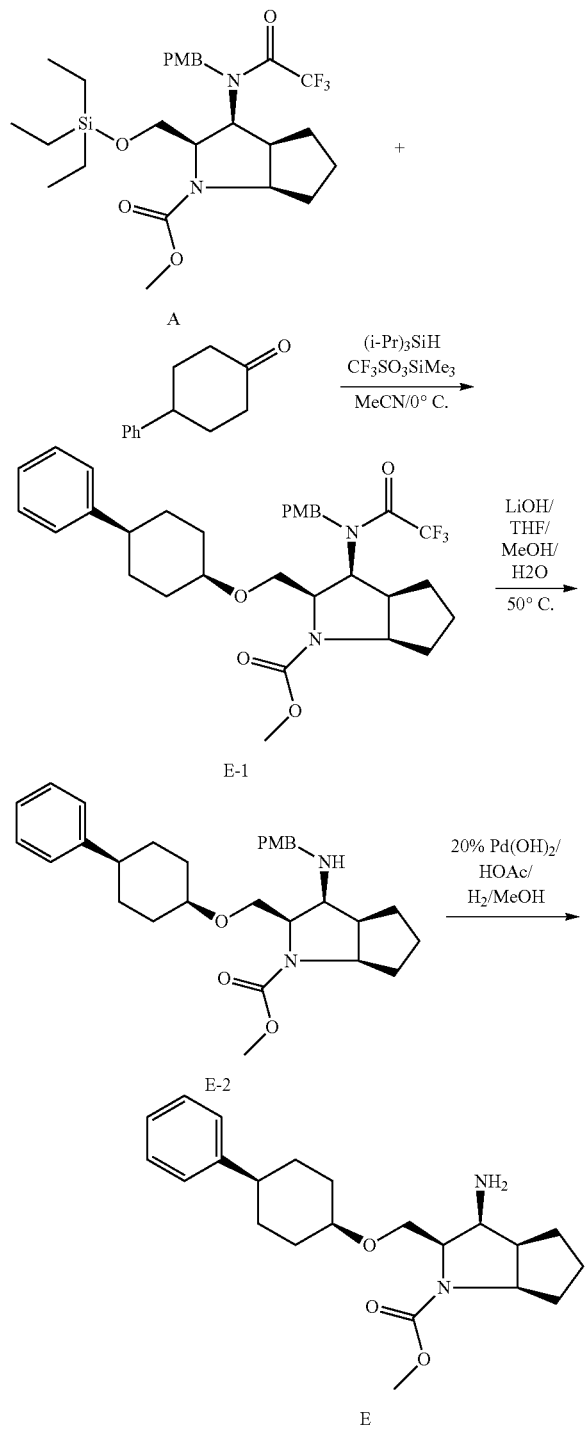

Step 1: Methyl (2R,3S,3aS,6aR)-2-((((1s,4S)-4-phenylcyclohexyl)oxy)methyl)-3-(2,2,2-tri-fluoro-N-(4-methoxybenzyl)acetamido)hexahydrocyclopenta[b]pyrrole-1(2H)-carboxylate (E-1)

To a solution of methyl (2R,3S,3aS,6aR)-2-(((triethylsilyl)oxy)methyl)-3-(2,2,2-trifluoro-N-(4-methoxybenzyl)acetamido)hexahydrocyclopenta[b]pyrrole-1(2H)-carboxylate (A, 200 mg, 0.367 mmol) in acetonitrile (5.0 ml) at 0° C. was added 4-phenylcyclohexan-1-one (90 mg, 0.514 mmol) followed by triisopropylsilane (0.150 ml, 0.734 mmol) under N2. After 5 mins stirring at 0° C., trimethylsilyl trifluoromethanesulfonate (0.066 ml, 0.367 mmol) was added. After stirring at 0° C. for 40 mins, the reaction mixture was quenched with sat. aq. NaHCO3. The reaction mixture was extracted by 2 portions of 10 ml of DCM. The combined organic phase was collected and concentrated to leave an oil. The residue was purified by prep silica gel TLC eluent with 1% MeOH/DCM to afford the title compound E-1. LC-MS: (M+1) 589.4.

Step 2: Methyl (2R,3S,3aR,6aR)-3-((4-methoxybenzyl)amino)-2-((((1s,4S)-4-phenylcyclohexyl)oxy)methyl)hexahydrocyclopenta[b]pyrrole-1(2H)-carboxylate (E-2)

To a stirred solution of methyl (2R,3S,3aS,6aR)-2-(4(1s,4S)-4-phenylcyclohexyl)-oxy)methyl)-3-(2,2,2-trifluoro-N-(4-methoxybenzyl)acetamido)-hexahydrocyclopenta[b]pyrrole-1(2H)-carboxylate (E-1, 151 mg, 0.257 mmol) in THF (0.3 ml) and MeOH (2.5 ml) was added LITHIUM HYDROXIDE (49.1 mg, 2.052 mmol) followed by water (1.5 ml). The mixture was heated at 50° C. overnight. Most of the solvent was removed under reduce pressure. Water (10 mL) was added and the mixture was extracted with DCM twice. The combined organic fractions were washed with brine, dried over MgSO4, filtered and the solvent was evaporated under reduced pressure to give an oil. The residue was purified by prep silica gel TLC eluent with 3% MeOH/DCM to afford the title compound (E-2). LC-MS: (M+1) 493.5.

Step 3: Methyl (2R,3S,3aR,6aR)-3-amino-2-((((1s,4S)-4-phenylcyclohexyl)oxy)methyl)-hexahydrocyclopenta[b]pyrrole-1(2H)-carboxylate, AcO-(E)

To a stirred solution of methyl (2R,3S,3aR,6aR)-3-((4-methoxybenzyl)amino)-2-4((1s,4S)-4-phenylcyclohexyl)oxy)methyphexahydrocyclopenta[b]pyrrole-1(2H)-carboxylate (E-2, 84 mg, 0.171 mmol) in MeOH (2.5 ml) was added acetic acid (9.76 µl, 0.171 mmol) followed by 20% palladium hydroxide on carbon (23.94 mg, 0.034 mmol). The mixture was stirred at rt under H2 balloon overnight. The mixture was filtered, washing with methanol. The combined filtrates were concentrated under reduced pressure to afford the title compound E. LC-MS: (M+1) 373.7.

Example 1 methyl (2R,3S,3aS,6aR)-2-((((1s,4S)-4-(3-fluorophenyl)cyclohexyl)oxy)methyl)-3-(methylsulfonamido)hexahydrocyclopenta[b]pyrrole-1(2H)-carboxylate (1)

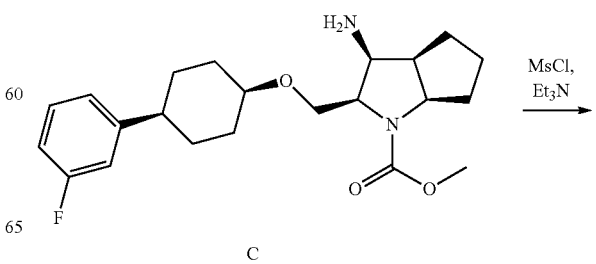

-continued

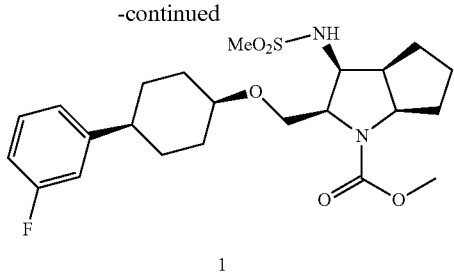

1

To a solution of methyl (2R,3S,3aR,6aR)-3-amino-2-(4 (1s,4S)-4-(3-fluorophenyl)-cyclohexyl)-oxy)methyphexahydrocyclopenta[b]pyrrole-1(2H)-carboxylate (C) (30 mg, 0.077 mmol) in CH2Cl2 (1 ml) was added triethylamine (15.55 mg, 0.154 mmol) and methanesulfonyl chloride (13.20 mg, 0.115 mmol) at 0° C. under N2. The reaction mixture was stirred for 2 h at rt. LC-MS shown SM disappeared. The reaction was quenched by addition of 0.1 ml of methanol, then the reaction mixture was concentrated and chromatographed over C18 (10-100% Acetonitrile in H2O) to give the desired product methyl (2R,3S,3aS,6aR)-2-((((1s,4S)-4-(3-fluorophenyl)-cyclohexyl)oxy)methyl)-3-(methylsulfonamido)hexahydrocyclopenta[b]-pyrrole-1 (2H)-carboxylate (1). $^1$H NMR (500 MHz, Methanol-d$_4$) δ 7.28 (q, J=7.7 Hz, 1H), 7.06 (d, J=7.5 Hz, 1H), 6.98 (d, J=10.6 Hz, 1H), 6.89 (t, J=8.3 Hz, 1H), 4.36 (q, J=8.3, 7.6 Hz, 1H), 4.24 (s, 2H), 3.84 (s, 1H), 3.71 (s, 3H), 3.65 (d, J=10.0 Hz, 1H), 3.05 (s, 3H), 2.95 (p, J=8.8 Hz, 1H), 2.61 (q, J=11.6, 11.1 Hz, 1H), 2.12-2.06 (m, 4H), 1.81 (d, J=12.9 Hz, 2H), 1.78-1.70 (m, 2H), 1.65-1.61 (s, 4H), 1.57 (d, J=17.0 Hz, 2H). LC-MS (M+1) 469.5.

Example 2 methyl (2R,3S,3aS,6aR)-3-((N,N-dimethylsulfamoyl)amino)-2-((((1s,4S)-4-(3-fluorophenyl)cyclohexyl)oxy)methyl)hexahydrocyclopenta[b]pyrrole-1 (2H)-carboxylate (2)

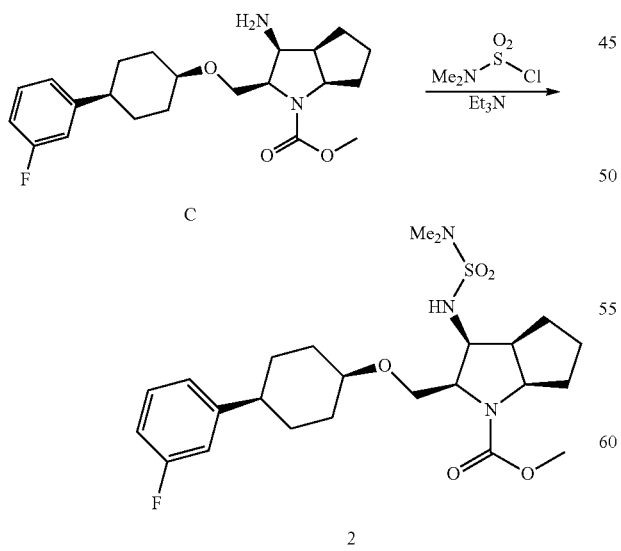

To a solution of methyl (2R,3S,3aR,6aR)-3-amino-2-4 ((1s,4S)-4-(3-fluorophenyl)cyclohexyl)-oxy)methyphexahydrocyclopenta[b]pyrrole-1(2H)-carboxylate (C) (20 mg, 0.051 mmol) in CH2Cl2 (1 ml) was added triethylamine (10.37 mg, 0.102 mmol) and dimethylsulfamoyl chloride (11.03 mg, 0.077 mmol) at 0° C. under N2. The reaction mixture was stirred for 24 h at rt under N2, then was stopped by addition of 0.1 ml of methanol. The crude was concentrated and chromatographed over C18 (10-100% acetonitrile in H2O) to give the desired product methyl (2R,3S,3aS, 6aR)-3-((N,N-dimethylsulfamoyl)amino)-2-((((1s,4S)-4-(3-fluorophenyl)-cyclohexyl)oxy)methyphexahydrocyclopenta[b]pyrrole-1(2H)-carboxylate (2). 1H NMR (500 MHz, Methanol-d4) δ 7.28 (q, J=7.6 Hz, 1H), 7.07 (d, J=7.9 Hz, 1H), 6.99 (d, J=10.4 Hz, 1H), 6.89 (t, J=8.2 Hz, 1H), 4.29 (t, J=8.9 Hz, 1H), 4.23 (d, J=8.7 Hz, 2H), 3.82 (s, 1H), 3.71 (m, 4H), 3.02-2.88 (m, 1H), 2.82 (s, 6H), 2.61 (d, J=11.7 Hz, 1H), 2.18-1.98 (m, 4H), 1.92-1.71 (m, 5H), 1.62 (dt, J=40.1, 12.6 Hz, 5H). LC-MS (M+1) 498.4.

Example 3 methyl (2R,3S,3aS,6aR)-2-((((1s,4S)-4-(3-fluorophenyl)cyclohexyl)oxy)methyl)-3-((N-methylsulfamoyl)amino)hexahydrocyclopenta[b]pyrrole-1(2H)-carboxylate (3)

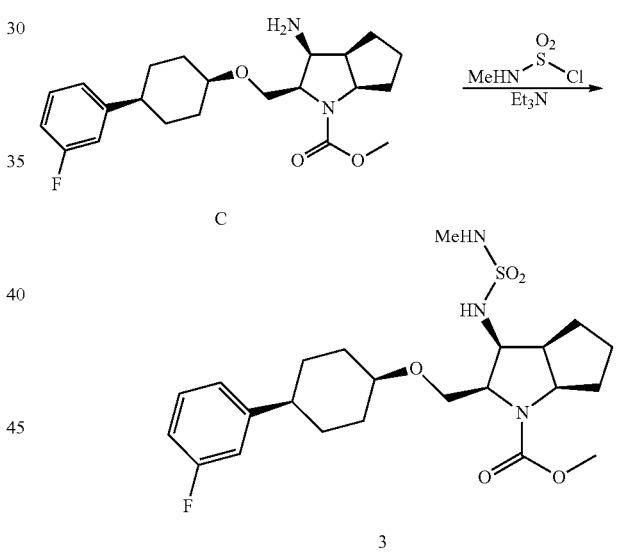

To a solution of methyl (2R,3S,3aR,6aR)-3-amino-2-(((4-(3-fluorophenyl)cyclohexyl)-oxy)-methyl)hexahydrocyclopenta[b]pyrrole-1(2H)-carboxylate (C) (50 mg, 0.128 mmol) in CH2Cl2 (2.5 ml) was added TEA (54 μl, 0.384 mmol) followed by addition of methylsulfamoyl chloride (21.57 mg, 0.166 mmol) at 0° C. under N2. After stirring for 10 mins at 0° C., the reaction was checked by LC-MS, which showed completion. The reaction was stopped and the mixture was concentrated in vacuo to give a film. The residue was purified by Gilson (C18, 10-100% acetonitrile in H2O) to provide methyl (2R,3S,3aS,6aR)-2-((((1s,4S)-4-(3-fluorophenyl)-cyclohexyl)oxy)methyl)-3-((N-methylsulfamoyl)amino)hexahydrocyclopenta-[b]pyrrole-1(2H)-carboxylate (3). 1H NMR (500 MHz, Methanol-d4) δ 7.27 (q, J=6.5 Hz, 1H), 7.08 (d, J=7.2 Hz, 1H), 6.99 (d, J=10.3 Hz, 1H), 6.88 (t, J=8.1 Hz, 1H), 4.32-4.15 (m, 3H), 3.82 (s, 1H), 3.71 (m, 5H), 2.95 (p, J=7.8 Hz, 1H), 2.73 (s, 3H), 2.56 (m, 1H), 2.10 (m, 4H), 1.70 (m, 4H), 1.62 (m, 4H), 1.38-1.09 (m, 2H). LC-MS (M+1) 483.3.

Example 4 methyl (2R,3S,3aS,6aS)-2-((((1s,4S)-4-(3-fluorophenyl)cyclohexyl)oxy)methyl)-3-(methylsulfonamido)hexahydro-1H-furo[3,4-b]pyrrole-1-carboxylate (4)

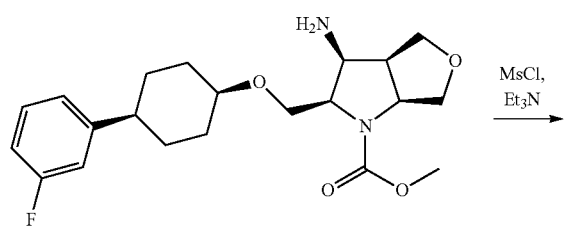

D

MeO₂S—NH

4

To a solution of methyl (2R,3S,3aR,6aS)-3-amino-2-((((1s,4S)-4-(3-fluorophenyl)-cyclohexyl)oxy)methyl)hexahydro-1H-furo[3,4-b]pyrrole-1-carboxylate (D) (12 mg, 0.031 mmol) in CH2Cl2 (2 ml) was added triethylamine (8.52 µl, 0.061 mmol), followed by methanesulfonyl chloride (5.25 mg, 0.046 mmol) at 0° C. under N2. After stirring for 30 min, LC-MS shown formation of the desired product. To the reaction mixture was added a few drops of methanol. The reaction mixture was concentrated in vacuo. then dissolved in 1 ml of DMF. The reaction mixture was chromatographed over ISCO (C18, 10-100% Acetonitrile in H₂O to give the desired product methyl (2R,3S,3aS,6aS)-2-(4(1s,4S)-4-(3-fluorophenyl)cyclohexyl)oxy)-methyl)-3-(methylsulfonamido)hexahydro-1H-furo[3,4-b]pyrrole-1-carboxylate (4). ¹H NMR (500 MHz, Methanol-d₄) δ 7.28 (q, J=7.6 Hz, 1H), 7.07 (d, J=7.9 Hz, 1H), 6.99 (d, J=10.4 Hz, 1H), 6.89 (t, J=8.2 Hz, 1H), 4.29 (t, J=8.9 Hz, 1H), 4.23 (d, J=8.7 Hz, 2H), 3.82 (s, 1H), 3.71 (s, 3H), 3.69 (m, 1H). 3.02-2.88 (m, 1H), 2.82 (s, 5H), 2.61 (d, J=11.7 Hz, 1H), 2.18-1.98 (m, 3H), 1.92-1.71 (m, 4H), 1.62 (dt, J=40.1, 12.6 Hz, 5H). LC-MS (M+1) 471.3.

Example 5 methyl (2R,3S,3aS,6aS)-3-((N,N-dimethylsulfamoyl)amino)-2-((((1s,4S)-4-(3-fluorophenyl)cyclohexyl)oxy)methyl)hexahydro-1H-furo[3,4-b]pyrrole-1-carboxylate (5)

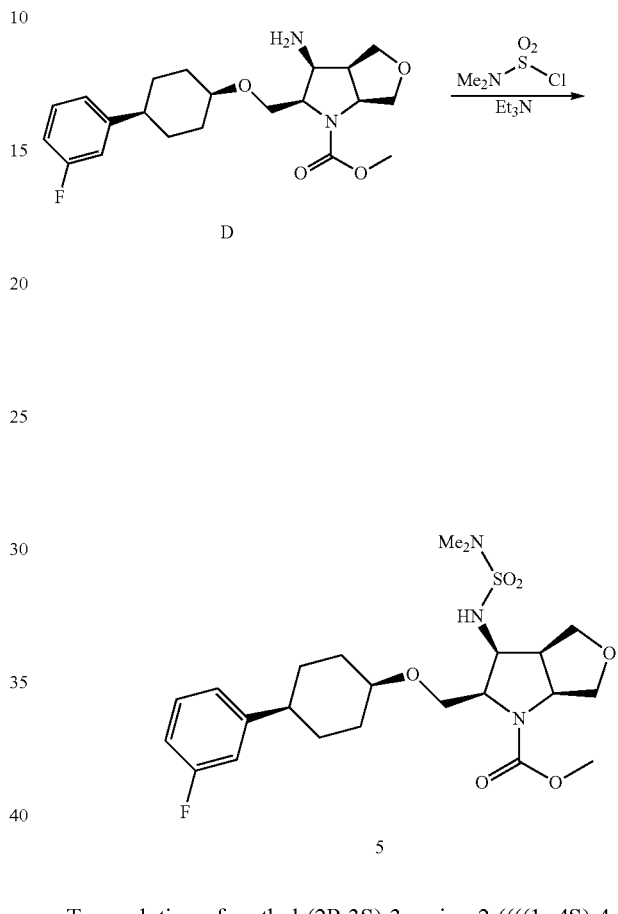

To a solution of methyl (2R,3S)-3-amino-2-((((1s,4S)-4-(3-fluorophenyl)cyclohexyl)-oxy)-methyl)hexahydro-1H-furo[3,4-b]pyrrole-1-carboxylate (D) (12 mg, 0.031 mmol) in CH2Cl2 (2 ml) was added triethylamine (0.013 ml, 0.092 mmol) and dimethylsulfamoyl chloride (8.78 mg, 0.061 mmol) at rt under N2. The reaction mixture was stirred for overnight. LC-MS shown very little desired product. To the reaction mixture was added more dimethylsulfamoyl chloride (8.78 mg, 0.061 mmol) and stirred for another 24 h. LC-MS shown moderate amount of desired product. The reaction was quenched by addition of a few drops of methanol. The crude was concentrated and the crude was chromatographed over C18 (Acetonitrile in H2O 10-100% with 0.05% of TFA) to give the desired product methyl (2R,3S,3aS,6aS)-3-((N,N-dimethyl-sulfamoyl)amino)-2-((((1s,4S)-4-(3-fluorophenyl)cyclohexyl)oxy)methyl)hexahydro-1H-furo[3,4-b]pyrrole-1-carboxylate (5). ¹H NMR (500 MHz, Methanol-d4) δ 7.33-7.23 (m, 1H), 7.09 (d, J=6.2 Hz, 1H), 7.02 (d, J=11.0 Hz, 1H), 6.88 (t, J=8.1 Hz, 1H), 4.49-4.41 (m, 1H), 4.39-4.19 (m, 3H), 3.96 (d, J=8.6 Hz, 1H), 3.85 (t, J=9.0 Hz, 1H), 3.77-3.53 (m, 7H), 3.18 (s, 1H), 2.82 (s, 6H), 2.61 (t, J=11.8 Hz, 1H), 2.09 (d, J=12.8 Hz, 2H), 1.89-1.54 (m, 6H). LC-MS 503.2.

Example 6 methyl (2R,3S,3aS,6aS)-3-((fluoromethyl)sulfonamido)-2-((((1s,4S)-4-(3-fluorophenyl)-cyclohexyl)oxy)methyl)hexahydro-1H-furo[3,4-b]pyrrole-1-carboxylate (6)

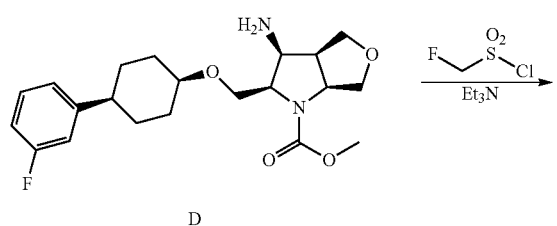

To a solution of methyl (2R,3S)-3-amino-2-((((1s,4S)-4-(3-fluorophenyl)cyclohexyl)-oxy)methyphexahydro-1H-furo[3,4-b]pyrrole-1-carboxylate (D) (12 mg, 0.031 mmol) in CH2Cl2 (2 ml) was added triethylamine (0.013 ml, 0.092 mmol) and fluoromethanesulfonyl chloride (8.0 mg, 0.061 mmol) at rt under N2. The reaction mixture was stirred for overnight. LC-MS showed formation of the desired product in 2 h. The reaction was quenched by addition of 0.1 ml of methanol. The crude was concentrated and the crude was chromatographed over C18 (acetonitrile in H2O 10-100% with 0.05% of TFA) to give the desired product methyl (2R,3S,3aS,6aS)-3-((fluoromethyl)sulfonamido)-2-((((1s,4S)-4-(3-fluorophenyl)-cyclohexyl)-oxy)methyl)hexahydro-1H-furo[3,4-b]pyrrole-1-carboxylate (6). 1H NMR (500 MHz, Methanol-$d_4$) δ 7.27 (d, J=6.9 Hz, 1H), 7.08 (d, J=7.4 Hz, 1H), 7.00 (d, J=10.5 Hz, 1H), 6.89 (d, J=7.9 Hz, 1H), 5.43 and 5.24 (ABq, 1H), 5.34 (s, 1H), 4.46 (s, 1H), 4.39 (d, J=7.7 Hz, 1H), 4.33 (s, 2H), 3.97 (d, J=9.7 Hz, 1H), 3.85 (t, J=8.4 Hz, 1H), 3.73 (s, 4H), 3.62 (d, J=9.0 Hz, 3H), 3.18 (d, J=7.4 Hz, 1H), 2.59 (d, J=11.9 Hz, 1H), 2.09 (t, J=13.4 Hz, 2H), 1.80 (d, J=12.7 Hz, 2H), 1.63 (d, J=8.8 Hz, 4H). LC-MS 489.4.

Example 7

Methyl (2R,3S,3aS,6aR)-3-(methylsulfonamido)-2-((((1s,4S)-4-phenylcyclohexyl)oxy)-methyl)hexahydrocyclopenta[b]pyrrole-1(2H)-carboxylate (7)

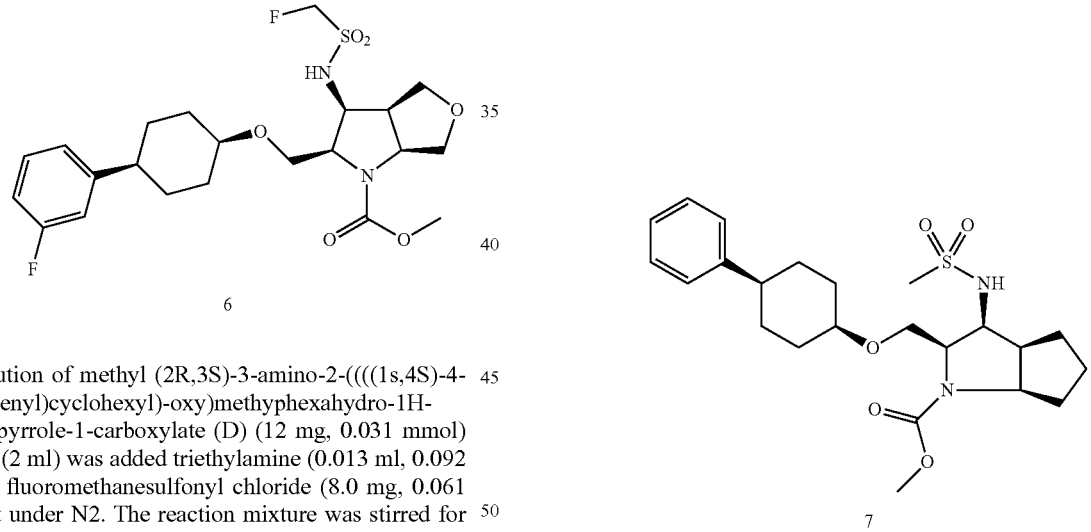

To a solution of methyl (2R,3S,3aR,6aR)-3-amino-2-(4 (1s,4S)-4-phenylcyclohexyl)oxy)-methyphexahydrocyclopenta[b]pyrrole-1(2H)-carboxylate (E, 30 mg, 0.70 mmol) in CH2Cl2 (1.0 ml) was added TEA (48 µl, 0.348 mmol) followed by addition of MsCl (8.13 µl, 0.104 mmol) at 0° C. under N2. After stirring for 15 mins at 0° C., the reaction mixture was concentrated in vacuo to give a film. The mixture was purified directly by column chromatography on C18 (5-95% MeCN/water with 0.05% TFA modifier) to afford the title compound 7. LC-MS: 451.3 (M+1). 1H NMR (500 MHz, Methanol-d4) δ 7.31-7.20 (m, 4H), 7.16 (dt, J=6.4, 3.4 Hz, 1H), 4.38 (t, J=9.0 Hz, 1H), 4.25 (s, 2H), 3.83 (s, 1H), 3.71 (s, 4H), 3.66 (d, J=10.0 Hz, 1H), 3.05 (d, J=7.0 Hz, 3H), 2.95 (p, J=9.1 Hz, 1H), 2.58 (t, J=11.9 Hz, 1H), 2.17-2.02 (m, 5H), 1.89-1.49 (m, 11H).

Example 8

Methyl (2R,3S,3aS,6aR)-3-((N,N-dimethylsulfamoyl)amino)-2-((((1s,4S)-4-phenyl-cyclohexyl)oxy)methyl)hexahydrocyclopenta[b]pyrrole-1(2H)-carboxylate (8

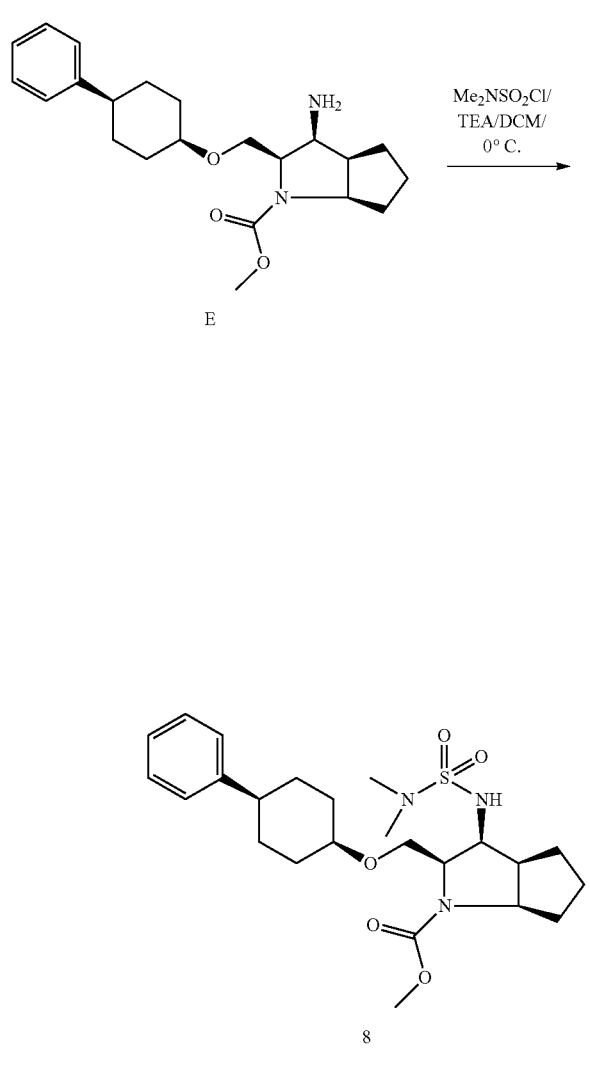

To a solution of methyl (2R,3S,3aR,6aR)-3-amino-2-(4 (1s,4S)-4-phenylcyclohexyl)oxy)-methyphexahydrocyclopenta[b]pyrrole-1(2H)-carboxylate (E, 43 mg, 0.100 mmol) in CH2Cl2 (1.2 ml) was added TEA (69 µl, 0.498 mmol) followed by addition of dimethylsulfamoyl chloride (21.46 mg, 0.149 mmol) at 0° C. under N2. After stirring for 10 mins at 0° C., the reaction was permitted to warm up to rt and was stirred at rt for 2 hrs. The reaction mixture was concentrated in vacuo to give a film. The mixture was purified directly by column chromatography on C18 (5-95% MeCN/water with 0.05% TFA modifier) to afford the title compound 8. LC-MS: (M+1) 480.4. 1H NMR (500 MHz, Methanol-d4) δ 7.36-7.11 (m, 5H), 5.51 (s, 1H), 4.36-4.16 (m, 2H), 3.91-3.65 (m, 5H), 3.42-3.13 (m, 2H), 2.95 (q, J=8.8 Hz, 1H), 2.82 (s, 3H), 2.58 (t, J=11.7 Hz, 1H), 2.05 (s, 6H), 1.98-1.49 (m, 7H), 1.47-1.21 (m, 3H).

Example 9

Methyl (2R,3S,3aS,6aR)-2-(((1-(5-fluoropyrimidin-2-yl)piperidin-4-yl)oxy)methyl)-3-(methylsulfonamido)hexahydrocyclopenta[b]pyrrole-1(2H)-3-carboxylate (9)

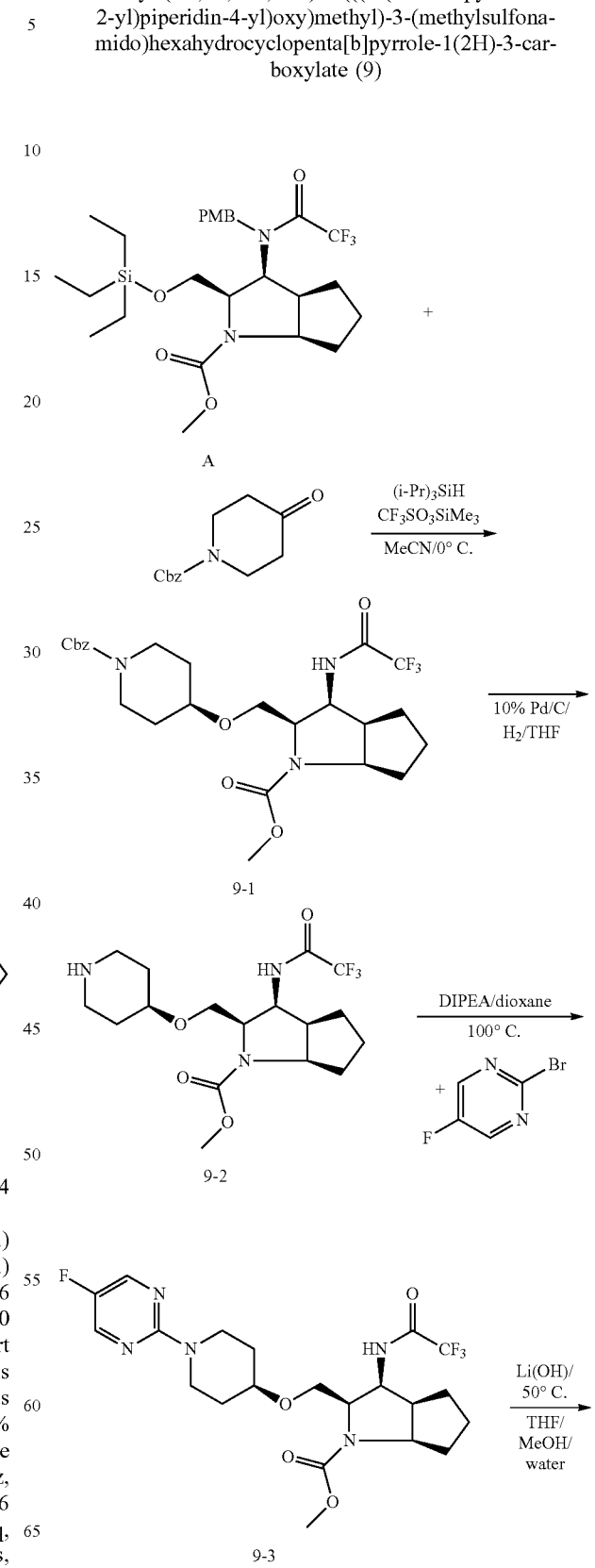

-continued

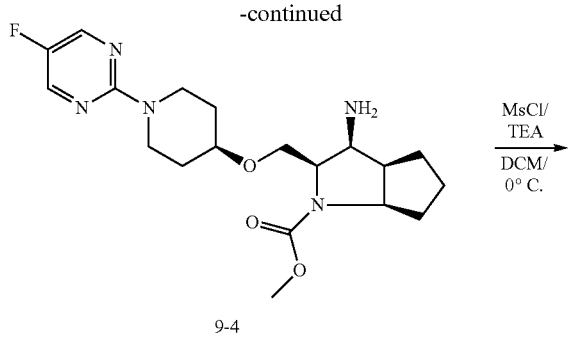

9-4

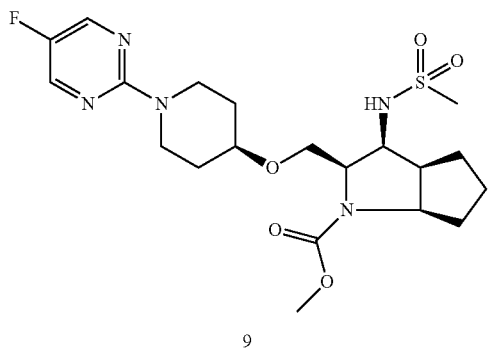

9

Step 1: Methyl (2R,3S,3aR,6aR)-2-(((1-((benzyloxy)carbonyl)piperidin-4-yl)oxy)methyl)-3-(2,2,2-trifluoroacetamido)hexahydrocyclopenta[b]pyrrole-1(2H)-carboxylate (9-1)

To a solution of methyl (2R,3S,3aS,6aR)-2-(((triethylsilyl)oxy)methyl)-3-(2,2,2-trifluoro-N-(4-methoxybenzyl)acetamido)hexahydrocyclopenta[b]pyrrole-1(2H)-carboxylate (A, 165 mg, 0.303 mmol) in acetonitrile (4.0 ml) at 0° C. was added benzyl 4-oxopiperidine-1-carboxylate (99 mg, 0.424 mmol) followed by triisopropylsilane (0.124 ml, 0.606 mmol) under N2. After 5 mins stirring at 0° C., trimethylsilyl trifluoromethanesulfonate (0.055 ml, 0.303 mmol) was added. Stirring was continued at 0° C. for 30 mins. The reaction was warmed up to rt and and stirred at rt for 2 hrs. The reaction mixture was quenched with sat. aq. NaHCO$_3$ and stirred at rt for 10 mins. The reaction mixture was extracted by 2 portions of 10 ml of DCM. The combined organic phase was collected and concentrated to give an oil. The residue was purified by prep silica gel TLC eluent with 2% MeOH/DCM to afford the title compound 9-1. LC-MS: (M+1) 528.3.

Step 2: Methyl (2R,3S,3aR,6aR)-2-((piperidin-4-yloxy)methyl)-3-(2,2,2-trifluoroacetamido)-hexahydrocyclopenta[b]pyrrole-1(2H)-carboxylate (9-2)

To a solution of methyl (2R,3S,3aR,6aR)-2-(((1-((benzyloxy)carbonyl)piperidin-4-yl)oxy)-methyl)-3-(2,2,2-trifluoroacetamido)hexahydrocyclopenta[b]pyrrole-1(2H)-carboxylate (9-1, 91 mg, 0.172 mmol) in THF (3 ml) was added 10% palladium on carbon (18.36 mg, 0.017 mmol). The reaction mixture was degassed and refilled with H2 from balloon for three times. The reaction mixture was stirred at rt under hydrogen balloon for 4 hrs. The reaction mixture was filtered through a celite pad. The filtrate was concentrated to give an oil. The residue was purified by prep silica gel TLC eluent with 5% 7 N NH3 in MeOH/DCM to afford the title compound 9-2. LC-MS: (M+1) 394.3.

Step 3: Methyl (2R,3S,3aR,6aR)-2-(((1-(5-fluoropyrimidin-2-yl)piperidin-4-yl)oxy)methyl)-3-(2,2,2-trifluoroacetamido)hexahydrocyclopenta[b]pyrrole-1(2H)-carboxylate (9-3)

To a solution of methyl (2R,3S,3aR,6aR)-2-((piperidin-4-yloxy)methyl)-3-(2,2,2-trifluoroacetamido)hexahydrocyclopenta[b]pyrrole-1(2H)-carboxylate (9-2, 34 mg, 0.086 mmol) and 2-bromo-5-fluoropyrimidine (24.47 mg, 0.138 mmol) in 1,4-dioxane (1.2 ml) was added DIPEA (60 µl, 0.346 mmol). The reaction mixture was sealed in the reaction vial and heated at 100° C. overnight. The reaction mixture was concentrated to give an oil. The residue was purified by prep silica gel TLC eluent with 2% MeOH/DCM to afford the title compound 9-3. MS: (M+1) 490.4.

Step 4: Methyl (2R,3S,3aR,6aR)-3-amino-2-(((1-(5-fluoropyrimidin-2-yl)piperidin-4-yl)oxy)methyl)hexahydrocyclopenta[b]pyrrole-1(2H)-carboxylate (9-4)

To a stirred solution of methyl (2R,3S,3aR,6aR)-2-(((1-(5-fluoropyrimidin-2-yl)piperidin-4-yl)oxy)methyl)-3-(2,2,2-trifluoroacetamido)hexahydrocyclopenta[b]pyrrole-1(2H)-carboxylate (9-3, 12 mg, 0.025 mmol) in THF (0.15 ml) and MeOH (1.5 ml) was added LITHIUM HYDROXIDE (5.87 mg, 0.245 mmol) followed by water (0.75 ml). The mixture was heated at 50° C. for 2.5 hrs. Most of the solvent was removed under reduced pressure to give a film. The residue was purified by prep silica gel TLC eluent with 5% MeOH/DCM to afford the title compound 9-4. LC-MS: (M+1) 394.3.

Step 5: Methyl (2R,3S,3aS,6aR)-2-(((1-(5-fluoropyrimidin-2-yl)piperidin-4-yl)oxy)methyl)-3-(methylsulfonamido)hexahydrocyclopenta[b]pyrrole-1(2H)-carboxylate (9)

To a solution of methyl (2R,3S,3aR,6aR)-3-amino-2-(41-(5-fluoropyrimidin-2-yl)piperidin-4-yl)oxy)methyphexahydrocyclopenta[b]pyrrole-1(2H)-carboxylate (9-4, 8 mg, 0.020 mmol) in CH2Cl2 (0.8 ml) was added TEA (8.5 µl, 0.061 mmol) followed by addition of MsCl (2.376 µl, 0.030 mmol) at 0° C. under N2. After stirring for 15 mins at 0° C., the reaction mixture was concentrated in vacuo to give a film. The residue was purified directly by column chromatography on C18 (5-95% MeCN/water with 0.05% TFA modifier) to afford the title compound 9. MS: (M+1) 472.3. 1H NMR (500 MHz, Methanol-d4) δ 8.28 (s, 2H), 4.34 (t, J=9.0 Hz, 1H), 4.20 (dd, J=10.3, 5.2 Hz, 4H), 3.90-3.79 (m, 1H), 3.77-3.62 (m, 5H), 3.45 (t, J=10.2 Hz, 2H), 3.02 (s, 3H), 2.92 (p, J=8.7 Hz, 1H). 2.15-1.88 (m, 5H), 1.87-1.48 (m, 5H).

Example 10

Isopropyl (2R,3S,3aS,6aR)-2-(((1-(5-fluoropyrimidin-2-yl)piperidin-4-yl)oxy)methyl)-3-(methylsulfonamido)hexahydrocyclopenta[b]pyrrole-1(2H)-carboxylate (10)

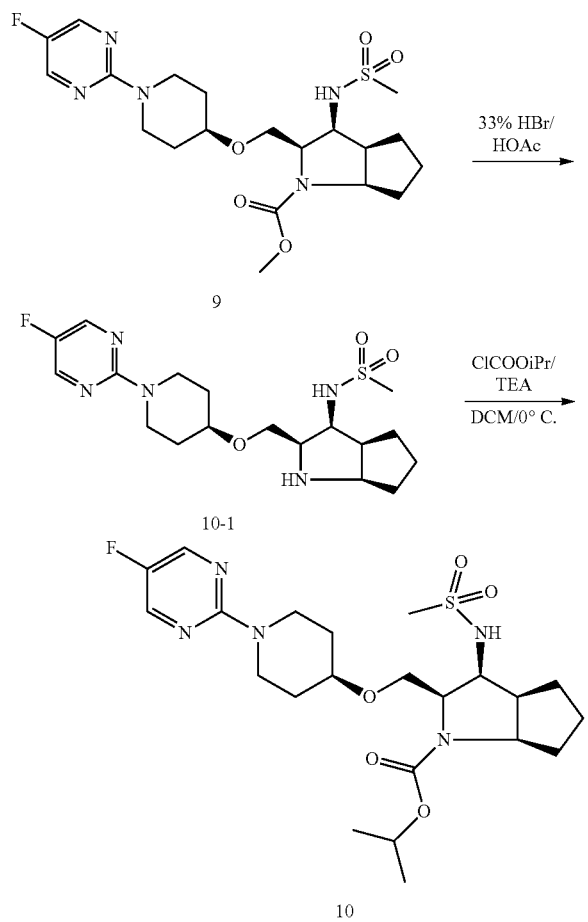

Step 1: N-((2R,3S,3aS,6aR)-2-(((1-(5-fluoropyrimidin-2-yl)piperidin-4-yl)oxy)methyl)-octahydrocyclopenta[b]pyrrol-3-yl)methanesulfonamide (10-1)

To methyl (2R,3S,3aS,6aR)-2-(((1-(5-fluoropyrimidin-2-yl)piperidin-4-yl)oxy)methyl)-3-(methylsulfonamido)hexahydrocyclopenta[b]pyrrole-1(2H)-carboxylate (9, 6 mg, 0.013 mmol) was added 33% HBr in acetic acid solution (132 µl, 0.763 mmol). The reaction mixture was stirred at rt overnight. The reaction was quenched with water (6 ml) and stirred at rt for 10 mins. The reaction mixture was concentrated to give a film. The residue was purified by prep silica gel TLC eluent with 6% 7N NH3 in MeOH/DCM to afford the title compound (10-1. LC-MS: (M+1) 414.3.

Step 2: Isopropyl (2R,3S,3aS,6aR)-2-(((1-(5-fluoropyrimidin-2-yl)piperidin-4-yl)oxy)methyl)-3-(methylsulfonamido)hexahydrocyclopenta[b]pyrrole-1(2H)-carboxylate (10)

To a solution of N-((2R,3S,3aS,6aR)-2-(((1-(5-fluoropyrimidin-2-yl)piperidin-4-yl)oxy)methyl)octahydrocyclopenta[b]pyrrol-3-yl)methanesulfonamide (10-1, 4 mg, 9.67 µmol) in DCM (0.4 ml) at 0° C. was added TEA (3.37 µl, 0.024 mmol) followed by ISOPROPYL CHLOROFORMATE solution (1.0 M in toluene, 0.012 ml, 0.012 mmol). The reaction mixture was stirred at 0° C. for 5 mins. The reaction mixture was concentrated to give a film. The residue was purified directly by column chromatography on C18 (5-95% MeCN/water with 0.05% TFA modifier) to afford the title compound (10). LC-MS: (M+1) 500.3. 1H NMR (500 MHz, Methanol-d4) δ 8.27 (s, 2H), 4.34 (t, J=8.9 Hz, 1H), 4.25-4.12 (m, 4H), 3.85 (t, J=10.7 Hz, 1H), 3.76-3.64 (m, 2H), 3.47 (t, J=10.9 Hz, 2H), 3.03 (s, 3H), 2.97-2.86 (m, 1H), 2.14-1.88 (m, 4H), 1.86-1.73 (m, 2H), 1.72-1.47 (m, 4H), 1.39-1.21 (m, 7H).

Example 11 methyl (1R,3R,4S,5S)-4-(methylsulfonamido)-3-(((((1s,4S)-4-phenylcyclohexyl)oxy)methyl)-2-azabicyclo[3.2.0]heptane-2-carboxylate (11)

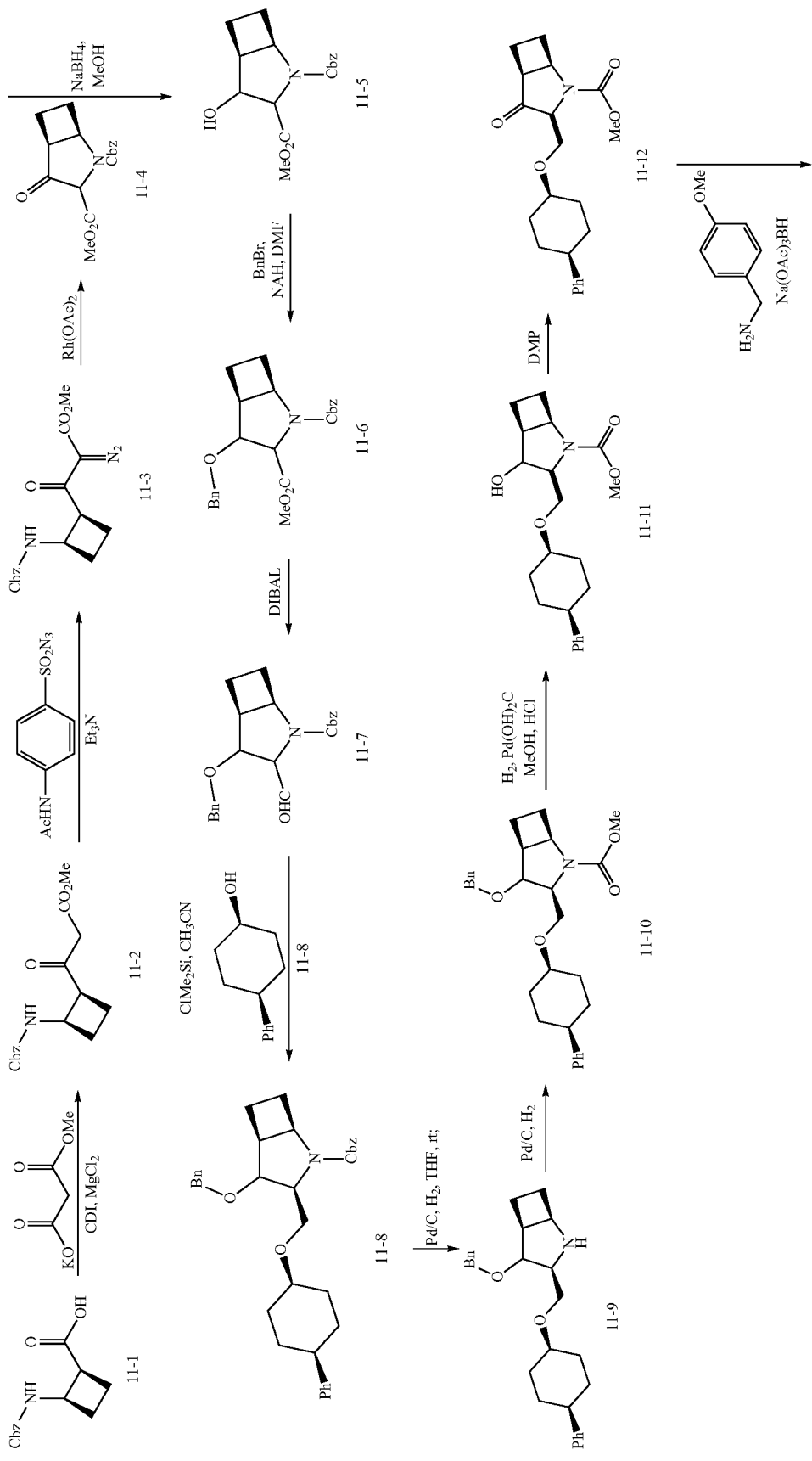

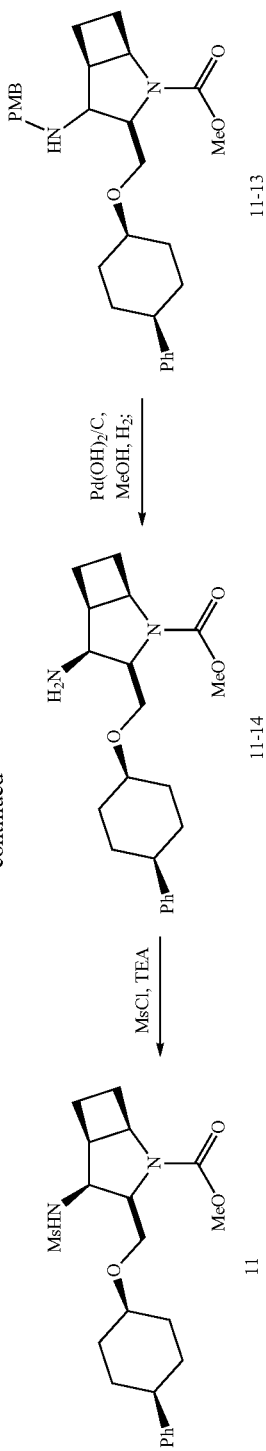

Step 1: methyl 3-((1S,2R)-2-(((benzyloxy)carbonyl) amino)cyclobutyl)-3-oxopropanoate (11-2)

A solution of (1S,2R)-2-(((benzyloxy)carbonyl)amino) cyclobutane-1-carboxylic acid (11-1, 1.0 g, 4.01 mmol) in anhydrous THF (20 ml) under N2 was treated with di(1H-imidazol-1-yl)methanone (0.976 g, 6.02 mmol). After stirring at room temperature for 1 h, magnesium chloride (0.707 ml, 8.02 mmol) and potassium 3-methoxy-3-oxopropanoate (1.253 g, 8.02 mmol) was added. The resulting mixture was kept under N2 and was stirred at room temperature for an additional 18 h. The solvent was evaporated and the residue was dissolved in ethyl acetate (100 mL) and washed with water (10 mL) and brine (5 mL). The organic layer was dried over MgSO4, filtered and evaporated under reduced pressure. The residue was purified by column chromatography (ISCO, silic, EtOAc in hexanex 0-60%) to afford methyl 3-((1S,2R)-2-(((benzyloxy)carbonyl)amino)cyclobutyl)-3-oxopropanoate (11-2). LC-MS (M+1) 306.2.

Step 2: methyl 3-((1S,2R)-2-(((benzyloxy)carbonyl) amino)cyclobutyl)-2-diazo-3-oxopropanoate (11-3)

To a solution of methyl 3-((1R,2S)-2-(((benzyloxy)carbonyl)amino)cyclobutyl)-3-oxopropanoate (11-2) (1.0 g, 3.28 mmol) in CH2Cl2 (200 ml) was added triethylamine (0.994 g, 9.83 mmol) and 4-acetamidobenzenesulfonyl azide (0.787 g, 3.28 mmol) at rt under N2. The reaction mixture was stirred for 12 h. LC-MS shown starting material converted to the desired product. The crude was diluted with 200 ml of DCM, washed with 50 ml of H2O. The organic phase was collected and dried (MgSO4), concentrated and chromatographed over silica gel (ISCO, 0-100% Ethyl acetate in hexanes) to give the desired product methyl 3-((1R,2S)-2-(((benzyloxy)carbonyl)-amino)cyclobutyl)-2-diazo-3-oxopropanoate (11-3). LCMS (M+Na) 354.3.

Step 3: 2-benzyl 3-methyl (1R,5S)-4-oxo-2-azabicyclo[3.2.0]heptane-2,3-dicarboxylate (11-4)

To a solution of methyl 3-(2-(((benzyloxy)carbonyl) amino)cyclobutyl)-2-diazo-3-oxopropanoate (11-3) (940 mg, 2.84 mmol) in Toluene (50 ml) was added diacetoxyrhodium (62.7 mg, 0.142 mmol) under N2 at rt. The reaction mixture was degassed for 10 min, then was stirred at 80° C. for 2 h. LC-MS shown formation of the desired product. The reaction mixture was concentrated and chromatographed over silica gel (ISCO 80 g, 0-100% EtOAc in hexanes) to give the desired product 2-benzyl 3-methyl 4-oxo-2-azabicyclo[3.2.0]heptane-2,3-dicarboxylate (11-4). LC-MS (M+1) 304.2.

Step 4: 2-benzyl 3-methyl (1R,5S)-4-hydroxy-2-azabicyclo[3.2.0]heptane-2,3-dicarboxylate (11-5)

To a solution of 2-benzyl 3-methyl 4-oxo-2-azabicyclo [3.2.0]heptane-2,3-dicarboxylate (11-4) (0.86 g, 2.84 mmol) in MeOH (10.0 ml) and THF (20.00 ml) was added sodium borohydride (0.086 g, 2.268 mmol) little by little under N2 at 0° C. over 15 min. The reaction mixture was stirred for 0.5 h. LC-MS shown no SM left and the desired product is the major peak on spectra. The reaction was quenched by dropwise addition of 2N KHSO4 at 0° C. until pH acidic. The mixture was extracted by 2 portions of 50 ml of EtOAc. The organic phase was collected, dried (MgSO4), concentrated and chromatographed over silica gel (ISCO, 40 g, 0-50% EtOAc in hexanes) to give product 2-benzyl 3-methyl 4-hydroxy-2-azabicyclo[3.2.0]heptane-2,3-dicarboxylate (11-5). LC-MS (M+1) 306.3.

Step 5: 2-benzyl 3-methyl (1R,5S)-4-(benzyloxy)-2-azabicyclo[3.2.0]heptane-2,3-dicarboxylate (11-6)

To a solution of 2-benzyl 3-methyl (1R,3R,4S,5S)-4-hydroxy-2-azabicyclo-[3.2.0]heptane-2,3-dicarboxylate (X-5) (0.9 g, 2.95 mmol) and benzyl bromide (0.386 ml, 3.24 mmol) in DMF (15 ml) was added NaH (0.153 g, 3.83 mmol) at 0° C. under N2. The reaction mixture bubbled for a few minutes, then turned clear. After stirring for 10 min, LC-MS shown no SM left, and only desired product was observed. The reaction mixture was quenched by addition of sat. aq. NH4Cl, then to the suspension was added 10 ml of EtOAc. After stirring for 30 min, the organic phase was collected, dried (MgSO4), concentrated and chromatographed over silica gel (ISCO, 24 g, 0-100% EtOAc in hexanes) to give product 2-benzyl 3-methyl (1R,3R,4S,5S)-4-(benzyloxy)-2-azabicyclo[3.2.0]heptane-2,3-dicarboxylate (11-6). LC-MS (M+1) 396.4.

Step 6: benzyl (1R,5S)-4-(benzyloxy)-3-formyl-2-azabicyclo[3.2.0]heptane-2-carboxylate (11-7)

To a solution of 2-benzyl 3-methyl (1R,5S)-4-(benzyloxy)-2-azabicyclo[3.2.0]-heptane-2,3-dicarboxylate (11-6) (730 mg, 1.846 mmol) in was CH2Cl2 (100 ml) added DIBAL-H (2.77 ml, 2.77 mmol) (1.0 M in toluene) dropwise at −40° C. (acetonitrile/dry ice) under N2 via a syringe pump over 1 h. The reaction mixture was stirred for 30 min. LC-MS shown formation of the desired product. The reaction was quenched by adding 2 ml of methanol, stirred for 30 min, then added 10 ml of sat. aq. Rochelle salt, stirred for 30 min while raised to rt. The organic phase was collected, dried (MgSO4), concentrated and purified by chromatography (silica gel, ISCO 40 g, 0 to 50% ethyl acetate/hexanes) to give the desired product benzyl (1R,5S)-4-(benzyloxy)-3-formyl-2-azabicyclo[3.2.0]heptane-2-carboxylate (11-7). LC-MS (M+1) 366.3.

Step 7: benzyl (1R,3S,5S)-4-(benzyloxy)-3-(4(1s,4R)-4-phenylcyclohexyl)oxy)methyl)-2-azabicyclo [3.2.0]heptane-2-carboxylate (11-8)

To a solution of benzyl (1R,3R,5S)-4-(benzyloxy)-3-formyl-2-azabicyclo[3.2.0]-heptane-2-carboxylate (11-7) (480 mg, 1.314 mmol), (1s,4s)-4-phenylcyclohexan-1-ol (347 mg, 1.970 mmol) in acetonitrile (30 ml) was added chlorodimethylsilane (186 mg, 1.970 mmol) at 0° C. under N2. The reaction mixture was raised to rt and stirred for 4 h. LC-MS shown formation of the desired product. The reaction was quenched by addition of 0.5 ml of sat. aq. NaHCO3, and the mixture was diluted with 5 ml of DCM, dried by MgSO4. The crude was chromatographed over silica gel (ISCO, 24 g, 0-40% EtOAc in hexanes) to give the desired product benzyl (1R,3S,5S)-4-(benzyloxy)-3-((((1s,4R)-4-phenylcyclohexyl)oxy)methyl)-2-azabicyclo[3.2.0]-heptane-2-carboxylate (11-8). LC-MS (M+1) 526.4.

Step 8: (1R,3S,5S)-4-(benzyloxy)-3-4((1s,4R)-4-phenylcyclohexyl)oxy)methyl)-2-azabicyclo[3.2.0] heptane (11-9)

A solution of benzyl (1R,3S,5S)-4-(benzyloxy)-3-(4(1s, 4R)-4-phenylcyclohexyl)-oxy)methyl)-2-azabicyclo[3.2.0] heptane-2-carboxylate (11-8) (100 mg, 0.190 mmol) in THF (10 ml) was added palladium on carbon (40.5 mg, 0.019 mmol), then was degassed and refilled with H2 three times with a balloon. The reaction mixture was stirred at rt for 30 min. LC-MS shown reaction completed. The reaction mixture was filtered through a celite pad and the filtrate was concentrated to give the crude product which was chromatographed over ISCO (C18, 10-100% Acetonitrile in H2O) to give the desired product (1R,3S,5S)-4-(benzyloxy)-3-((((1s,4R)-4-phenylcyclohexyl)oxy)methyl)-2-azabicyclo[3.2.0]heptane (11-9). LC-MS 392.4.

Step 9: methyl (1R,3S,5S)-4-(benzyloxy)-3-(4(1s,4R)-4-phenylcyclohexyl)oxy)methyl)-2-azabicyclo[3.2.0]heptane-2-carboxylate (11-10)

To a solution of (1R,3S,4S,5S)-4-(benzyloxy)-3-((((1s,4R)-4-phenylcyclohexyl)-oxy)methyl)-2-azabicyclo[3.2.0]heptane (11-9) (50 mg, 0.128 mmol) in CH2Cl2 (5 ml) was added triethylamine (0.053 ml, 0.383 mmol) and methyl chlorofORMATE (0.020 ml, 0.255 mmol) at 0° C. under N2. The reaction mixture was stirred at rt for 30 min. LC-MS shown SM disappeared. To the reaction mixture was added a few drops of MeOH. The crude was concentrated and chromatographed over silica gel (ISCO, 4 g, 0-100% EtOAc in hexanes) to give the desired product methyl (1R,3S,4S,5S)-4-(benzyloxy)-3-((((1s,4R)-4-phenylcyclohexyl)-oxy)methyl)-2-azabicyclo[3.2.0]heptane-2-carboxylate (11-10). LC-MS (M+1) 450.4.

Step 10: methyl (1R,3S,5S)-4-hydroxy-3-((((1s,4R)-4-phenylcyclohexyl)oxy)methyl)-2-azabicyclo[3.2.0]heptane-2-carboxylate (11-11)

A solution of methyl (1R,3S,4S,5S)-4-(benzyloxy)-3-(4(1s,4R)-4-phenylcyclohexyl)oxy)methyl)-2-azabicyclo[3.2.0]heptane-2-carboxylate (11-10) (50 mg, 0.111 mmol) in THF (10 ml) was added palladium hydroxide on carbon (15.62 mg, 0.011 mmol), then was vacuumed and refilled with H2 three times with a balloon. The reaction mixture was stirred at rt for 30 min. LC-MS shown SM disappeared. The reaction mixture was filtered through a celite pad and the filtrate was concentrated. The crude was chromatographed over silica gel (C18, Acetonitrile in H2O 0-100%) to give the desired product methyl (1R,3S,4S,5S)-4-hydroxy-3-((((1s,4R)-4-phenylcyclohexyl)oxy)methyl)-2-azabicyclo[3.2.0]heptane-2-carboxylate (11-11). LC-MS (M+1) 360.4.

Step 11: methyl (1R,3S,5S)-4-oxo-3-((((1s,4R)-4-phenylcyclohexyl)oxy)methyl)-2-azabicyclo[3.2.0]heptane-2-carboxylate (11-12)

To a solution of methyl (3S,4S)-4-hydroxy-3-(4(1s,4R)-4-phenylcyclohexyl)-oxy)methyl)-2-azabicyclo[3.2.0]heptane-2-carboxylate (11-11) (20 mg, 0.056 mmol) in CH2Cl2 (10 ml) was added Dess-MartinPeriodinane (28.3 mg, 0.067 mmol) at 0° C. under N2. The reaction mixture was stirred at rt for 2 h. LC-MS shown formation of the desired product. To the reaction mixture was added 2 ml of sat. aq. NaHCO3. The organic phase was collected, concentrated and chromatographed over silica gel (ISCO, 4 g, 0-80% EtOAc in hexanes) to give the desired product methyl (3S)-4-oxo-3-(4(1s,4R)-4-phenylcyclohexyl)oxy)methyl)-2-azabicyclo[3.2.0]heptane-2-carboxylate (11-12). LC-MS (M+1) 358.4.

Step 12: methyl (1R,3R,4S,5R)-4-((4-methoxybenzyl)amino)-3-(4(1s,4S)-4-phenylcyclohexyl)-oxy)methyl)-2-azabicyclo[3.2.0]heptane-2-carboxylate (11-13)

To a solution of methyl (1R,3S,5S)-4-oxo-3-(4(1s,4R)-4-phenylcyclohexyl)oxy)-methyl)-2-azabicyclo[3.2.0]heptane-2-carboxylate (11-12) (10 mg, 0.028 mmol) in DCM (2 ml) was added (4-methoxyphenyl)methanamine (4.22 mg, 0.031 mmol) and catalytic amount of acetic acid (0.080 µl, 1.399 µmol). The mixture was stirred at rt for 30 mins, then sodium triacetoxy-borohydride (7.12 mg, 0.034 mmol) was added to the mixture. The reaction was stirred at rt for overnight. LCMS showed completion of the reaction. The reaction was quenched with saturated NaHCO3 solution (0.5 ml), extracted with DCM (5 ml). The combined organic was dried over MgSO4. Filtered and concentrated, the residue was purified by chromatography column on silica gel (ISCO, 4 g, with (3:1 EtOAC: MeOH): Hexanes=0-100%) to afford the title compound methyl (1R,3R,4S,5R)-4-((4-methoxybenzyl)amino)-3-4((1s,4S)-4-phenylcyclohexyl)oxy)methyl)-2-azabicyclo[3.2.0]heptane-2-carboxylate (11-13). LCMS 479.4.

Step 13: methyl (1R,3R,4S,5R)-4-amino-3-((((1s,4S)-4-phenylcyclohexyl)oxy)methyl)-2-azabicyclo[3.2.0]heptane-2-carboxylate (11-14)

To a solution of methyl (1R,3R,4S,5R)-4-((4-methoxybenzyl)amino)-3-4((1s,4S)-4-phenylcyclohexyl)oxy)methyl)-2-azabicyclo[3.2.0]heptane-2-carboxylate (11-13) (8 mg, 0.017 mmol) in MeOH (5 ml) was added palladium hydroxide on carbon (1.174 mg, 1.671 µmol. The mixture was vacuumed and refilled with H2 for three times. Then the reaction mixture was stirred under H2 from balloon for 2 h. LC-MS shown reaction completed. The reaction mixture was filtered through a celite pad and the filtrate was concentrated and chromatographed over silica gel (C18, acetonitrile in H2O 0-100%) to give the desired product methyl (1R,3R,4S,5R)-4-amino-3-((((1s,4S)-4-phenylcyclohexyl)oxy)methyl)-2-azabicyclo[3.2.0]heptane-2-carboxylate (11-14) as an oil. LC-MS (M+1) 359.4.

Step 14: methyl (1R,3R,4S,5S)-4-(methylsulfonamido)-3-((((1s,4S)-4-phenylcyclohexyl)-oxy)methyl)-2-azabicyclo[3.2.0]heptane-2-carboxylate (11)

To a solution of methyl (1R,3R,4S,5R)-4-amino-3-((((1s,4S)-4-phenylcyclohexyl)oxy)-methyl)-2-azabicyclo[3.2.0]heptane-2-carboxylate (11-14) (3 mg, 8.37 µmol) in DCM (2 ml) was added triethylamine (2.333 µl, 0.017 mmol) and Ms-Cl (0.978 µl, 0.013 mmol). The mixture was stired at rt for 30 mins, LC-MS shown formation of the desired product. To the reaction mixture was stopped by added a few drops of methanol. The crude was concentrated and chromatographed over silica gel (C18, 10-100% Acetonitrile in H2O) to give the desired product methyl (1R,3R,4S,5S)-4-(methylsulfonamido)-3-(4(1s,4S)-4-phenylcyclohexyl)oxy)-methyl)-2-azabicyclo[3.2.0]heptane-2-carboxylate (11). 1H NMR (500 MHz, Methanol-$d_4$) δ 7.24 (d, J=11.5 Hz, 3H), 7.14 (s, 1H), 4.33 (m, 3H), 4.12 (m, 1H), 3.76 (m, 2H), 3.69 (s, 3H), 3.02 (s, 3H), 2.58 (s, 1H), 2.44 (m, 2H), 2.14 (m, 2H), 1.95 (s, 1H), 1.79 (m, 4H), 1.64 (m, 4H). LC-MS (M+1) 437.3.

The following table shows representative data for the compounds of the Examples as orexin receptor agonists as determined by the assays described herein.

| Example | hOX2R_IP IC$_{50}$ (nM) | Emax (%) |
|---------|-------------------------|----------|
| 1       | 2.53                    | 101      |
| 2       | 0.59                    | 101      |
| 3       | 0.83                    | 98       |
| 4       | 8.79                    | 101      |
| 5       | 0.89                    | 101      |
| 6       | 4.89                    | 102      |
| 7       | 6.43                    | 101      |
| 8       | 1.16                    | 98       |
| 9       | 5.59                    | 97       |
| 10      | 4.06                    | 103      |
| 11      | 37.4                    | 103      |

With respect to other compounds such as those disclosed in US 2017/0226137, WO 2017/135306, WO 2018/164191, WO 2018/164192, WO 2019/027003, WO 2019/027058, WO2020/122092, WO2020/122093, WO 2020/158958, U.S. Pat. Nos. 9,527,807, 10,287,305, 10,428,023, or U.S. Pat. No. 10,508,083, it would be desirable that the present compounds exhibit unexpected properties, such as better drug-like properties and better physical and pharmacokinetic properties. For example, in contrast to compounds of US 2017/0226137, WO 2017/135306, WO 2018/164191, WO 2018/164192, WO 2019/027003, WO 2019/027058, WO2020/122092, WO2020/122093, WO 2020/158958, U.S. Pat. Nos. 9,527,807, 10,287,305, 10,428,023, or 10,508,083, the compounds of the present examples may possess improved potency and/or better metabolic stability and solubility.

As indicated by the data herein, the compounds of the present examples provide unexpected potency as orexin receptor agonists. The distinction in potency as orexin receptor agonists provides greater functional activity and potential for enhanced in vivo efficacy and may provide benefits over other orexin receptor agonists that are known in the art.

While the invention has been described and illustrated with reference to certain particular embodiments thereof, those skilled in the art will appreciate that various adaptations, changes, modifications, substitutions, deletions, or additions of procedures and protocols may be made without departing from the spirit and scope of the invention.

What is claimed is:

1. A compound of the formula I:

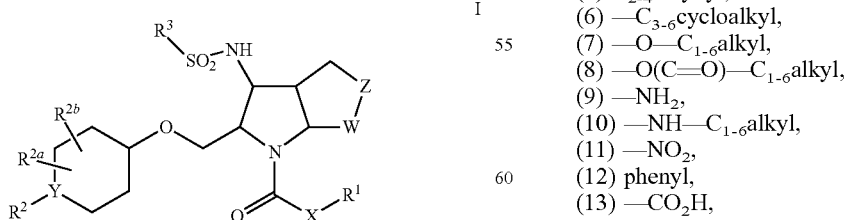

wherein:
X is —O— or —NH—, or X may be a direct bond to $R^1$;
Y is N or CH;
Z is —O— or CH;
W is CH, or if Z is CH, W may be a direct bond to Z;

$R^1$ is selected from:
(1) —$C_{1-6}$alkyl, where the alkyl is unsubstituted or substituted with one to six substituents independently selected from $R^4$, and
(2) —$C_{3-6}$cycloalkyl, where the cycloalkyl is unsubstituted or substituted with one to six substituents independently selected from $R^4$;

$R^2$ is selected from:
(1) hydrogen,
(2) —$C_{1-6}$alkyl, where the alkyl is unsubstituted or substituted with one to six substituents independently selected from $R^4$,
(3) —$C_{3-6}$cycloalkyl, where the cycloalkyl is unsubstituted or substituted with one to six substituents independently selected from $R^4$,
(4) -phenyl, where the phenyl is unsubstituted or substituted with one to three substituents independently selected from $R^4$, and
(5) -heteroaryl, where the heteroaryl is selected from: pyridyl, pyrimidinyl, and pyrazinyl, and the heteroaryl is unsubstituted or substituted with one to three substituents independently selected from $R^4$;

$R^{2a}$ and $R^{2b}$ are independently selected from:
(1) hydrogen,
(2) hydroxyl,
(3) halogen, and
(4) —$C_{1-6}$alkyl, where the alkyl is unsubstituted or substituted with one to six substituents independently selected from halogen;

$R^3$ is selected from:
(1) —$C_{1-6}$alkyl, where the alkyl is unsubstituted or substituted with one to six substituents independently selected from $R^4$,
(2) —$C_{3-6}$cycloalkyl, where the cycloalkyl is unsubstituted or substituted with one to six substituents independently selected from $R^4$,
(3) -phenyl, where the phenyl is unsubstituted or substituted with one to three substituents independently selected from $R^4$,
(4) —$NR^{10}R^{11}$, wherein $R^{10}$ and $R^{11}$ are independently selected from:
(a) hydrogen, and
(b) $C_{1-6}$alkyl, which is unsubstituted or substituted with one to six $R^4$;

$R^4$ is selected from:
(1) hydroxyl,
(2) halogen,
(3) $C_{1-6}$alkyl, which is unsubstituted or substituted with one to six fluoro,
(4) $C_{2-4}$alkenyl,
(5) $C_{2-4}$alkynyl,
(6) —$C_{3-6}$cycloalkyl,
(7) —O—$C_{1-6}$alkyl,
(8) —O(C=O)—$C_{1-6}$alkyl,
(9) —$NH_2$,
(10) —NH—$C_{1-6}$alkyl,
(11) —$NO_2$,
(12) phenyl,
(13) —$CO_2H$,
(14) —$SO_2$—$C_{1-6}$alkyl,
(15) —$C_{3-5}$cycloalkyl($SO_2$), and
(16) —CN;

or a pharmaceutically acceptable salt thereof.

2. The compound of claim 1 or a pharmaceutically acceptable salt thereof wherein X is —O—.

3. The compound of claim 1 or a pharmaceutically acceptable salt thereof wherein Z is CH and W is CH.

4. The compound of claim 1 or a pharmaceutically acceptable salt thereof wherein Z is —O— and W is CH.

5. The compound of claim 1 or a pharmaceutically acceptable salt thereof wherein Z is CH and W is a direct bond to Z.

6. The compound of claim 1 or a pharmaceutically acceptable salt thereof wherein $R^1$ is selected from:
(1) methyl,
(2) ethyl,
(3) —CH$_2$OH,
(4) —CH$_2$CF$_3$,
(5) —CH$_2$CHF$_2$,
(6) —CH(CH$_3$)$_2$,
(7) —CH$_2$CH$_2$CH$_2$F,
(8) cyclopropyl,
(9) —CH$_2$-cyclopropyl,
(10) —CH$_2$-cyclobutyl, and
(11) —CH$_2$O(C═O)CH$_3$.

7. The compound of claim 1 or a pharmaceutically acceptable salt thereof wherein $R^2$ is selected from:
(1) hydrogen,
(2) —CH$_2$(CH$_3$)$_2$,
(3) —CF$_3$,
(4) —CH$_2$CHF$_2$,
(5) —CH$_2$CF$_3$,
(6) phenyl, which is unsubstituted or substituted with —CF$_3$, —CH$_2$CF$_3$, or one to three fluoro, and
(7) pyrimidinyl, which is unsubstituted or substituted with —CF$_3$, —CH$_2$CF$_3$, or one to three fluoro.

8. The compound of claim 1 or a pharmaceutically acceptable salt thereof wherein $R^{2a}$ is hydrogen and $R^{2b}$ is hydrogen.

9. The compound of claim 1 or a pharmaceutically acceptable salt thereof wherein $R^3$ is selected from:
(1) —C$_{1-6}$alkyl, where the alkyl is unsubstituted or substituted with one to three fluoro,
(2) —C$_{3-6}$cycloalkyl,
(3) —NH$_2$,
(4) —NH(C$_{1-6}$alkyl),
(5) —N(C$_{1-6}$alkyl)(C$_{1-6}$alkyl), and
(6) -phenyl.

10. A compound which is selected from:
methyl (2R,3S,3aS,6aR)-2-((((1s,4S)-4-(3-fluorophenyl) cyclohexyl)oxy)methyl)-3-(methylsulfonamido)hexahydrocyclopenta[b]pyrrole-1(2H)-carboxylate;
methyl (2R,3S,3aS,6aR)-3-((N,N-dimethylsulfamoyl) amino)-2-((((1s,4S)-4-(3-fluorophenyl)cyclohexyl) oxy)methyl)hexahydrocyclopenta[b]pyrrole-1(2H)-carboxylate;
methyl (2R,3S,3aS,6aR)-2-((((1s,4S)-4-(3-fluorophenyl) cyclohexyl)oxy)methyl)-3-((N-methylsulfamoyl) amino)hexahydrocyclopenta[b]pyrrole-1(2H)-carboxylate;
methyl (2R,3S,3aS,6aS)-2-((((1s,4S)-4-(3-fluorophenyl) cyclohexyl)oxy)methyl)-3-(methylsulfonamido)hexahydro-1H-furo[3,4-b]pyrrole-1-carboxylate;
methyl (2R,3S,3aS,6aS)-3-((N,N-dimethylsulfamoyl) amino)-2-((((1s,4S)-4-(3-fluorophenyl)cyclohexyl) oxy)methyl)hexahydro-1H-furo[3,4-b]pyrrole-1-carboxylate;
methyl (2R,3S,3aS,6aS)-3-((fluoromethyl)sulfonamido)-2-((((1s,4S)-4-(3-fluorophenyl)cyclohexyl)oxy) methyl)hexahydro-1H-furo[3,4-b]pyrrole-1-carboxylate;
methyl (2R,3S,3aS,6aR)-3-(methylsulfonamido)-2-((((1s, 4S)-4-phenylcyclohexyl)oxy)methyl)hexahydrocyclopenta[b]pyrrole-1(2H)-carboxylate;
methyl (2R,3S,3aS,6aR)-2-(((1-(5-fluoropyrimidin-2-yl) piperidin-4-yl)oxy)methyl)-3-(methylsulfonamido) hexahydrocyclopenta[b]pyrrole-1(2H)-carboxylate;
methyl (2R,3S,3aS,6aR)-3-((N,N-dimethylsulfamoyl) amino)-2-((((1s,4S)-4-phenylcyclohexyl)oxy)methyl) hexahydrocyclopenta[b]pyrrole-1(2H)-carboxylate;
isopropyl (2R,3S,3aS,6aR)-2-(((1-(5-fluoropyrimidin-2-yl)piperidin-4-yl)oxy)methyl)-3-(methylsulfonamido) hexahydrocyclopenta[b]pyrrole-1(2H)-carboxylate;
methyl (1R,3R,4S,5S)-4-(methylsulfonamido)-3-((((1s, 4S)-4-phenylcyclohexyl)oxy)methyl)-2-azabicyclo [3.2.0]heptane-2-carboxylate;
or a pharmaceutically acceptable salt thereof.

11. A pharmaceutical composition which comprises an inert carrier and a compound of claim 1, or a pharmaceutically acceptable salt thereof.

12. A method for treating narcolepsy in a mammalian subject which comprises administering to the patient an effective amount of the compound of claim 1, or a pharmaceutically acceptable salt thereof.

13. A method for treating hypersomnia in a mammalian subject which comprises administering to the patient an effective amount of the compound of claim 1, or a pharmaceutically acceptable salt thereof.

* * * * *